United States Patent [19]

Belady et al.

[11] 3,716,842

[45] Feb. 13, 1973

[54] SYSTEM AND METHOD FOR THE CONTINUOUS MOVEMENT OF A SHEET HAVING GRAPHIC SUBJECT MATTER THEREON THROUGH A WINDOW OF A DISPLAY SCREEN

[75] Inventors: Laszlo Antal Belady, Yorktown Heights; Carlo John Evangelisti, Jefferson Valley; Robert Ingersoll Roth, Briarcliff Manor, all of N.Y. 10510

[73] Assignee: International Business Machines Corporation, Armonk, N.Y.

[22] Filed: May 5, 1971

[21] Appl. No.: 140,477

[52] U.S. Cl. ....................340/172.5

[51] Int. Cl. ....................G06f 3/14

[58] Field of Search ....................340/172.5

[56] References Cited

UNITED STATES PATENTS

| | | | |
|---|---|---|---|
| 3,191,006 | 6/1965 | Avakian | 340/172.5 X |
| 3,534,338 | 10/1970 | Christensen et al. | 340/172.5 |
| 3,036,291 | 5/1962 | Whittle et al. | 340/172.5 |
| 3,144,637 | 8/1964 | Adams et al. | 340/172.5 |
| 3,346,853 | 10/1967 | Koster et al. | 340/172.5 |
| 3,430,207 | 2/1969 | Davis | 340/172.5 |
| 3,596,253 | 7/1971 | Ruth et al. | 340/172.5 |

*Primary Examiner*—Gareth D. Shaw
*Assistant Examiner*—Melvin B. Chapnick
*Attorney*—Hanifin and Jancin and Isidore Match

[57] ABSTRACT

A system which effects the displaying of a sheet having graphic information thereon by achieving its movement in a continuous pass through a window on the screen of the cathode ray tube of a program controlled display unit. To accomplish this, the sheet to be displayed is divided into an orthogonal grid of square cells of a chosen area. There is provided appropriate storage of each of the cells which contains graphic subject matter therein such as the X, Y, coordinates of the cell and the display orders pertinent thereto. Such cellular structure and storage may conveniently be termed "pre-scissoring." By the use of appropriate registers, the information on the sheet is then displayed in a window of the screen by a continuous pass therethrough. Where there is available both primary and secondary storage, all of the cellular information can be contained in secondary storage and only a small portion thereof need be retained in primary storage, i.e., the cells being displayed in the window presently and cells abutting the displayed cells. Where there is available both primary and secondary storage, as cells are passed through the window, there are concurrently brought from secondary storage, cells which follow immediately upon those in primary storage. Consequently, with this arrangement, a smooth continuous pass of the sheet is achieved on the cathode ray tube screen. The cells, after being passed through the window, need not be returned to secondary storage since the readout from secondary storage is nondestructive. However, in the situation where information may be updated or changed when it is in primary storage, provision can be made to return the passed cells to secondary storage. Accordingly, with this system, in any event, there is enabled the continuous smooth pass on a sheet of graphic information through a portion of a cathode ray tube screen and where primary and secondary storage are both available, only a small portion of the information need be resident in primary storage at any one time.

15 Claims, 34 Drawing Figures

INVENTORS
LASZLO A. BELADY
CARLO J. EVANGELISTI
ROBERT I. ROTH
BY Isidore Match
ATTORNEY

LOGIC

DISPLAY

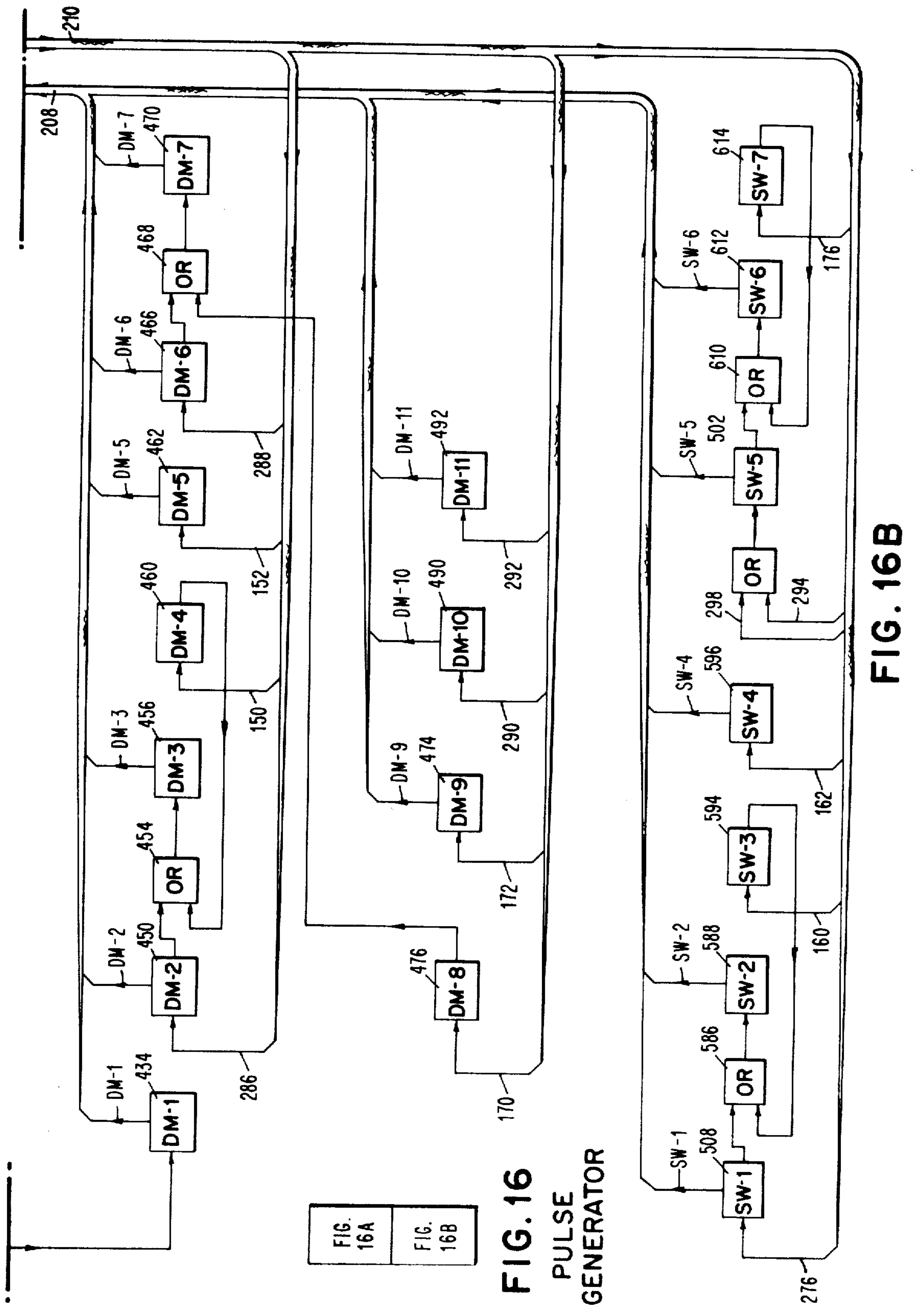
FIG. 16B, FIG. 16 PULSE GENERATOR

PATENTED FEB 13 1973

3,716,842

SHEET 26 OF 27

SYSTEM AND METHOD FOR THE CONTINUOUS MOVEMENT OF A SHEET HAVING GRAPHIC SUBJECT MATTER THEREON THROUGH A WINDOW OF A DISPLAY SCREEN

BACKGROUND OF THE INVENTION

This invention relates to display systems. More particularly, it relates to an arrangement for enabling the displaying of a virtually unbounded sheet of graphic information.

For many applications in computer graphics, there exists a lack of correspondence between the size of an image to be displayed and the physically limited area of the display device, the latter generally being the screen of a cathode ray tube (CRT). Quite often, the computer graphics device user ideally desires the use of a virtually unbounded display area for his model, such as complex electrical networks, for example. In this connection, it is, of course, readily appreciated that currently available CRT screens are substantially smaller in area than the conventional media used for drawing such as drafting boards, blackboards, etc.

In considering the problem of the lack of correspondence between the size of the model to be displayed and the size of a CRT screen, it is convenient to introduce the concept of a sheet, as the latter term is used hereinafter in this description. A sheet is defined herein as an essentially unbounded medium containing graphic information such as pictures, symbolic networks, etc. If it is desired to display such sheet on the screen of a CRT, the limitations of the screen area prevent the displaying of all but a small portion of the graphic information contained on the sheet. Furthermore, if only a portion of the screen is assigned to the display portion of the sheet, then only a window is thereby provided as the actual viewport of a user to observe his model.

The concept of windowing, i.e., the providing of the window-type viewport for a user, is known. In interactive computer graphics, there are many known techniques for achieving such windowing.

In one of these techniques, the display list for the entire sheet desired to be displayed is contained in primary storage and is processed by a display control unit. Lines are scissored by a particular circuit and only the sequences which are required are displayed. This technique presents the disadvantage in that the entire sheet of information has to be contained in primary storage and that all of the information has to be processed repetitively by the display control unit. This technique also requires expensive and involved scissoring apparatus.

In another of the known techniques, there is extracted from the entire sheet by software (program) scissoring, only that information which is to be displayed in the window. To carry out this technique, a display list is provided which relates only to the information to be so displayed and only such information is displayed. This technique is disadvantageous in that there is not enabled the achieving of continuous windowing, i.e., where the window moves over the sheet (such as in the unrolling of a scroll). In addition, in this technique, the time required for software scissoring results in a poor response time. Furthermore, a salient disadvantage of this technique is that two representations of the sheet have to be maintained, one of the entire sheet and a display list of a portion of the sheet.

Accordingly, it is an important object of this invention to provide improved apparatus and an improved method for effecting windowing in a display apparatus which overcomes the disadvantages of known apparatus and methods.

It is another object to provide apparatus and a method for effecting windowing of a sheet in a display apparatus wherein it is not required that the entire information on the sheet be resident in primary storage.

It is a further object to provide apparatus and a method for effecting windowing of a sheet in display apparatus wherein there is enabled the continuous windowing of virtually unbounded sheets.

It is yet another object to provide apparatus and a method for effecting windowing of a sheet in a display apparatus wherein the size of the sheet and the area of the display device are independent of each other.

It is still a further object to provide apparatus and a method for effecting windowing of a sheet in a display apparatus wherein there is enabled the use of different size windows to present portions of an information model without requiring a change in the representation of the model in primary storage.

It is also an object to provide, in accordance with the preceding object, apparatus and a method for effecting windowing of a sheet in a display apparatus wherein information in the computer's primary storage can be dynamically updated, while moving the sheet relative to the window in the screen of the cathode ray tube to support the display device, while essentially leaving unchanged in secondary storage, the descriptive data representing the model.

SUMMARY OF THE INVENTION

In accordance with the invention, there is provided a system for effecting the displaying of an unbounded sheet of graphic information on the screen of the display unit of a program-controlled display apparatus in a continuous pass through the screen, the display apparatus including control means for controlling the display unit, the control means including storage means associated therewith. The invention essentially comprises means for storing a sheet of graphic information in the storage means in the form of a grid of rectangular cells, each of the stored cells having a name constituted by its X,Y coordinates on the sheet of a corner of a cell and the display orders for the graphic information contained within the cell. Means are provided responsive to the names of the cells for causing the sheet to be moved in a continuous pass through the screen, such means typically comprising registers containing cell names and means for changing the cell names in the registers. In addition, there are included means responsive to the display orders in the cells for effecting the display of the graphic information on the sheet as the sheet is passed through the screen.

In the case where the control means includes both primary and secondary storage, all of the cells on the sheet containing graphic subject matter therein must be stored in the secondary storage means with their respective names and display orders for the graphic information pertinent thereto. A relatively small portion of the sheet, i.e., the cells comprising such portion are contained in the primary storage means, the portion including those cells presently being displayed on the screen and cells abutting the displayed portion. In this arrangement, means are provided for continuously transferring the next occurring cells from secondary to primary storage to effect the smooth continuous pass of the sheet through the screen.

In the contemplation of the invention, there may be utilized the total screen of the display unit or a designated portion thereof suitably referred to as a window.

The foregoing and other objects, features and advantages of the invention will be apparent from the following more particular description of the preferred embodiments of the invention, as illustrated in the accompanying drawings.

BRIEF DESCRIPTION OF THE DRAWINGS

In the drawings.

FIGS. 16A and 16B taken together as in FIG. 16 constitute a diagram of the pulses generators utilized for effecting the operation of the embodiment constructed according to the invention.

BRIEF DESCRIPTION OF A PREFERRED EMBODIMENT

Figure 1:
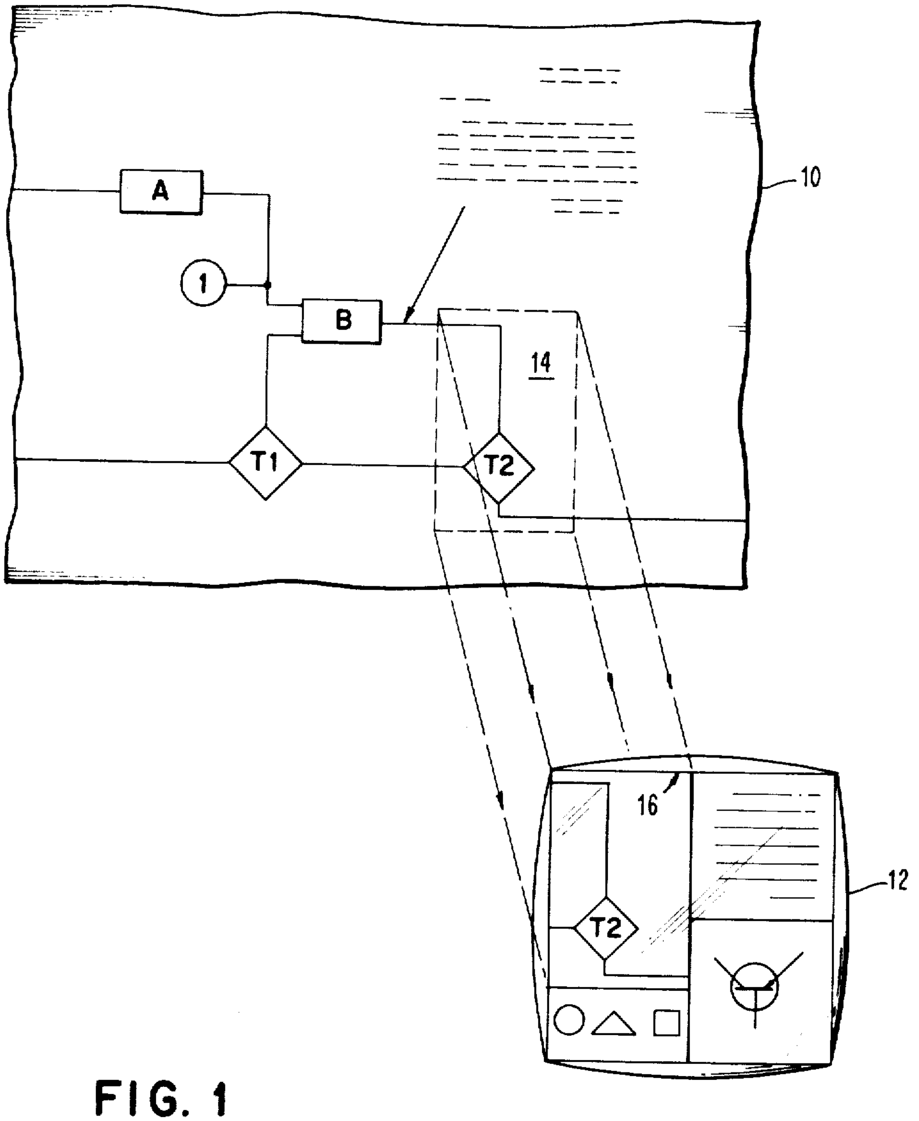
FIG. 1 is a depiction of the mapping of a portion of an unbounded sheet of graphic subject matter onto the window of a screen of a cathode ray tube.

In considering the inventive concept, reference is made to FIG. 1 wherein is shown the result which ensues when a portion of the screen of a CRT is assigned to display a part of a sheet.

In FIG. 1, there is shown a sheet 10 which is essentially unbounded and which may contain graphic information over its total surface. The sheet may be considered the logical working medium. There is also shown the screen 12 of a CRT tube which is, of course, a device bounded by finite physical dimensions. The area 14 of sheet 10 which is enclosed by the broken-line rectangle is mapped onto a window, i.e., the portion 16, of screen 12. The remainder of screen 12 shows information thereon in separate areas which is not related to the information on sheet 10. FIG. 1 illustrates how the window 16 becomes the viewport given to the user to interact with his model.

Figure 2:
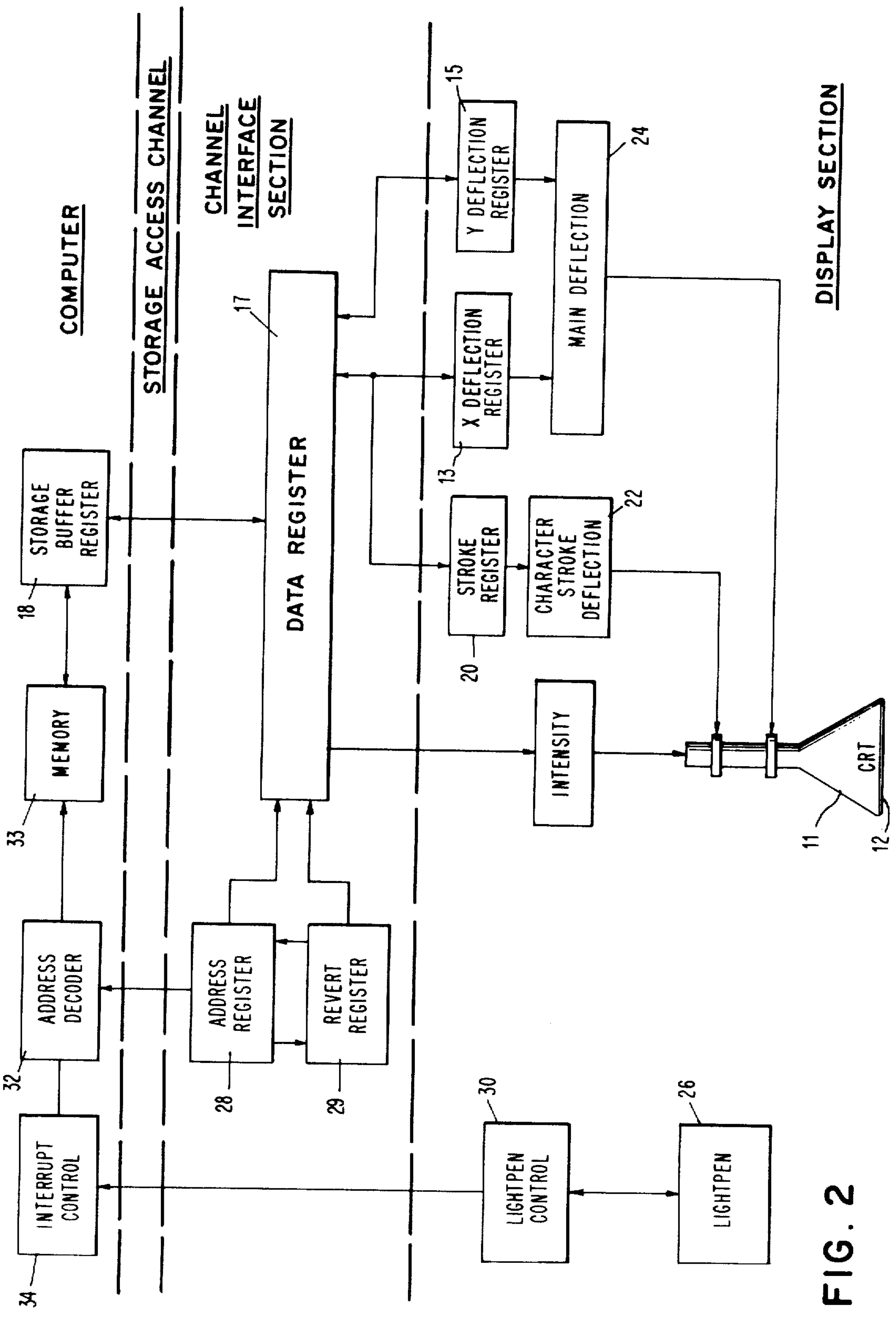
FIG. 2 is a block diagram of a suitable embodiment of a program control display apparatus with which the invention can be carried out.

In FIG. 2, there is shown the combination of a display unit for interactive graphics and the computer control thereof with which the invention may suitably be employed. As an example of the display unit, there may be used the IBM 2250 display unit and the computer which may be employed is the IBM 1130 computer. The respective structures and operations of the IBM 1130 general purpose computer and the IBM 2250 display unit are described in the IBM Systems Reference Library Publications entitled "IBM 1130 Computing System Component Description" and "IBM 2250 Display Unit Model 4," Form No. 1130–03, A27–2723–1.

The display section portion of FIG. 2, under the control of a display program in the computer memory 33, generates images on the area of a cathode ray tube 11. The image can comprise straight lines, points, and characters. A visible display is produced when the electron beam in cathode ray tube 11 strikes the phosphor coated cathode ray tube screen 12 to thereby cause the portion of the coating struck by the beam to glow briefly. As is well known, normally a glow on a cathode ray tube screen fades within a fraction of a second, i.e., too soon for the human eye to carefully perceive and identify the image. For this reason, the display is continuously regenerated at a rate that causes it to appear steady and stationary to an observer. Such regeneration is performed automatically under control of the display program in the controlling computer's memory.

The addressing of memory 33 in the computer is performed in that portion of FIG. 2 legended channel interface section. Once regeneration is started by a computer input-output control command, this interface section continuously fetches orders and data from the display program in memory. Display orders are decoded in the interface section and the deflection information is transferred to the display section where it is employed to draw the appropriate display, regeneration being accomplished by continuously repeating the display program.

Relative to displays, the display program is sent to the display unit from the computer through the storage access channel. The orders in this program specify electron beam deflection, such information being received in an X deflection register 13 and a Y deflection register 15 in the display unit from a data register 17 in the channel interface section, the latter register communicating with a storage buffer register 18 in the computer. Positioning orders in the display program select the X and Y coordinates for each element of a display, i.e., a point, a line end point, and a character area centroid.

The display unit can display information in either of two modes, i.e., graphic or character. Consequently, there is also provided a stroke register 20 whose output in turn is applied to a character stroke deflection stage 22, the output of the latter stage being applied to cathode ray tube 11. The outputs of X and Y deflection registers 13 and 15 are applied to cathode ray tube 11 through a main deflection stage 24. A light pen which is diagramatically depicted by a stage 26, and which enables interaction between the system and its user is suitably a fiber optic device of the known type which can provide two independent inputs to the display unit, viz., a light pen detect and a light pen switch. A light pen detect occurs when a user thereof points a light pen at the section of the displayed image that he wishes to identify to the displayed program. A light pen detect can occur whenever light from the cathode ray tube beam passes within the light pen's field of view. When the light pen is in the desired position, the user can press the pen tip against the face plate of the cathode ray tube to activate a tip switch. The program is so arranged whereby it can disable or ignore light pen detects and ignore switch closures or it can establish any one of the following conditions as significant:

1. Light pen switch close (detect or no detect).
2. Light pen detect (switch open or close).
3. Light pen detect and light pen switch close.

When the light pen detects are enabled or made significant by the program, a detect can occur each time an unblanked cathode ray tube beam passes within the light pen's field of view. Consequently, as is well known, a continuous detect mode can be employed for light pen tracking. In addition, the display program can be arranged such that the light pen can be ignored while certain information such as a background grid is being displayed to inhibit light pen initiated operations on such information.

As is seen in FIG. 2, the channel interface section interfaces the storage access channel and the display section. The function of this section is to decode and execute orders and commands, address the computer memory 33, and handle data transferred to or from computer memory 33.

The address register 28 in the channel interface section specifies to computer memory 33 through an address decoder stage 32, the location at which information will be stored from which it will be retrieved for the display unit's operations. The display program includes interrupt orders which may be used for conditional or unconditional branching to any location storage for interrupting the computer and for other operations an interrupt stops regeneration of the display.

It is noted that light pen stage 26 is controlled by a light pen control 30 which, in turn, communicates with the interrupt control stage 34 in the computer. The revert register 29 contains the address of the main display program list when a branch occurs. Computer memory 33 receives information from address decoder stage 32 and intercommunicates with storage buffer register 18.

The display program consists of display orders, associated data for image generation, and control orders for various non-display functions. The orders table set forth immediately hereinbelow lists a display program order set.

| Type | Name | Variation(s) | Mnemonic | Comments |
|---|---|---|---|---|
| a | Set Graphic Mode | Vector | SGMV | |
| | | Point | SGMP | |
| | Long Absolute XY | Absolute XY | DBA | Beam on |
| | | Absolute XY | MPA | Beam off |
| | Short Absolute XY | Absolute X | DBAX | Beam on, X deflection |
| | | Absolute X | MBAX | Beam off, X deflection |
| | | Absolute Y | DBAY | Beam on, Y deflection |
| | | Absolute Y | MBAY | Beam off, Y deflection |
| | Incremental XY | Incremental XY | DBI | Beam on |
| | | Incremental XY | MBI | Beam off |
| | Set Character Mode | Basic | SCMB | |
| | | Large | SCML | |

a. Display Orders

| Type | Name | Variation(s) | Mnemonic | Comments |
|---|---|---|---|---|
| (a) | Character Stroke Word (2-stroke mnemonics generate one stroke word) ta (b) | Stroke | DBS | Beam on |
| | | Stroke | MBS | Beam off |
| | | Control Word | CS | Control code |
| | Short Branch | | GSB | One word |
| | Long Branch Interrupt | unconditional Branch | GB | Most variations are two words, and can coded as 2-word no-op. |
| | | Unconditional Branch, External | GBE 3 words | |
| | | Conditional Branch | GBC | Long Branches can be direct or indirect. Indirect branches include a third word, i.e., the actual address that it is branched to. |
| | | Conditional Branch, External | GBCE 3 words | |
| | | Unconditional Interrupt | GI | |
| | | Conditional Interrupt | GIC | |
| | Set Pen Mode | Set Pen Mode | SPM | several options selected by modifiers. |
| | Set Pen Mode | Graphic No-operation | GNOP | |
| | Start Timer | | STMR | |
| | Revert | | RVT | |
| | Store Revert Register | | SRVT | |

16 (a). Data Words
(b). Control Orders

There follows hereinbelow a description of the orders set forth in the foregoing table.

Set Graphic Mode (Vector/Point) (SGMV, SGMP)

This order prepares the display unit to operate with long absolute, short absolute and incremental orders which can be intermixed. The graphic mode of operation is entered into automatically following the execution of any order other than a branch that is in a character sequence. The display unit is placed in the graphic mode of operation established by the most recent Set Graphic Mode order. If a mode was not established previously, the display unit is placed in the Graphic (Vector) Mode of Operation.

Long Absolute XY (MBA, DBA)

Each Long Absolute XY order identifies one beam deflection end point. A deflection of any length and in any direction can be specified depending upon the setting of certain bits in the order. A vector or point, as determined by the current graphic mode of operation, is displayed if the beam bit is in a given binary state or the beam is repositioned without causing a display if the latter bit is in the opposite binary state.

Short Absolute X/Y (MBAX, MBAY, DBAX, DBAY)

Each one-word Short Absolute X/Y order causes a deflection of the beam either in the horizontal or in the vertical direction as is specified by the state of a given bit in the order. This order can be employed to display a horizontal or vertical line or to display a point as determined by the current display unit graphic mode. It can also be used for electron beam positioning without causing a display as determined by the binary state of a chosen bit.

Incremental XY (MBI, DBI)

Incremental graphic orders provide the capability of displaying a graphic image by specifying incremental displacement from an absolute beam position. Each displacement can be positive or negative. The incremental X and Y values are added to the absolute X and Y values (the current beam position) thereby providing a new absolute value for a new beam position.

Set Character Mode (Basic/Large) (SCMB, SCML)

This order places the display unit in the character mode of operation and specifies that large- or basic-size characters are to be drawn. The character set resides in the memory of the computer as a strobe table or list in the display program.

Stroke Data (MBS, DBS)

Each stroke data word contains two stroke end point addresses, a beam bit for each stroke, a length bit and a revert bit.

Short Branch (GSB)

This order causes an unconditional branch to any location within a given word block of memory. As it is executed, a full return address (the address of the location that follows the short branch location in memory) is saved in the revert register. A store revert register order can be used to restore the return address in the display program.

Long Branch/Interrupt (GB, GBE, GBC, GBCE, GI, GIC)

This order can be used for any of the following functions, viz. unconditional branch (GB), unconditional branch external (GBE), conditional branch (GBC), conditional branch external (GBCE), unconditional interrupt (GI), and conditional interrupt (GIC).

Set Pen Mode (SPM, GNOP)

This order establishes the mode of light pen operation in a display unit. It can enable or disable light-pen detects and can enable or defer interrupts when a detect does occur.

Start Timer (STMR)

This order prevents the display unit from using unnecessary storage cycles when executing a short display program thereby freeing storage cycles for other programs. It is used with a branch order to control regeneration, the branch order being necessary to loop from the end of the display program to the beginning thereby maintaining continuous regeneration without computer program intervention.

Revert (RVT)

This order causes the revert register contents (the return address) to be loaded into the address register. It is used to return from plural level subroutines. Thus, for example, the address N+1 is placed in the revert register as the short branch order is executed. This address is then placed in the address register when the revert order is executed effecting a return of operation to address N+1.

Store Revert Register (SRVT)

This order causes the contents of the revert register to be placed into memory at the second word of this order. It is used when more than one branch is to be executed before returning to the main program. From example, a store revert register order would be executed before a second branch is issued. After the second branch, a third branch with indirect addressing specified can be used to return by way of the stored revert register contents.

The computer program initiates display unit operations by issuing an execute input-output instruction. The input/output control command at the effective storage address specified by the execute instruction is then sent to the display unit. Thus, if the input/output control command is an initiate write, i.e., start regeneration, command, the display unit fetches display program information from primary storage, starting at the input-output command specified address.

Display program information consists of orders and data. Orders either initiate a display unit operation or establish an operational mode. Order-initiated operations include point and vector plotting, branching, and computer interrupt generation. The two orders in the orders table, i.e., set graphic mode, set pen mode, establish a graphic mode and a light pen mode of operation respectively. By data is meant information that does not contain an operation code, examples of such data being character stroke words.

Subroutines

Single-level subroutines, i.e., a linkage from the main order program to the order subroutine and return to the main order program, are frequently used in graphic applications. Orders in the display program enable multiple-level subroutine linkages to be performed. Each graphic sub-picture and each entity can be represented as a subroutine. The multiple-level subroutine linkage is accomplished by storing the return address, i.e., the address of the order following a branch order, in a particular core location and branching indirectly to the location of the return address. Thus, the ultimate branch is the next-higher subroutine level.

A graphic subroutine is a sequence of display orders which forms a logical element or entity. In applications where the display images comprise groups of elements, graphic subroutines, together with a defer light pen interrupt light-pen control order, permits the correlation of a light-pen detect with a group of elements.

Character generation is a programmable function, characters represented by the component strokes being stored in the computer storage. Character stroke words are organized such that each character can be represented by a subroutine of stroke words and, then, they can be drawn by a general sequence of appropriate display orders.

As has been described hereinabove, display orders, set point mode, return the display unit to the vector mode of operation, or direct the display unit to position and blank or unblank the electron beam. The set graphic mode order specifies the display or vectors or of points under the direction of graphic orders from the display program. These orders can be in long absolute, short absolute, and/or incremental format. The set character mode order specifies either basic or large character size, stroke data from a stroke table in the display program directing electron beam movement to form characters.

Control orders are provided for (1) conditional and unconditional branching, (2) conditional and unconditional interrupting of the computer, (3) light pen control, (4) regeneration rate control, and (5) subroutine linkage.

A branch order is normally the last order in the main routine of a display program. This order accomplishes display regeneration by branching to the first order in the main routine, resulting in repeated operation of the display program. Branch orders are also used in the character mode of operation to reference a character stroke table. These branch orders enable regeneration, logical decision making, character generation, and order subroutinining. As shown in the table, there are two branch orders, viz., short branch and long branch/interrupt. The short branch order is used for unconditional branching within a given section of storage whereas the long branch interrupt is employed for conditional or unconditional branching to any location in storage, for interrupting the computer, and for no-operations. All interrupts stop regeneration.

In accordance with this invention, there is provided a system wherein the graphic information on a large, i.e., unbounded sheet can be resident in secondary storage (disc for example) and for a user to window over the sheet to view portions thereof.

In considering image organization and coordinate transformation, let it be assumed that, in order to keep references to image items invariant, there is a fixed origin (0,0) on the sheet. All of the items on the sheet are then designated by their X, Y locations. Further, let it be assumed that the sheet is subdivided into small squares, suitably termed cells wherein a typical cell size may be 128 × 128 raster units. With this arrangement, in order to locate any cell on the sheet, it is merely necessary to provide the X, Y coordinates of a corner of a cell, preferably its lower left corner in this embodiment.

According to the invention, there is employed a graphic order entitled "absolute vector," which provides an instruction to locate a cell's corner. Within cells, images are rendered using relative graphic orders. Accordingly, by dividing the sheet into a cellular grid, lines on a sheet are effectively prescissored on cell boundaries and stored, being grouped together into corresponding cells.

Figure 3A:
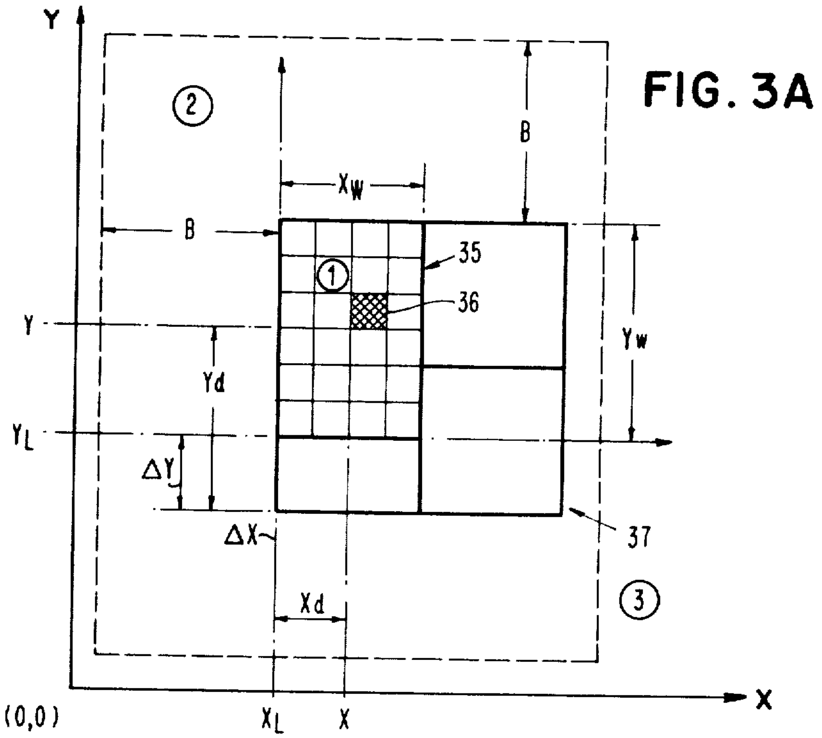
FIG. 3A is a depiction of the coordinate systems of the cathode ray tube screen, the window thereon and the graphic information containing sheet.

In FIG. 3A, there is illustrated the coordinate systems of the screen, the window on the screen and sheet. In this FIG., area 35 is the window containing an array of cells being displayed, the cross-hatched area 36 illustrating a given cell which lies within window 35. Area 37 depicts the total area of the screen. The values $X_L$ and $Y_L$ and $X_W$ and $Y_W$ locate the window on the sheet while the values ΔX and ΔY locate the window on the screen. The locations denoted by the symbols ①, ②, and ③ refer to different states and are further explained herein below.

Figure 3B:
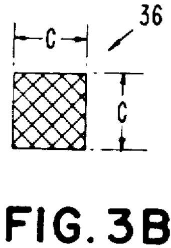
FIG. 3B illustrates the area of a cell.

FIG. 3B illustrates the dimensions C of each cell such as cell 36 in window 35.

In considering the significance of the values set forth in FIG. 3A, the following conditions obtain:

| | | |
|---|---|---|
| Stored into Display List | { X,Y | sheet Coordinates-Location of the cell on the sheet (Invariant) |
| Loaded Into | $X_L, Y_L$ | location of window on the sheet (dynamic) |
| Special | $X_{W,YW}$ | size of window |
| Registers | ΔX,ΔY | window/scope offset |
| | B | bandwidth of primary storage environment - location of the cell on the screen |
| Computed By Hardware | { $X_d, Y_d$ | deflection coordinates - location of the cell on the screen |

The relationships of the coordinate systems are defined as follows:

State ① (Cell in window)

$$\text{If } X_L \leq X \leq (X_L + X_W - C)$$

and $$Y_L \leq Y \leq (Y_L + Y_W - C)$$

State ② (Cell in primary storage, not visible)

If not in state 1 and $$(X_L - B) \leq X < (X_L + 0\, X_W\, 30\, B)$$

and $$(Y_L - B) \leq Y < (YL + Y_W + B)$$

State ③ Otherwise

Scope deflection coordinates, relocated:

$$X_d = (X - X_L) + \Delta X$$

$$Y_d = (Y - Y_L) + \Delta Y$$

Relative to the cell states which are required for managing the cells between secondary and primary storage, a cell is considered to be in state ① if it is in the window, i.e., is to be visible. A cell is considered to be in state 2 if it is not visible but still in primary storage and is in state ③ if it is or should be in secondary storage. Window area 35, i.e., state ①, is surrounded by a band of cells of width B comprising the state ② cells. The term B is an additional system constant which can be set into registers or built into the system.

Figure 4A:
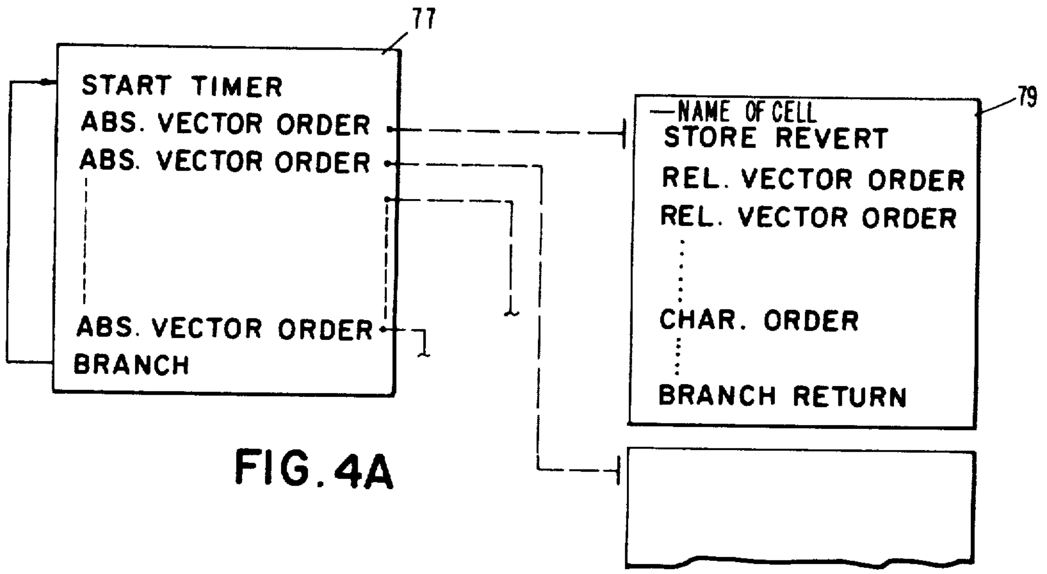
FIG. 4A shows a typical display list in the program control display apparatus according to the invention.
Figure 4B:
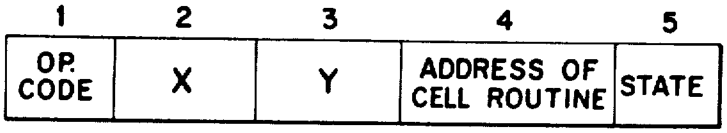
FIG. 4B is a diagram of the absolute vector order according to the invention as shown in FIG. 4A.

With regard to the operation of the invention, reference is first made to FIG. 4A wherein there is depicted a typical portion of a display list. In this list, the special absolute vector order may have five fields, viz, the operation code, the X coordinate of a cell on the sheet, the Y coordinate of a cell on the sheet, the address of the cell description or routine, (graphic subroutine) and the state of the cell. FIG. 4B depicts the absolute vector order, i.e., the five fields by which it is constituted. List 77 in FIG. 4A shows the main program and list 79 sets forth the intra-cell routines. The name of cell in list 79 are the X, Y coordinates of a corner of a cell, suitably its lower left corner. The other orders in list 79 are relative display orders.

Figure 5:
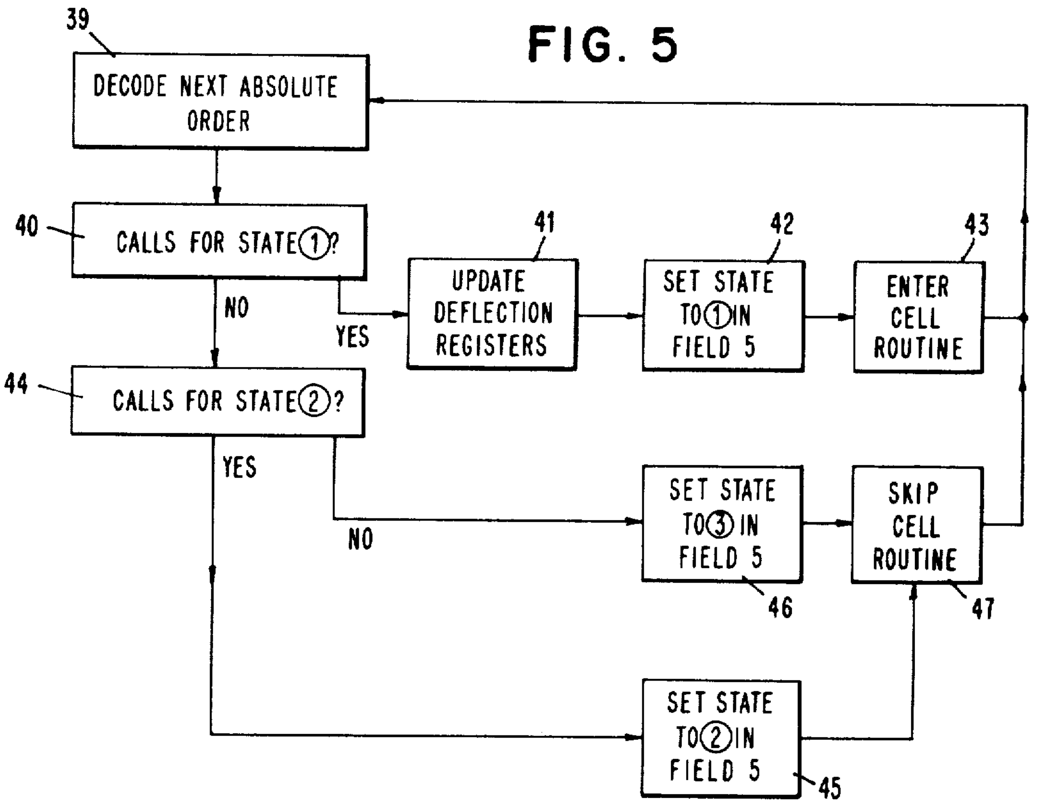
FIG. 5 is a conceptual block diagram for decoding a display order.

In FIG. 5, there is shown a conceptual diagram of the logical steps for decoding a display order. In this arrangement, an absolute vector order is decoded by step 39. In step 40, it is ascertained whether state①is called for. If it is, the deflection registers (X deflection register 14 and Y deflection register 15, FIG. 2) are updated by the operation of step 41, the state field, i.e., field 5 of the absolute vector order (FIG. 4B) is set to① by step 42 and the cell routine, i.e., list 79 in FIG. 4A is entered into by step 43. When the cell routine is completed, the next absolute vector order is decoded.

If the decoded absolute vector order does not call for state①whereby the result of the operation of step 40 is no, then the logic proceeds to step 44 to ascertain whether the decoded absolute vector order calls for state②. If it does, then by step 45, field 5 is set to state② and the next absolute vector order is decoded. If it is ascertained by step 44 that the decoded absolute vector order calls for neither state①nor state②, then by step 46, field 5 is set to state③and the next absolute vector order is decoded. The step 47, legended skip cell routine is included to indicate that in states②and③, the cell routine is not entered into.

A series of tests are employed to determine the state of the cell by comparing the coordinates in the graphic order with the contents of appropriate registers. Depending upon the outcome of these tests, one of two results ensue. One of these results is the transfer of control to a graphic subroutine consisting exclusively of relative vectors describing the graphic information within the cell and control then returns to the next graphic order by finding a return branch mark, for example. The other of these results is the direct transfer of control to the next graphic order. In addition, the new states are stored back into the field 5 of the absolute vector order itself.

The computer effects the motion of the sheet relative to the window by changing the contents of a load order in an appropriate register. To accomplish this, the computer has to update the four sets of relocation values, viz., $X_L$, $Y_L$, $X_W$, $Y_W$, ΔX, Δ, and B. The other computer function is the scanning of the cell state fields in the absolute vector orders. Whenever a state③vector is detected, the corresponding description to a cell, including the absolute vector itself, are assigned to be replaced by a new cell. The result that consequently ensues is a smooth motion of the information across the window together with an automatic actuation of secondary storage transmission to thereby maintain the display list invariant except for the dynamic changes of the states.

The independence of the logical sheet and the physical limitations of the display device provide many advantages in addition to the salient advantage of enabling the use of unbounded sheets for model building. Thus, with the invention, there is enabled the use of different size windows to present portions of a model without actually changing the internal representation in the computer. Such invariance of the internal representation is in itself, an advantage, since, while moving the sheet relative to the window, information can be dynamically updated to support the imaging device while essentially leaving the descriptive data of the model unchanged in storage.

As has been mentioned above, the invention overcomes the disadvantages of known techniques for displaying large sheets in that it does not require that the entire sheet information be resident in primary storage for regeneration and it enables the continuous windowing of substantially unbounded sheets.

As has been mentioned above, a salient element of the invention is the prescissoring of lines into lie segments on individual cells whereby independent cell descriptions can be stored in secondary storage for future cellular windowing by a user. In this connection, reference is made to FIG. 6 wherein there is shown an arbitrary line segment $P_1$–$P_2$ on the sheet. The line is continued in cells 809, 810, 806, 807 and 804. At the time of its creation, the line is merely defined by its two endpoints, $P_1$ and $P_2$, i.e., by the X,Y coordinates of these points. Consequently, the input to an algorithm for scissoring lines into cells is a set of four numbers $X_A$, $Y_A$, $X_B$ and $Y_B$.

Figure 6:
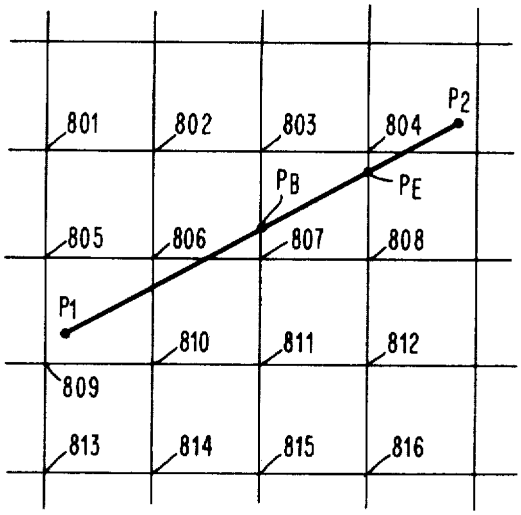
FIG. 6 shows a line of graphic subject matter, portions of which are contained in a plurality of cells.
Figure 7:
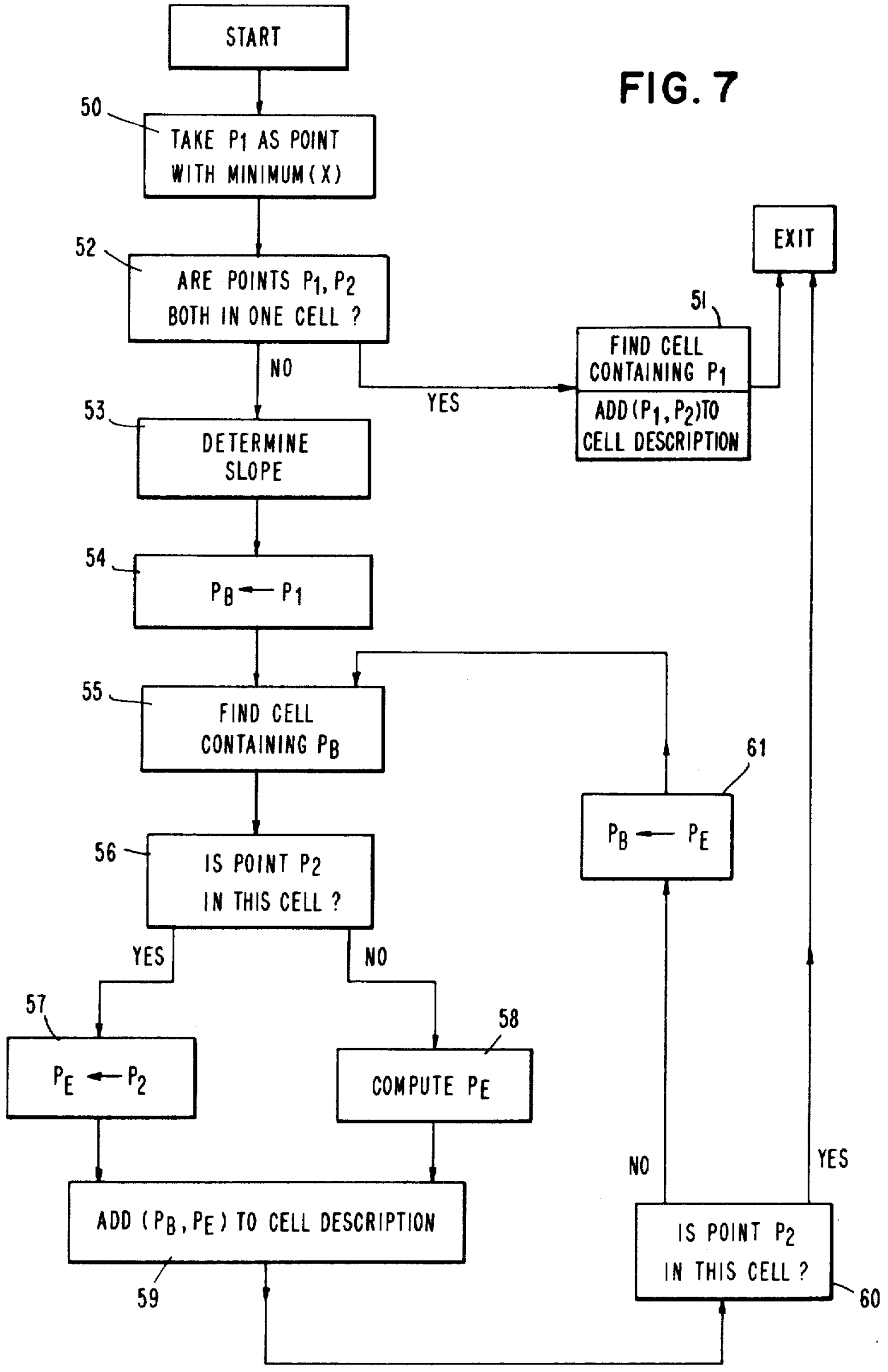
FIG. 7 is a flowchart of a program suitable for use in scissoring lines into line segments in individual cells to enable the storage of independent cell descriptions.

In FIG. 7, there is shown a flow chart of an example of the above-mentioned algorithm, i.e., one that can be used for scissoring lines into cells. In this algorithm in step 50, point $P_1$ of the line segment shown in FIG. 6 is taken as the point with the minimum (X). In step 52, it is determined as to whether points $P_1$ and $P_2$ are both located in the same cell. This can be accomplished by comparing the X, Y coordinates of points $P_1$ and $P_2$, respectively, with the coordinates of the corners of the cell. In this step, after the discarding of the 7-low order bits of all of the four entry parameters ($X_A$, $Y_A$, $X_B$, $Y_B$), the equalities $X_A=X_B$ and $Y_A=Y_B$, signify that the entire line is in a single cell and no scissoring is necessary. If the determination made by step 52 shows that, in fact, points $P_1$ and $P_2$ are in one cell, then the routine proceeds to step 51. In step 51, there is located the cell containing point $P_1$ and the coordinates of points $P_1$, $P_2$ relative to the corner of the cell are added to the cell description. The name of the cell containing point $P_1$ is obtained by resetting the low order seven bits of both $X_A$ and $Y_A$. The routine then terminates as shown by the Exit step. If, however, the result of step 52 indicates that points $P_1$ and $P_2$ are not in one cell, then, in step 53, the slope of line $P_1$, $P_2$ is determined. The slope of the line is determined employing the following formula.

$$\text{Slope} = s = (Y_B - Y_A)/(X_B - X_A) \text{ (keeping the low order bits)}$$

The name of the cell is constituted by the X,Y coordinates of the lower left corner of the cell. With the routine shown in FIG. 7, the name of each cell containing graphics information therein is determined and this name is the one shown in display list 79 in FIG. 4B. As shown in step 51, once two points in a cell are defined, the information is added to the cell description in the form of relative vector orders. The name of the cell is employed to retrieve information when required. The algorithm then proceeds to step 54.

In step 54, point $P_B$ is substituted for point $P_1$ and the routine then moves to step 55 where the cell containing point $P_B$ is determined. At the completion of this operation, step 56 is executed, the latter execution determining whether or not point $P_2$ is in the cell containing point $P_B$, i.e., the cell found by the operation of step 55.

In the event that by the operation of step 56 it is found that point $P_2$ is in fact in the cell which contains point $P_B$, then the algorithm proceeds to step 57 where the coordinates of point $P_E$ are substituted for the coordinates of point $P_2$ whereupon the routine proceeds to step 59. If, by the operation of step 56, it is found that point $P_2$ is not in the cell which contains point $P_B$, then by the operation of step 58, the coordinates of point $P_E$ are determined and the routine again proceeds to step 59.

In step 59, the coordinates of points $P_E$ and $P_B$ are added to the information which describes the cell containing point $P_B$, i.e., the cell ascertained by the operation of step 55 and the routine goes to step 60.

By step 60, it is again ascertained as to whether or not point $P_2$ is in the cell containing point $P_B$. If it is, then the routine is completed and exits. If it is not, then the routine moves to step 61 wherein point $P_B$ is substituted for point $P_E$ and the routine again loops through steps 55, 56, 57, 58, 59 and 60. The performing of the operation undergone by step 61 is equivalent to defining point $P_B$ as an edge point in a cell adjacent to the cell containing point $P_E$. The cells, i.e., those containing points $P_B$ and $P_E$ share the boundary at this point.

In summarizing the operation of the algorithm depicted in the flow chart in FIG. 7, first a decision is made as to whether both end points, viz., points $P_1$ and $P_2$ are in the same cell. After discarding the seven low-order bits (of a 10-bit binary number) of all four ending parameters, equalities $X_A = X_B$ and $Y_A = Y_B$ signify that the entire line is in a single cell and no scissoring is necessary. If, however, points $P_1$ and $P_2$ are found not to be in the same cell, then first the slope of the line is determined in accordance with the formula set forth above. The name of the cell containing point $P_1$ is obtained by resetting the low order seven bits of both $X_A$ and $Y_B$. The edge point $P_E$ of the line in this cell is then computed by using the slope S which is constant during the entire computation.

Once two points in the cell are defined, the information describing the latter two points is added to the cell description in the form of relative vector orders. The next cell is then defined for which $P_B$ becomes the $P_E$ point first computed. A test is then made as to whether this cell contains point $P_2$. Otherwise, the routine branches back to the new point where the new edge point is to be defined.

With the program shown in FIG. 7, there is, accordingly, determined the names of all of the cells of the sheet which contain graphic subject matter therein, their names being appropriately stored. There is no need to determine the cells of the sheet grid which do not contain graphic subject matter. This is because blank cells need not be displayed and, therefore, need not be placed in secondary storage. The names of cells containing graphic data become a concatenation of the X, Y coordinates of the cell on the sheet and are determined according to the program shown in FIG. 7.

In carrying out the invention, the placement of alphanumeric characters in cells is quite simple since there is made the underlying assumption that single characters do not cross cell boundaries. Characters are generated by a user who utilizes a keyboard and every character becomes associated with an (X,Y) coordinate pair which is under control of the cursor mechanism such as is provided in the aforementioned IBM 2250 display device.

In the ensuing portion of this description, there is set forth an illustrative embodiment of the invention. The list set forth immediately hereinbelow is glossary of the designations of some of the registers employed therein.

X SHOR-Registers holding sheet of origin cell, i.e.,
Y SHOR-the mid-cell on the screen of the CRT.
X SCOR-Registers holding high-order screen coordinates
Y SCOR-of origin cell.
X SLL-Register holding the value of $X_L$.
Y SLL-Register holding the value of $Y_L$.
X SUL-Register holding the value $X_L + X_W$.
Y SUL-Register holding the value $Y_L + Y_W$.

The values of $X_L$ and $Y_L$ are expressed in screen coordinates.

It is recalled that a cell may be chosen to suitably be constituted by a square of 128 × 128 raster units. For convenience of description, there is chosen a window in the screen of a CRT which can accommodate 8 × 8 cells and the lower left corner of the cell is taken to be its origin, i.e., its name. Thus, any cell can have its origin specified by both its X and Y sheet coordinates and its X and Y screen coordinates.

On the screen, the origin of a cell is specified as mentioned hereinabove by the three high order bits of a ten bit binary number. The seven low-order bits of the latter number are employed to position the CRT electron beam within a cell. Thus, on the screen, the X or Y coordinate of a cell can have the following binary values, viz: 000, 001, 010, 011, 100, 101, 110, or 111. As desired, the window on the screen can of course, vary, from a single cell to a rectangular array such as of 8 × 8 cells.

In carrying out the invention, there is first chosen a window size on the screen. Thus, taking the example shown in FIG. 3, it is seen that the window therein is chosen to be four cells wide and six cells high and is located at the upper left corner of the screen. With this arrangement, the lower limit of a cell origin in the Y direction, expressed in a binary number, is 010. The latter value is the one entered into register Y SLL. (Y screen lower limit). In this window, the upper limit of a cell origin in the Y direction has the binary value 111 and this latter value is entered into register Y SUL (Y screen upper limit).

The lower limit of a cell origin in the X direction is 000 and this value is entered into register X SLL (X screen lower limit). The upper limit of a cell origin in the X direction has the binary value 011 and this value is entered in the register X SUL (X screen upper limit).

After the window size has been chosen, it becomes necessary to consider an origin cell. The latter term is to be distinguished from the term "cell origin." An origin cell is a cell whose origin is located approximately in the center of the window. Thus, for the example, as shown in FIG. 3, a suitable origin cell is the cross-hatched cell 36 therein. The screen coordinates of origin cell 36 in FIG. 3 would be $X = 010$, $Y = 101$, the $X$ value being entered into the register X SCOR (X screen coordinate) and the $Y$ value being entered into the register Y SCOR (Y screen coordinate).

It is, of course, realized that the origin cell has sheet coordinates as well as screen coordinates. In the description of this embodiment, it is assumed that the sheet contains 64 × 64 cells. Consequently, the X or Y sheet coordinate of a cell can be any number from 0 to 63, such number requiring in binary, a six bit field. The binary value of the X sheet coordinate of the origin cell is loaded into the register X SHOR (X sheet cell origin register) and the binary value of the Y sheet coordinate of the origin cell is loaded into the register Y SHOR (Y sheet cell origin register).

To cause the sheet to move to the window in the cathode ray tube screen, as will be further explained hereinbelow, the following means are employed:

Register X SHOR which receives the X sheet coordinate of the origin cell is chosen to be a portion of a larger register in which the seven low order bits are designated "MOVE X." Correspondingly, register Y SHOR which receives the Y sheet coordinate of the origin cell is a portion of a larger register in which the seven low order bits are designated "MOVE Y". Thus, the seven bits constituting MOVE X and the seven bits constituting MOVE Y respectively accommodate the 128 X and 128 Y raster units of a cell. The bits constituting MOVE X and MOVE Y respectively, logically considered as registers in themselves, can be incremented or decremented after each display cycle takes place. In the operation of the embodiment, the latter registers are initially set to 0000000. Thus, for example, if the MOVE X register is decremented by 1, it will contain the binary number 1111111. As will be explained, to cause this change, it is necessary to borrow a binary digit from register X SHOR. The significance of this operation is that the X sheet coordinate of the origin cell is reduced by one to thereby specify a new origin cell, as will be shown hereinbelow. An overflow bit is provided at the left of register X SHOR to indicate that the value of the contents of register X SHOR is below zero or exceeds the number 1111111.

To increment the MOVE X register, the contents thereof are substracted from the contents of the X deflection register 13 (FIG. 2). Such substraction causes the electron beam to be deflected by an amount equal to the difference between the contents of X deflection register 13 and the MOVE X register. When the MOVE X register has been incremented to the value of 1111111, a further increment of one will cause it to clear to the setting 0000000 and add one binary digit to the contents of register X SHOR. In this manner, the origin cell is replaced by its neighbor to the right.

The MOVE Y register operates in a manner similar to the MOVE X register in association with register Y SHOR and the Y deflection register 15 (FIG. 2).

In the embodiment of the invention, to cause the whole of the window to move in unison with the origin cell, a spiral display technique is employed. To illustrate this technique, reference is made to FIG. 8 wherein the origin cell is designated by the numeral 325. In the operation of the embodiment according to the invention, this cell is the one which is displayed first. The Y sheet coordinate is then decremented by one and the cell whose origin is 326 is displayed. The X sheet coordinate is next decremented and the cell whose origin is 327 is displayed. Thereafter, by successively incrementing the Y sheet coordinate, the cells whose origins are 328 and 329 are displayed. From this description, it is clear that the display proceeds in an expanding spiral fashion whereby the cells whose origins are from 325 to 345 are displayed. The cells whose origins are from 346 to 351 are not displayed because they are outside of the window. However, the cells whose origins are from 352 to 355 are displayed. This spiral technique extends to a certain extent beyond the window in order to bring cells adjacent to the window into primary storage to have them there for future use.

Figure 8:
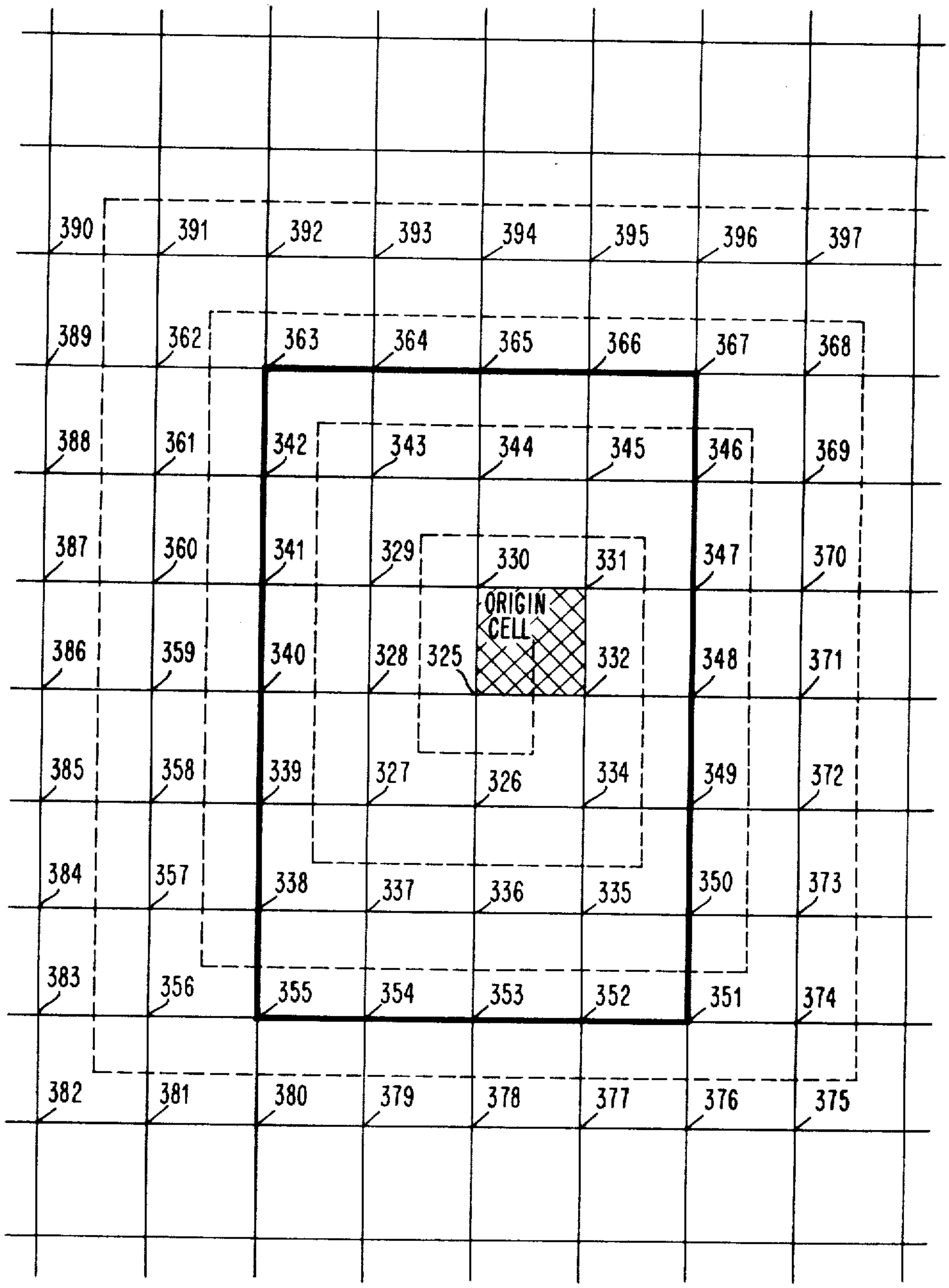
FIG. 8 illustrates the operation of the spiral scan technique employed in an illustrative embodiment of the invention.

As can be seen in FIG. 8, if the sheet is moved directly downward with respect to the window, the cell whose origin is designated 330 will eventually become the origin cell. Thereafter, if the sheet is continued in its downward movement, the cells whose origins are 344, 365, and 394 will successively in turn become origin cells. If the sheet is moved directly to the right with respect to the window, the cell having the origin 328 will become the origin cell. It is, therefore, readily appreciated as to how, for other directions of movement, the origin cell of the moment is in turn replaced by one of its neighbors as the origin cell.

There may be some situations in which the origin cell lies outside of the sheet. For example, referring again to FIG. 8, the sheet could be moved downwardly until the cells whose origins are 352, 353, 354 and 355 would be located at the top of the sheet. In other words, their Y sheet coordinates would all be 63. For this to be the case, the origin cell would then be an imaginary cell which exists three cells above the vertical boundary of the sheet. It can be understood how this condition could exist with the origin cell off the sheet at the left, right lower bottom. The operation of the embodiment would not be affected under these circumstances and only those cells which are actually on the sheet would be displayed.

There can now be explained why the contents of the MOVE X and MOVE Y registers are substracted from the contents of the X and Y deflection registers (FIG. 2) in order to correctly position the electron beam. In this connection and referring to FIG. 8, let it be assumed that the sheet is being moved directly to the right with increments of one raster unit. The first time that a display is made, the contents of the MOVE X register will be set to zero. Now, in order to move the sheet to the right, the X sheet coordinate must be decremented by one. Such decrementing occurs automatically when the contents of the MOVE X register are decremented by one from a zero position. When the MOVE X portion of the register which includes register X SHOR is decremented from its zero position, its contents assume a value of 127. Thus, as shown in FIG. 8, the cell having the origin 328 becomes the origin cell after this first decrementing. Consequently, the absolute X screen coordinate of the latter cell is suddenly moved 128 raster units to the right. However, because it is desired that the cell be moved only one raster unit to the right for this first sheet movement, it is necessary to substract from the X deflection register the contents of the MOVE X register which, as has been mentioned, has a value of 127 in order to cause a movement of one raster unit to the right. Stating this in another manner, the origin on the screen immediately jumps 128 raster units to the right but is brought back to the left 127 raster units to thereby provide a net movement of one raster unit to the right.

The same situation obtains if the sheet is caused to move upwardly with respect to the window. In this case, the origin cell having the origin 325 would be immediately replaced as the origin cell by the cell having the origin 326. The contents of the MOVE Y register would be 127 which would be substracted from the contents of the Y deflection register to give an upward movement of only one raster unit.

Further considering the operation, when the sheet is moved to the right one raster unit, the right-hand column of cells disappears from the screen because the column of cells immediately to the left of this right-hand column has encroached one raster unit in the X direction into its area. Similarly, were the sheet to be moved upwardly, the top row of cells in the window would disappear as soon as one raster unit of movement had occurred in the vertical direction. If movement of the sheet is started to the left, the left-hand column of cells disappears and if the sheet is moved downwardly, the bottom row of cells disappears. Thus, while the sheet is in movement, the size of the window is decreased by one column and one row. When movement of the sheet is halted by the resetting to zero of the MOVE X and MOVE Y registers, the display fills the entire window. Such movement is halted by throwing of suitable MOVE switches Off.

It can now be readily understood why the contents of the MOVE X and MOVE Y registers are substracted from the X and Y deflection registers when the sheet is either moved to the left or downwardly with respect to the window on the cathode ray tube screen. When the sheet is so moved, the original origin cell is retained during the first 127 raster unit movements. In this type of movement, the contents of the MOVE X and MOVE Y registers are successively incremented from their zero position. Consequently, it requires 128 increments before a carry occurs in either the X SHOR or Y SHOR registers. Thus, it could be stated that when the sheet is moved downwardly or to the left, a smooth transition between origin cells occurs and, when the sheet is moved upwardly or to the right, an abrupt change of origin cells occurs. It is readily appreciated that diagonal movements of the sheet are merely a combination of X and Y direction movements.

Figure 9:
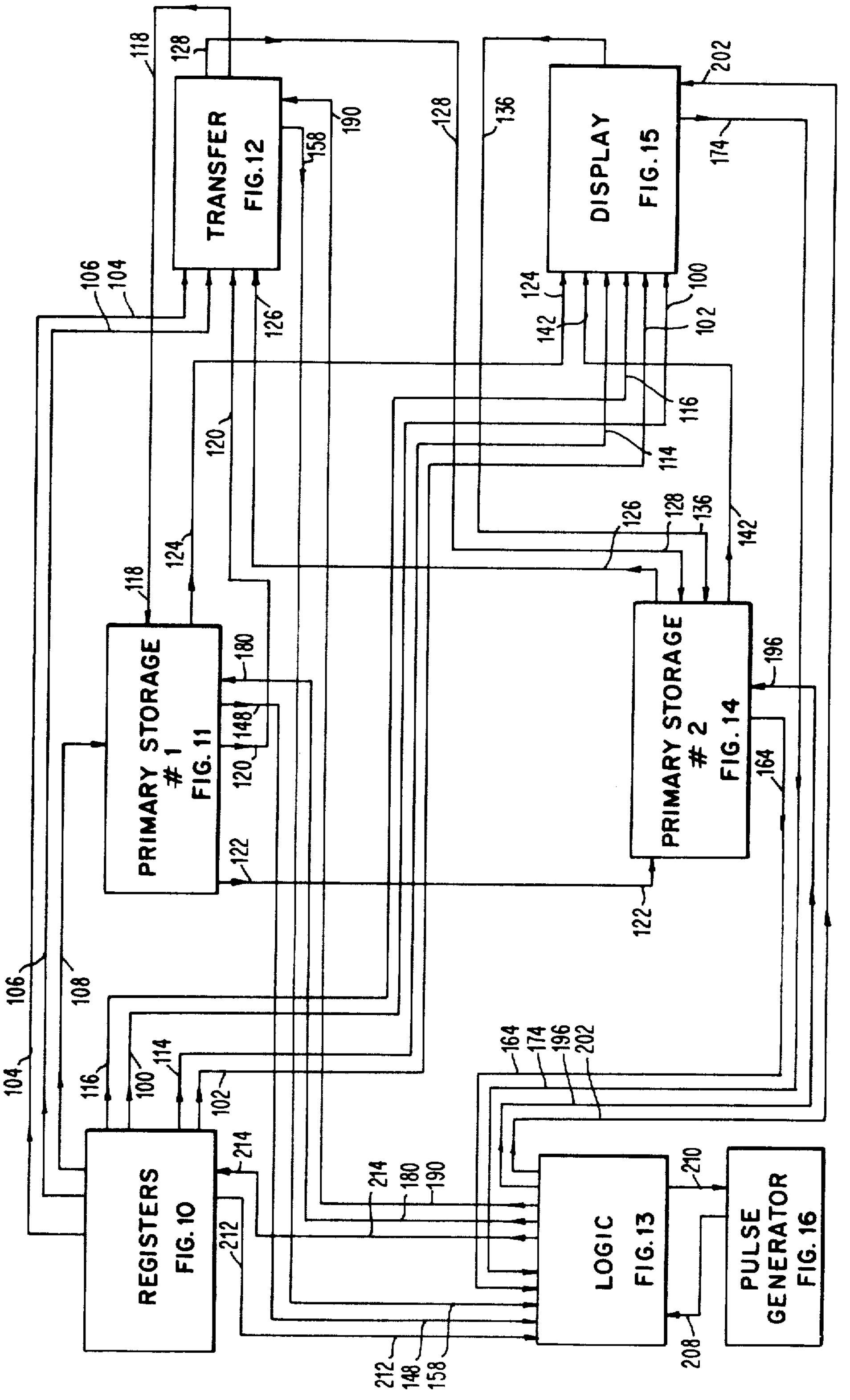
FIG. 9 is a block diagram of an embodiment constructed in accordance with the principles of the invention.

FIG. 9 is a block diagram which broadly illustrates the components of the embodiment constructed in accordance with the principles of the invention and shows the inter-relationship of these components. Each of the blocks in the diagram shown in FIG. 9 have indicated thereon the FIG. number wherein the block is depicted in relative detail. FIG. 9 also shows the various lines connecting these components.

Figures 10, 10A:
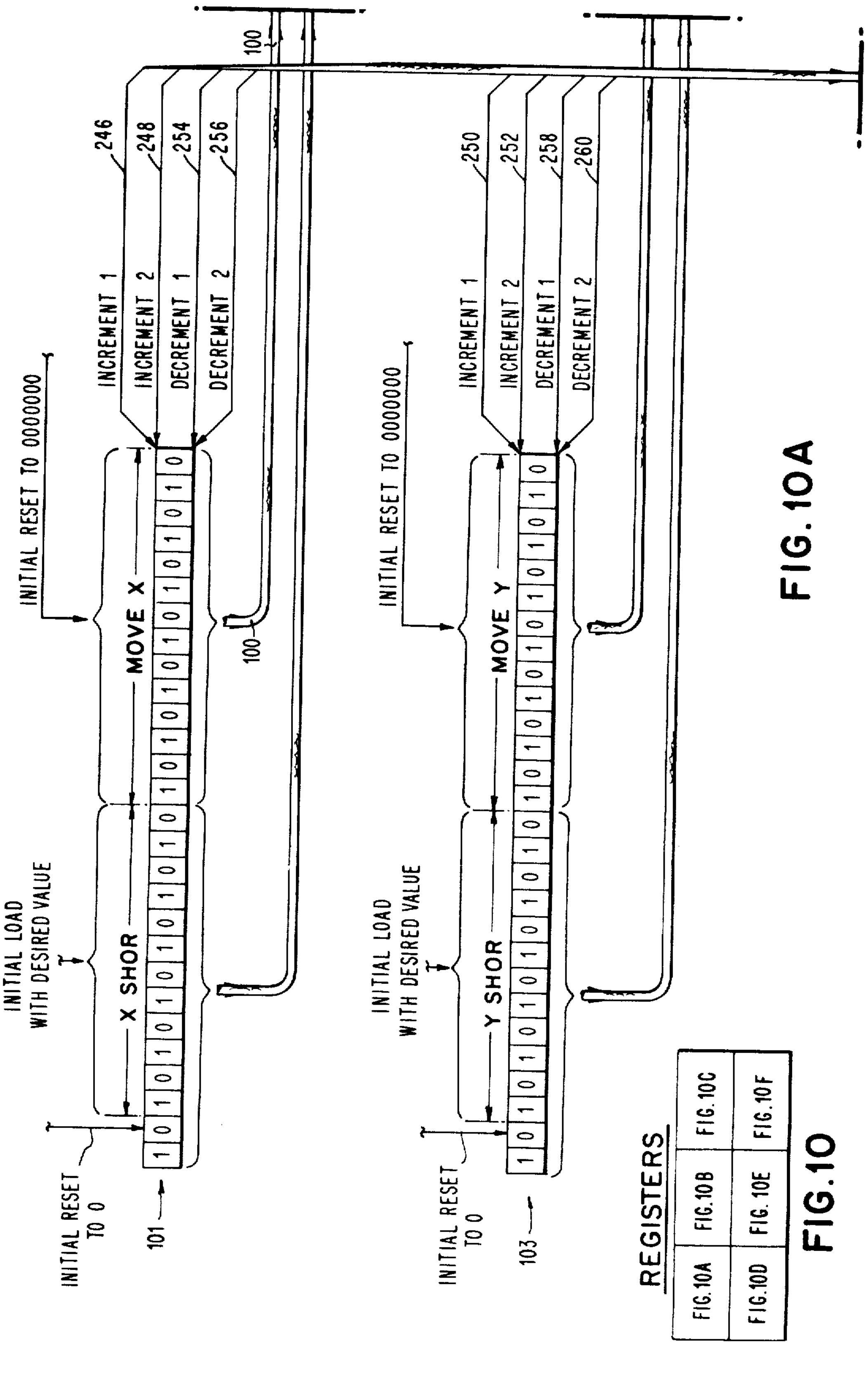
FIGS. 10A – 10F taken together as in FIG. 10 is a detailed diagram of the register stage shown in FIG. 9 and the circuit structures cooperating therewith.

Reference is now made to FIG. 10A to FIG. 10F, taken together as in FIG. 10 wherein there are shown the various registers employed in the embodiment, the components ancillary thereto, and the inter-relationship of these registers and components. In this figure, there is first described register 101 which comprises two portions, that designated X SHOR and that designated MOVE X. Register X SHOR, as has been mentioned above, is the register into which the X sheet coordinate of the origin cell is entered. As has been stated hereinabove, in the embodiment, there is made the assumption that the sheet coordinates can vary from 0 to 63 whereby the X SHOR register is shown as comprising six bits. The leftmost bit in the register 101 is employed as an overflow bit for the X SHOR register and is employed to indicate when the origin cell is decremented below zero or incremented above 63.

As shown, substantially the right half of register 101 constitutes the MOVE X register. The latter is the register which receives the increments or decrements for moving the sheet across the window in the X direction. In the illustrative embodiment, the MOVE X register is chosen to comprise seven bits to thereby accommodate quantities ranging from 0 to 127. Carries produced in the MOVE X register go into the X SHOR register and, correspondingly, the MOVE X register obtains borrows from the X SHOR register. Thus, for example, if the contents of the MOVE X register are at zero and it is decremented, the X SHOR register is decremented i.e., a borrow is taken from it by the MOVE X register. Similarly, if the MOVE X register is incremented from 127 to zero, a carry occurs which increments the value in the X SHOR register.

Also shown in FIG. 10A is the register 103 which, in turn, comprises the Y SHOR register in its left portion and the MOVE Y register in its right portion. The latter registers function in a manner corresponding to the functions of the X SHOR and MOVE X registers, and, of course, are concerned with the moving of the sheet in the Y direction.

Figure 10B:
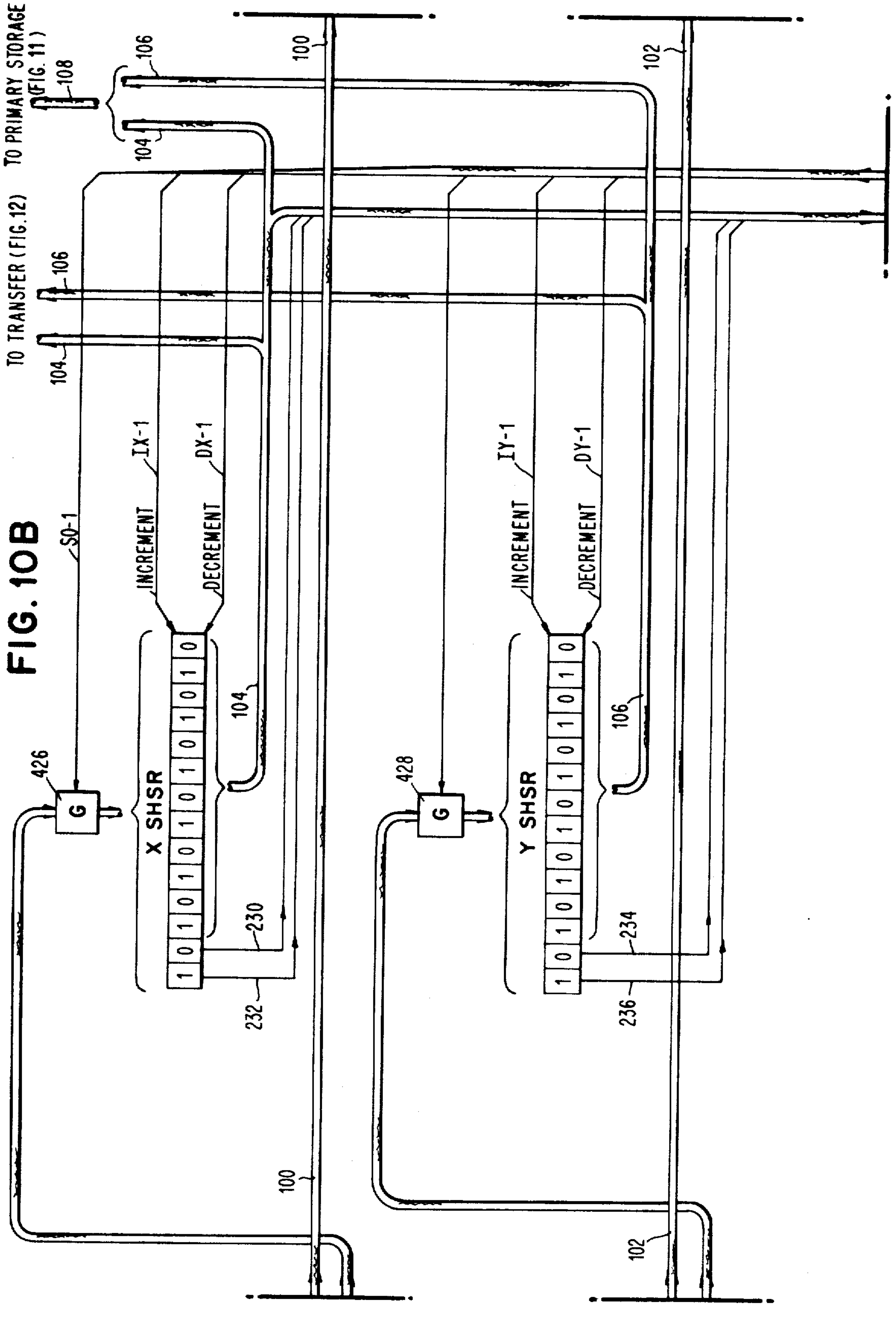
Figure 10C:
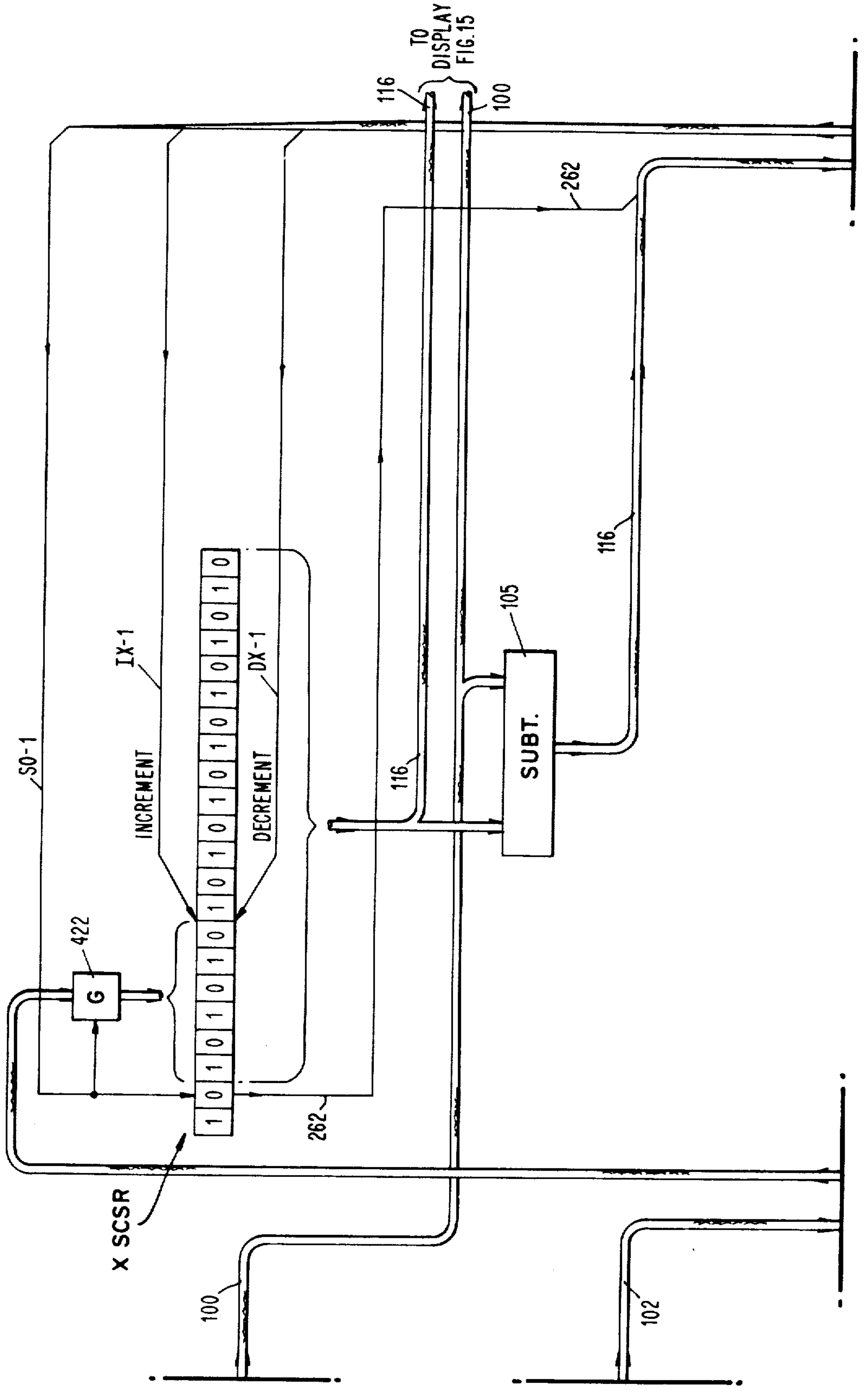
Figure 10D:
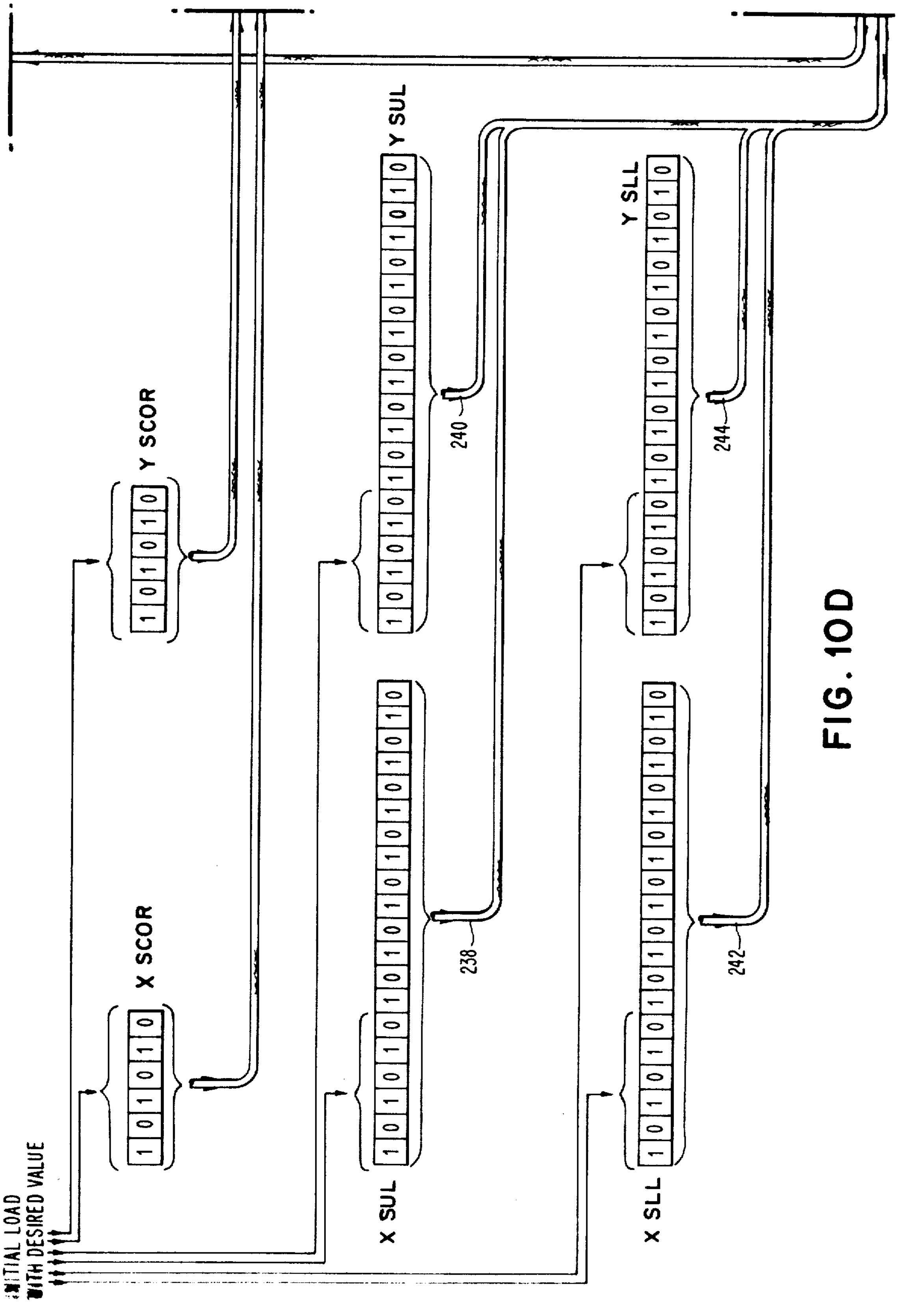

In FIG. 10D, there are shown the registers legended X SCOR and Y SCOR which respectively are mnemonics representing the terms X screen origin register and Y screen origin register. These registers are initially loaded with the X coordinate and the Y coordinate of the origin cell for the window on the screen.

The registers legended X SUL and Y SUL are loaded with the X and Y coordinates respectively of the upper limit cell on the screen window.

In FIG. 10D, the registers legended X SLL and Y SLL are loaded with the X and Y coordinates of the lower limit cell of the window on the screen. It is to be noted that the righthand seven bits of the ten-bit registers described hereinabove are permanently set to zero.

In FIG. 10B, there are shown the X SHSR (X sheet spiral) register and the Y SHSR (Y sheet spiral) register. These two registers contain the X and Y coordinates of the sheet origin cell which, as has been mentioned above, is the first cell to be considered in the spiral scan. It is noted that the X SHSR and Y SHSR registers are loaded from the X SHOR and Y SHOR registers. With such arrangement, each spiral scan starts with the common value of the contents of the X SHOR and Y SHOR registers.

Figure 10E:
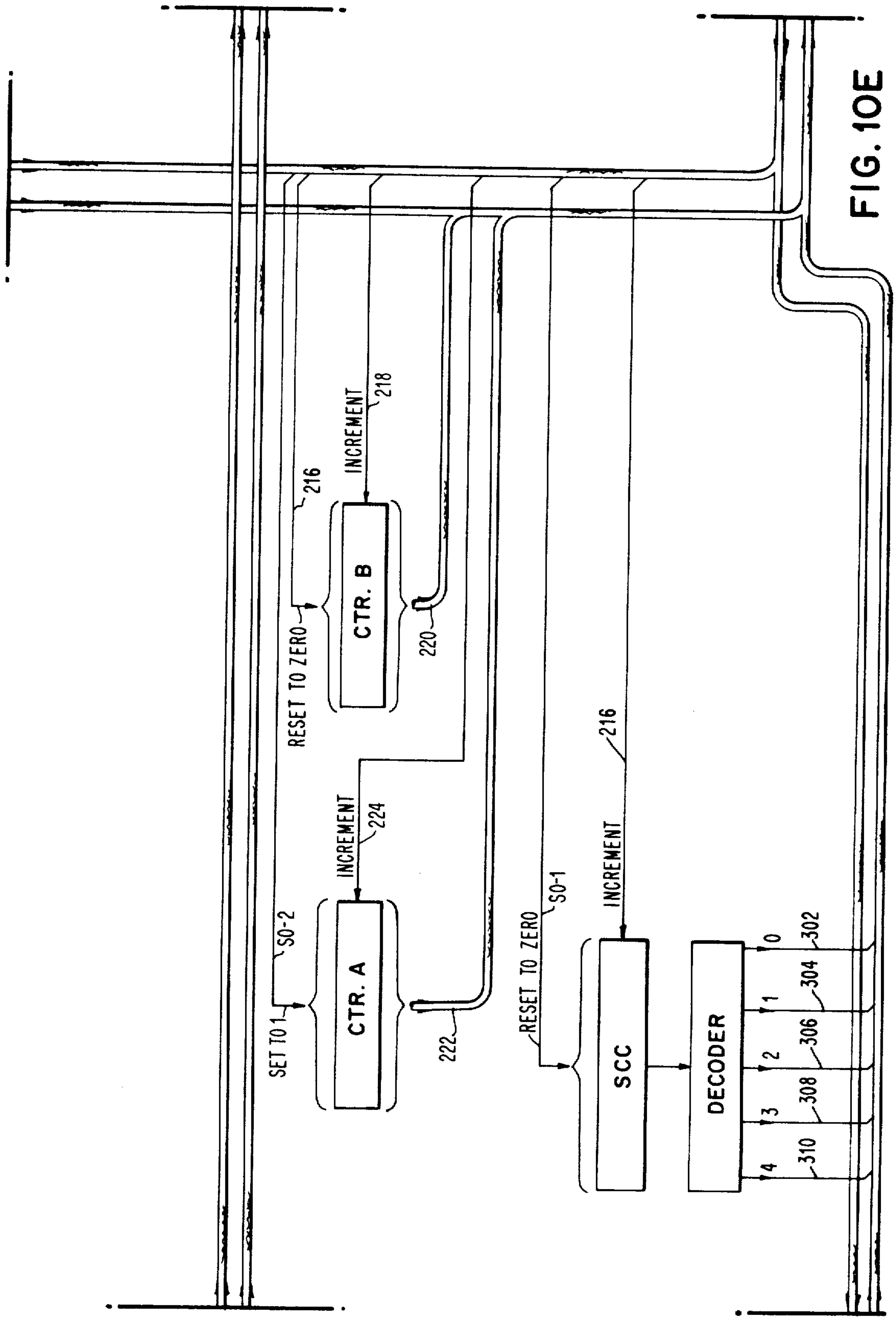

In FIG. 10E, there are shown the counters A and B, the latter counters controlling the spiral scan. The counter legended SCC (spiral control counter) controls the branching from either the decision microprogram or the swap microprogram back to the decrementing or incrementing microprograms which are used in proceeding through the spiral scan. The operation of the SCC counter is further explained hereinbelow in conjunction with FIG. 17.

Figure 10F:
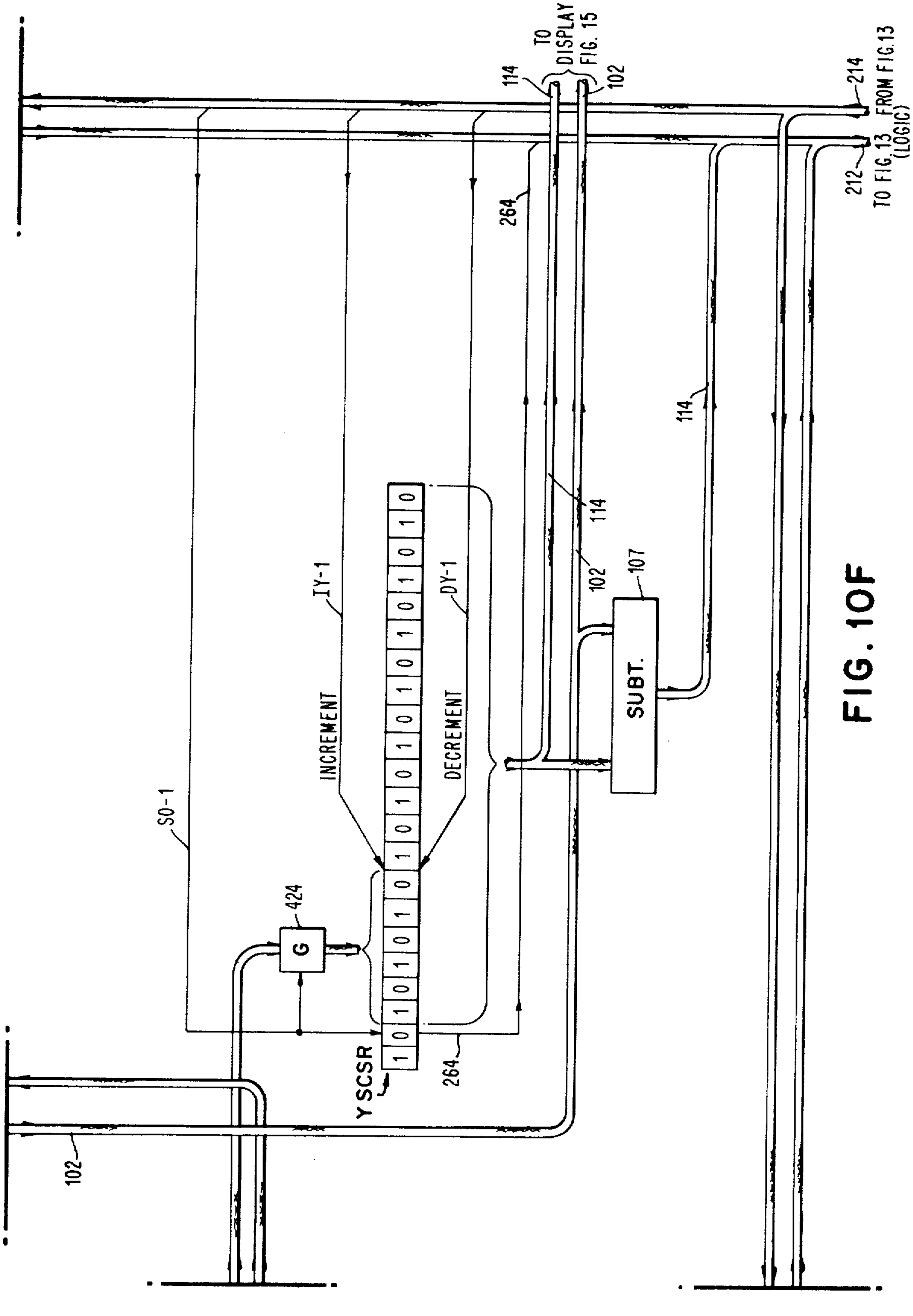

In FIG. 10C, there is shown the X SCSR (X screen spiral) register and in FIG. 10F there is shown the Y SCSR (Y screen spiral) register. These two registers contain the X and Y screen coordinates of the origin cell on the window. It is necessary in the operation of this embodiment to load these two registers with the values of the contents contained in the X SCOR and Y SCOR registers (FIG. 10D) and to also reset the overflow bits of registers X SCSR and Y SCSR to zero. It is to be noted that the X SCSR and Y SCSR registers can be incremented or decremented and that this incrementing or decrementing occurs in the bit positions. Accordingly, considering these registers as a whole, they are either incremented or decremented by 128 to correspond with the fact that each cell comprises 128 raster units. It is to be noted that the outputs of registers X SCSR and Y SCSR provide an input to respective subtract units 105 and 107. The values which are subtracted from each of these registers are the respective contents of the MOVE X and MOVE Y registers. With such arrangement, the true or real origin of the cell to be displayed on the screen can be determined and such value is compared with the X and Y upper and lower limits to determine whether the cell is or is not to be displayed. Thus, clearly, if the outputs of subtract units 105 and 107 indicate that either the X or Y coordinate of the cell is outside the boundary of the window, it is not to be displayed.

Figure 11:
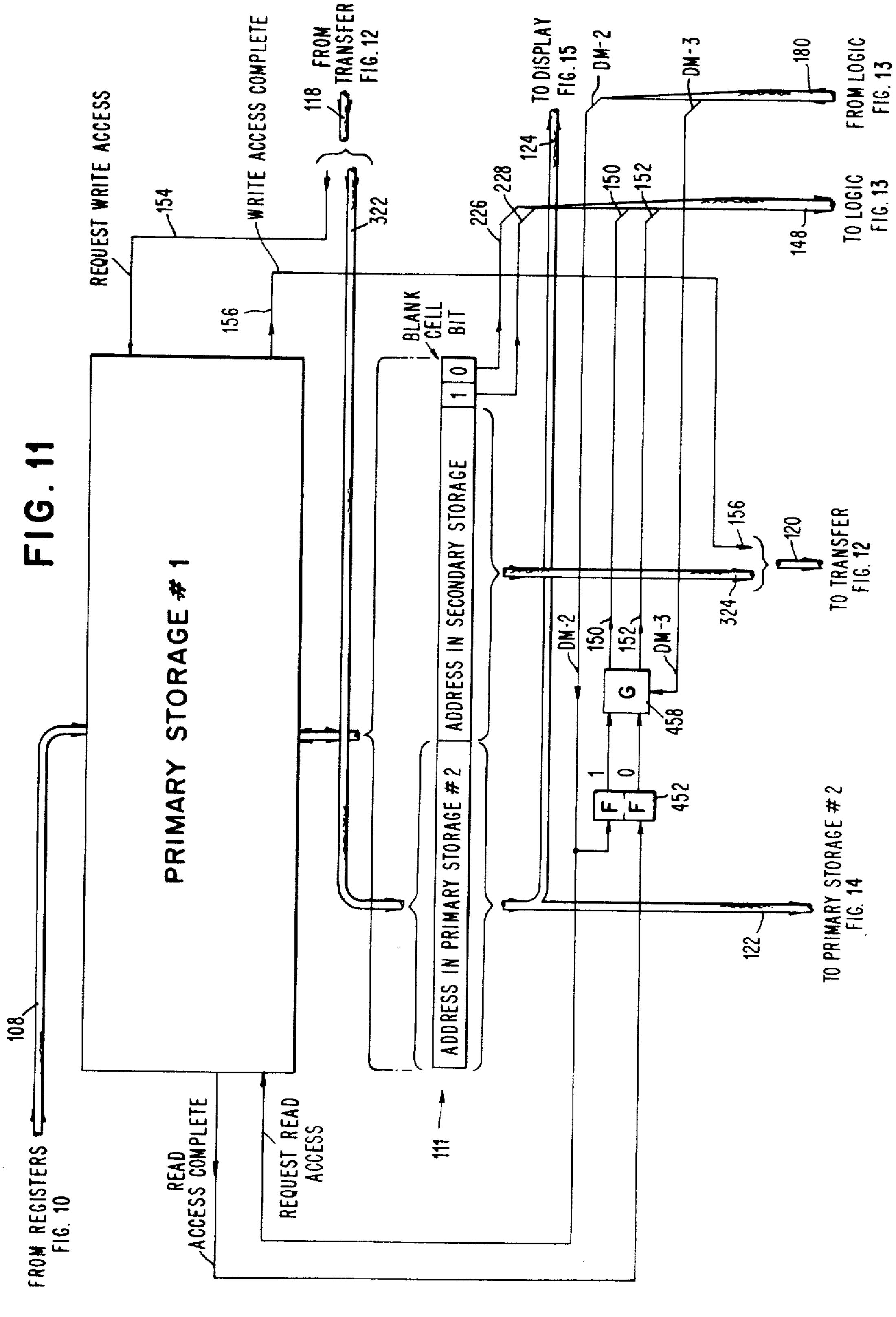
FIG. 11 is a diagram of the stage legended Primary Storage No. 1 in FIG. 9 and the control devices associated therewith.
Figure 14:
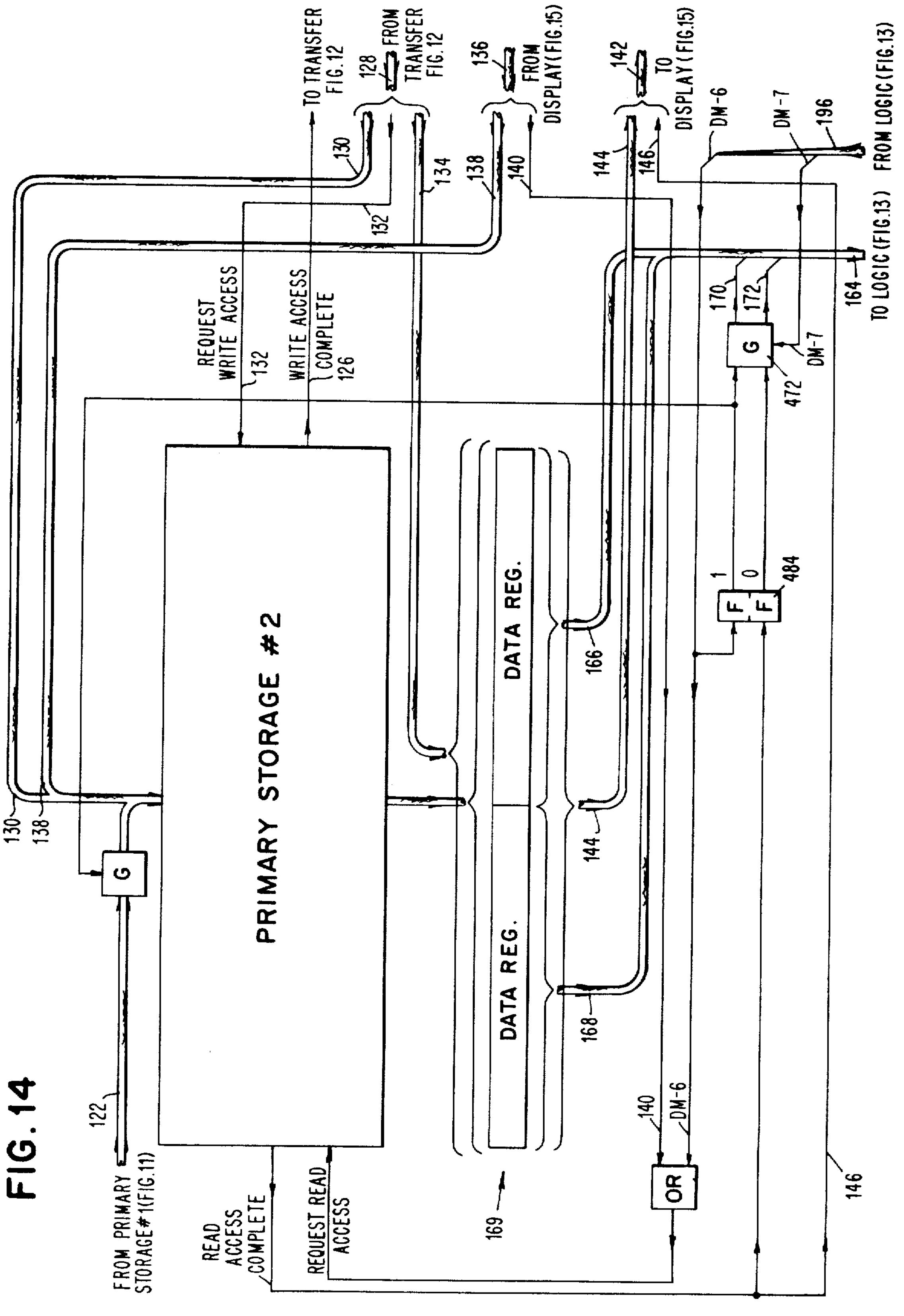
FIG. 14 is a diagram of the stage legended Primary Storage No. 2 in FIG. 9 and the control devices associated therewith.

Reference is now made to FIG. 11. It is noted that there is set forth therein a stage legended Primary Storage No. 1. In FIG. 14, there is shown a stage legended Primary Storage No. 2. Such legending separation has been done for convenience of description and explanation of the embodiment. In an actual application, primary storage 1 and primary storage 2 refer to sections of the computer memory 33 as shown in FIG. 2. Primary Storage No. 1 is addressed by the contents of registers X SHSR and Y SHSR (FIG. 10B), the addressing being accomplished via cables 104 and 106 which join to become cable 108, cable 108 terminating at primary storage No. 1. Primary storage No. 1 is chosen to have, at least, sufficient capacity to hold a word for each cell on the sheet. Thus, for example, if a sheet is considered to be made up of 64 × 64 cells, then primary storage No. 1 has to be capable of accommodating 4,096 words. Each word stored in primary storage No. 1 contains the address of the cell in primary storage No. 2, provided that the cell exists in primary storage No. 2. In addition, each word in primary storage No. 1 also contains the address in secondary storage such as on disc for the particular cell and a bit which indicates whether or not the cell is blank. As will be further shown hereinbelow, the latter bit is set to 1 when a cell is blank, i.e., is actually not stored in secondary storage. The bit is set to 0 for a cell containing graphic information, such type cell being stored in secondary storage.

The address in primary storage No. 2 can be made available on a cable 122, the latter cable being employed to address primary storage No. 2. The address in primary storage No. 2 is also available on a cable 124 which connects to the display unit.

Figures 12, 12A:
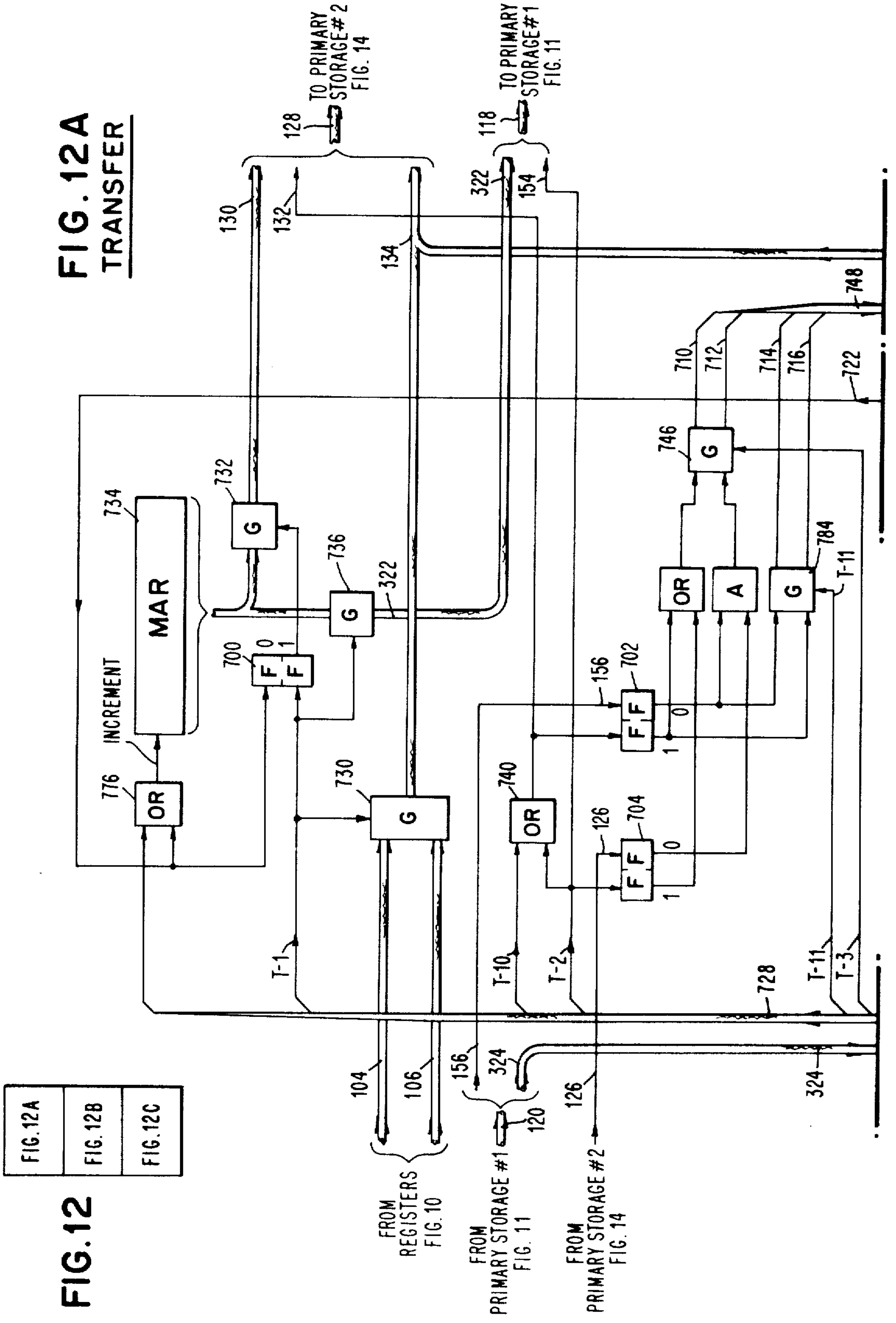
FIGS. 12A-12C, taken together as in FIG. 12 is a diagram which illustrates the transfer stage shown in FIG. 9, the latter effecting the transfer of information from secondary storage to primary storage No. 1.

As can be noted in FIG. 11, the address for primary storage No. 2 is loaded into the data register 111 for primary storage No. 1 by a cable 322 which comes from the transfer unit (FIG. 12). The transfer unit contains an address register which is employed to assign addresses in primary storage No. 2 for each cell on the sheet as it is transferred from secondary storage to primary storage. The address in secondary storage is also available to the transfer unit through a cable 120.

Figure 12B:
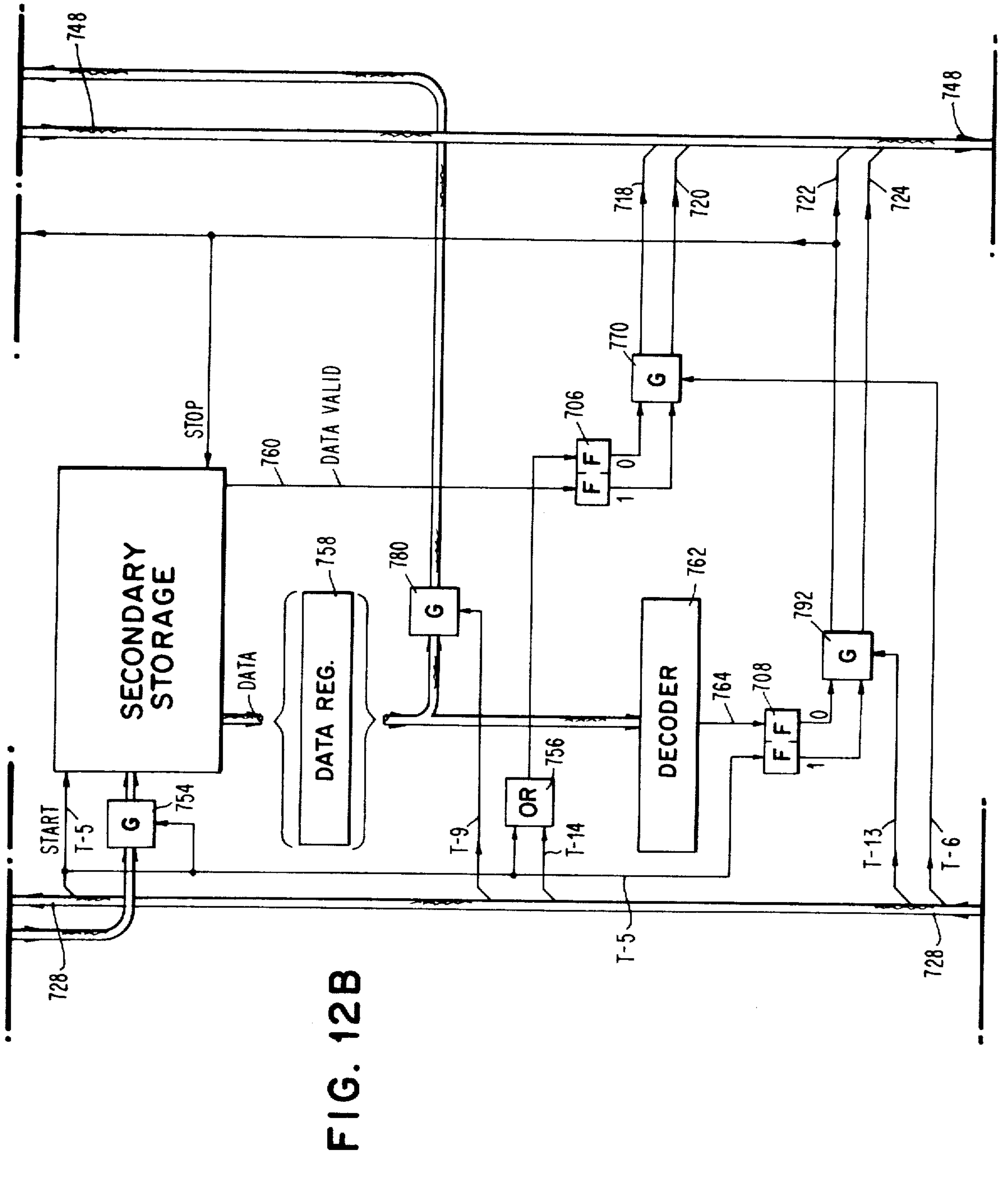
Figure 12C:
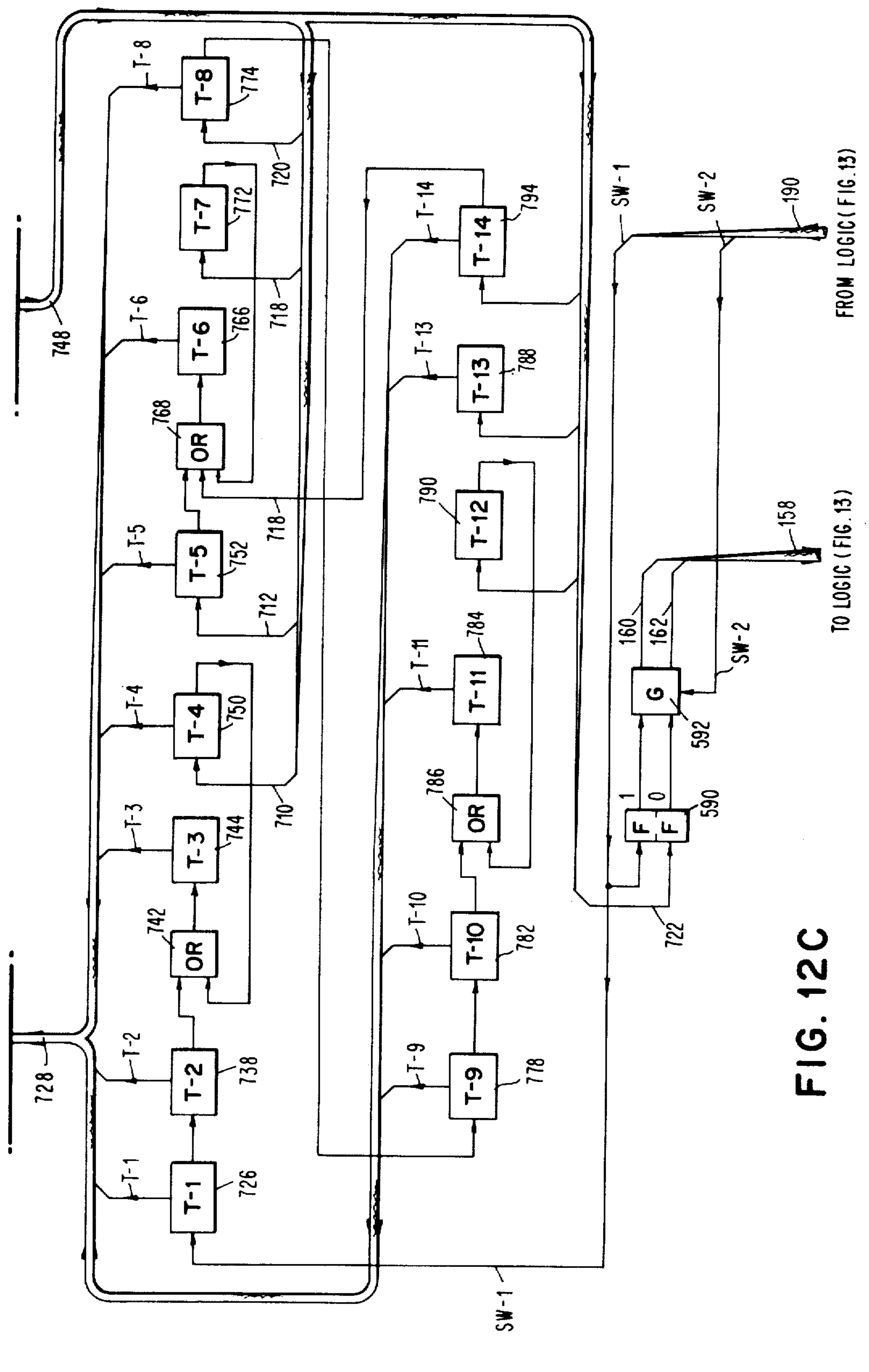

Reference is now made to FIGS. 12A–12C, taken together as in FIG. 12 wherein there is shown the transfer unit. The transfer unit is operative when it is desired to display a cell which is not in primary storage. In this situation, the transfer unit obtains the address in secondary storage for the desired cell and assigns it an address in primary storage No. 2 where the record constituting this cell is to be placed in primary storage No. 2. The first word in this record is the name of the cell, i.e., its X and Y sheet coordinates. The words following the name for the record consists of the display orders which appear sequentially after the first word. The last word in the record is chosen to be a symbol which indicates that it is such last word. The structure of the transfer unit is further explained hereinbelow.

Referring to FIG. 14, there is shown therein primary storage No. 2 and its interrelationship with associated structures in the embodiment. Primary storage No. 2 can be addressed from three different locations. Thus, one address can come from primary storage No. 1 through cable 122. A second address can come from the transfer unit through cable 130 and a third address can come from the display unit through a cable 138. In the situation where primary storage No. 2 is accessed by cable 122 from primary storage No. 1, the first word read into the data register 169 of primary storage No. 2 will contain, if the cell is in primary storage, the X and Y sheet coordinates of the cell which it is desired to be displayed. After this first access, the contents of data register 169 are compared with the contents of the X SHSR and Y SHSR registers (FIG. 10B). If, as a result of these comparisons, an agreement exists, it is then known that the desired cell is in primary storage. The control can then be transferred to the display apparatus which continues to access primary storage No. 2 using succeeding words for display purposes. In the event that the desired cell is not in primary storage No. 2, then control has to be transferred to the transfer unit (FIG. 12), in order to transfer the cell from secondary storage to primary storage No. 2. In this connection, it is to be noted, that primary storage 02 may be chosen to be a separate memory unit of the wrap around type. In the latter type of memory, addresses are assigned by a memory address register which is located in the transfer unit and which operates in a modulo manner. Because of this construction, the oldest cells in primary storage No. 2 can be overwritten by new cells as they are desired.

Figure 15:
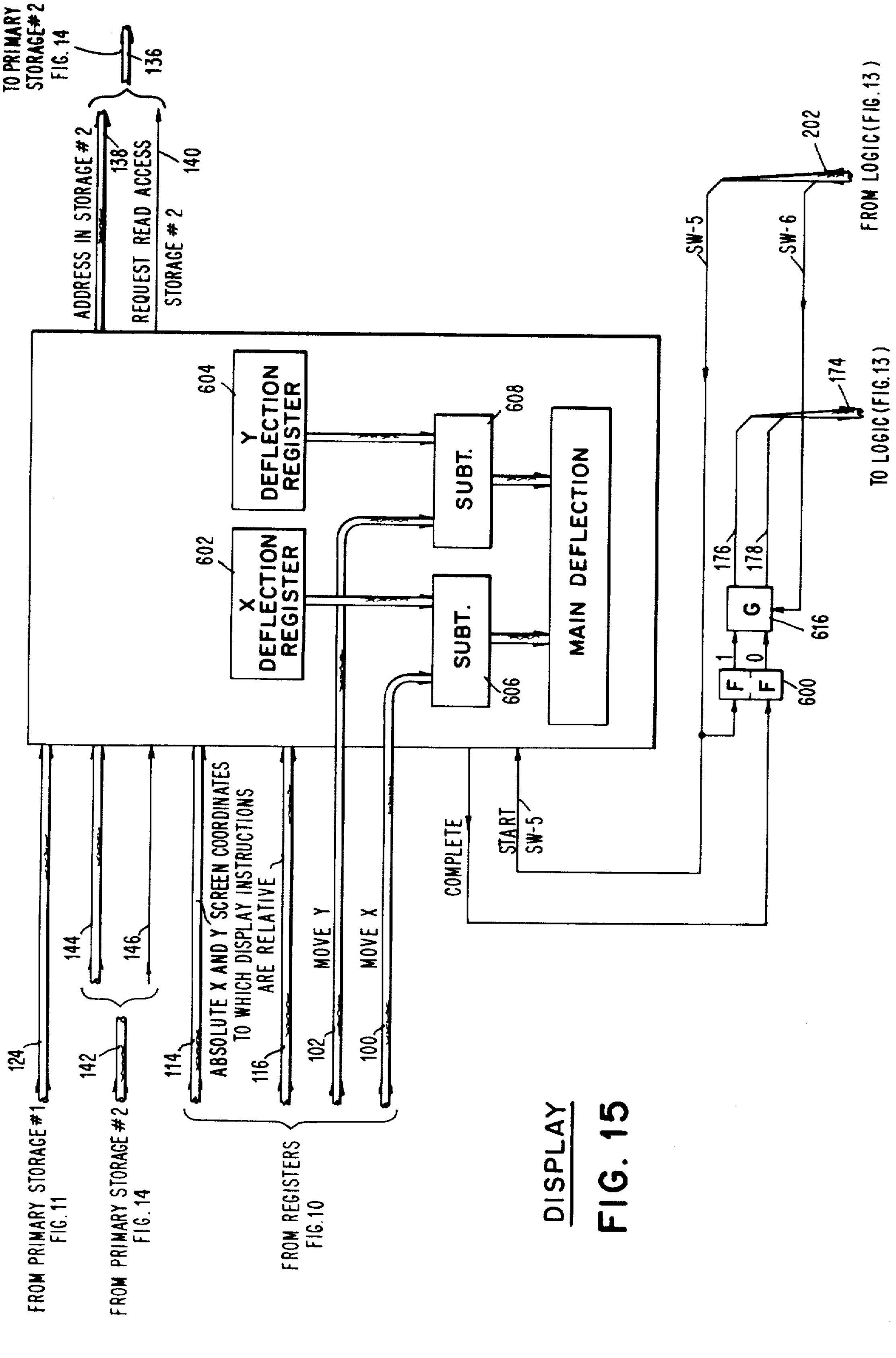
FIG. 15 is a diagram of a portion of the display apparatus suitable for use with the invention, such apparatus being of the type shown in FIG. 2.

In FIG. 15, there is shown a detail of the display unit of FIG. 2 with its inputs and outputs, FIG. 15 can be considered supplementive to FIG. 2 in that, in FIG. 15, there are also included subtract units 606 and 608 whereby the MOVE X and MOVE Y values on cables 100 and 102, respectively, can be subtracted from the X and Y deflection registers 602 and 604. When it has been determined that a cell is to be displayed on the screen, the control is transferred to the display unit which operates in conjunction with primary storage No. 2 to extract the display orders as needed and execute them on the screen of the cathode ray tube. When a cell has been completely displayed, control is then returned to the spiral scanning mechanism as described in this embodiment.

Figure 16A:
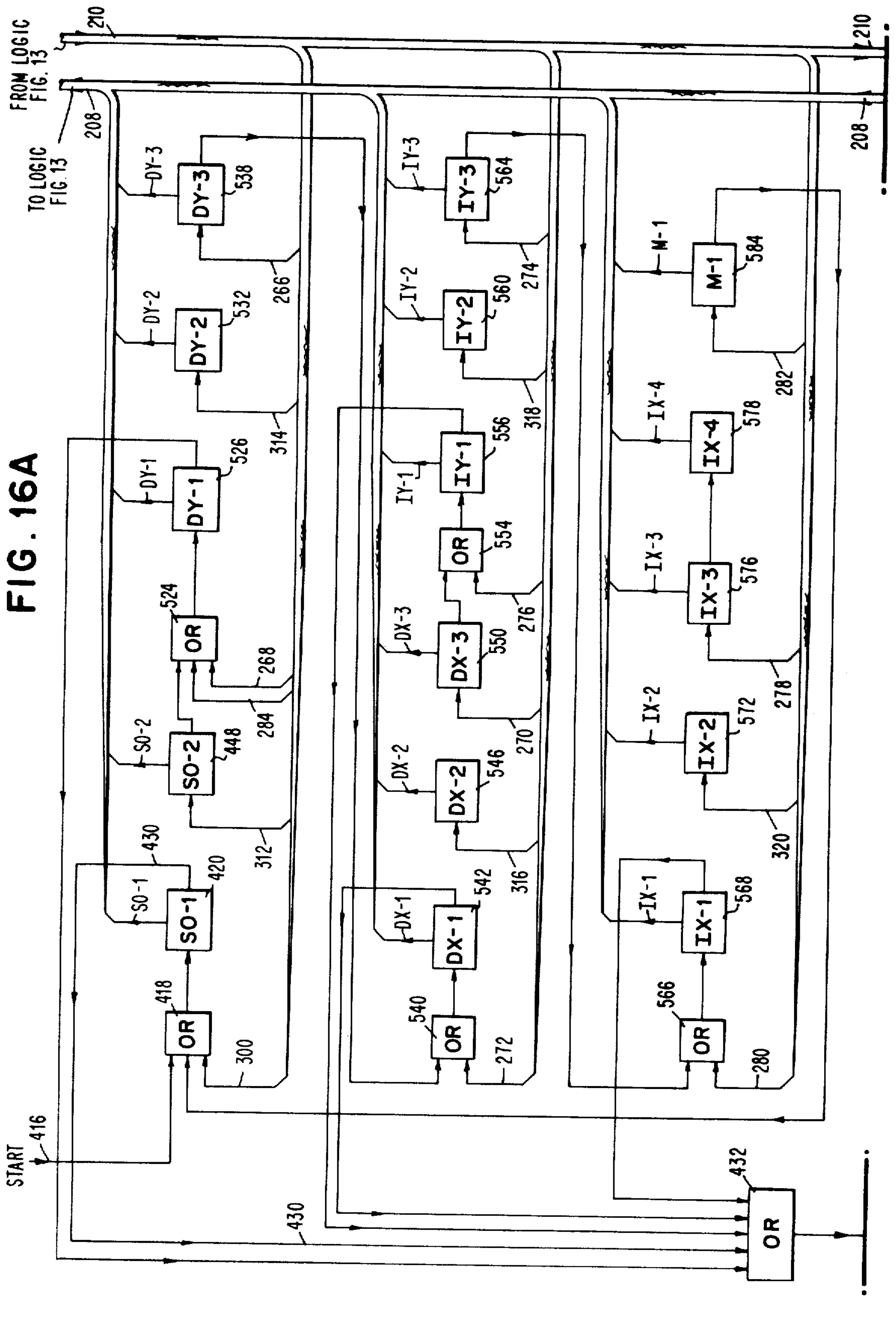
Figure 17:
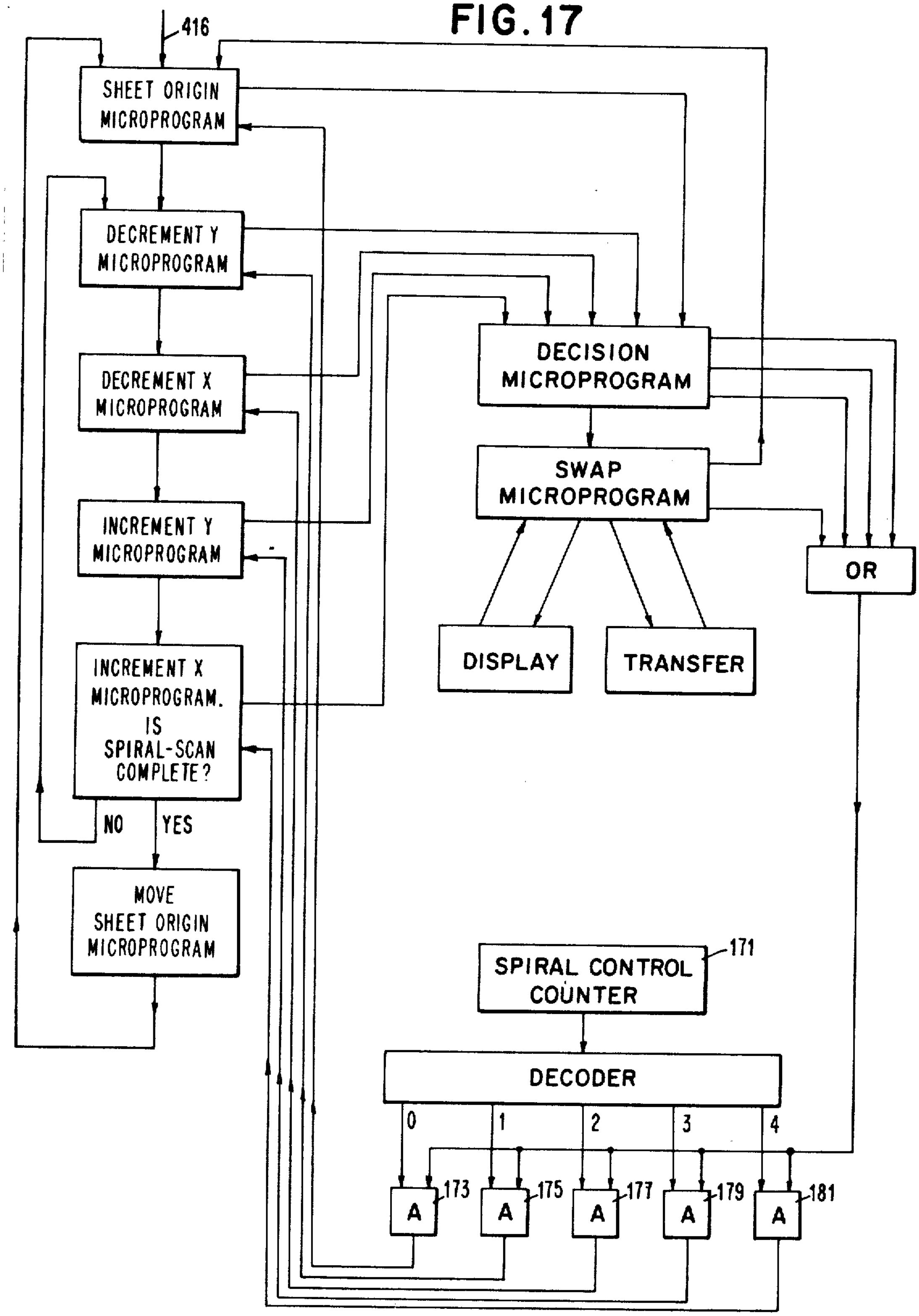
FIG. 17 is a flowchart of the various microprograms which are employed to effect the operation of the illustrative embodiment.

In the operation of this embodiment, there are utilized the eight microprograms shown in FIG. 17. These microprograms are as follows: sheet origin, decrement Y, decrement X, increment Y, increment X, move sheet origin, decision, and swap. Each of these microprograms are under the control of a particular pulse generator as shown in FIG. 16. The pulse generators utilized essentially comprise a series of successively arranged monostable multivibrators. A monostable multivibrator can be triggered to its ON state by the reverting to the OFF state of a preceding monostable multivibrator or by some other pulse, generated for the triggering purpose. In FIG. 16, there are shown the pulse generators, i.e., the microprogram clocks.

In FIG. 17, it is noted that the operational sequence starts with the sheet origin microprogram. This microprogram begins the spiral scan. At a point near the middle of the sheet origin microprogram, a branch is made to the decision microprogram, the purpose of this branch being to determine whether or not the sheet origin cell is to be displayed. It is also to be noted that, at the beginning of the spiral scan, the spiral control counter 171 is always reset to zero. Thus, if the sheet origin cell is to be displayed, it must then be determined as to whether or not this cell is in primary storage. If it is not in primary storage, then the decision microprogram branches to the swap microprogram which, in its execution, calls on the transfer unit to place the desired cell into primary storage. When the latter operation is completed, the determination is made as to whether the cell is to be displayed.

If the cell is to be displayed, the swap microprogram then branches to the the display unit. After the latter branch, control is returned to the swap mechanism and the program then branches back to the sheet origin microprogram. In this latter connection, if the cell is to be displayed, then the program branches through one of the AND circuits 173, 175, 177, 179, 181, these AND circuits being controlled by spiral control counter 171. The reason for enabling the swap mechanism to branch directly back to the sheet origin microprogram is to ensure that only one swap of a cell is permitted during each spiral scan. Such enabling is provided because an appreciable time is required for the swap and it is desired to immediately return to the display in order to maintain pictorial material on the screen of the cathode ray tube.

The illustrative embodiment of the invention is designed such that a picture would gradually build up on the screen until the window is completely filled with cells and a sufficient area outside the window has been swapped from secondary to primary storage. Thereafter, as the picture is moved relatively slowly across the screen, sufficient cells adjacent to the window cells will be in primary storage whereby no appreciable interruption of the display occurs as the sheet is moved pass the window.

At the completion of the sheet origin microprogram, there is then executed the decrement Y microprogram. As can be seen in FIG. 17, a branch can be made from this microprogram to the decision microprogram in order to display a cell or not as desired.

At the completion of the decrement Y microprogram, the decrement X microprogram is executed and, as with the decrement Y microprogram, the branch can also be made from the decrement X program to the decision microprogram for display purposes if it is so desired.

After the decrement X microprogram has been completed, the sequence proceeds to the increment Y microprogram and from there to the increment X microprogram. At the completion of the increment X microprogram, a test is made to ascertain whether the spiral scan is complete. Such test is made by a spiral limit counter. If the latter test reveals that the spiral scan is not complete, then the sequence reverts back to the decrement Y microprogram. However, if the test shows that the spiral scan is complete, then the sequence advances to the move sheet origin microprogram which increments the MOVE X and MOVE Y registers (FIG. 10A). From the move sheet origin microprogram, the sequence reverts back to the sheet origin microprogram. In this connection, it is to be realized that the move sheet origin microprogram may specify a new sheet origin cell which is the cell that becomes the sheet origin cell the next time that the sheet origin microprogram is executed.

It is to be noted that, at the completion of the increment X microprogram, when the spiral limit counter is tested that, if such test does not produce an agreement, the program branches back to the decrement Y microprogram.

At this point in the description, there are now set forth the operations respectively of the various microprograms as controlled by their microprogram clocks.

The first microprogram to be described is the sheet origin microprogram. This microprogram is initiated by a pulse which is applied to a line 416 (FIG. 16A). The pulse on line 416 passes through an OR circuit 418 and triggers a monostable multivibrator 420 to produce the SO–1 pulse. The SO–1 pulse is conveyed by a cable 208 to a cable 214 from which it is applied to a gate 422 (FIG. 10C) to gate the contents of the XSCOR register to the XSCSR register, the SO–1 pulse concurrently setting the overflow bit of the XSCSR register to its 0 state. In addition, the SO–1 pulse is applied to a gate 424 (FIG. 10F) to gate the contents of the YSCOR register to YSCSR register, the overflow bit of the YSCSR register being set to its 0 state by the SO–1 pulse. The SO–1 pulse is also applied to gates 426 and 428 (FIG. 10B), to effect the transferring of the contents of the XSHOR register to the XSHSR register and the YSHOR register to the YSHSR register. The SO–1 pulse is also employed to reset the SCC counter (FIG. 10E) to 0. When monostable multivibrator 420 reverts to its OFF state, there is produced a pulse on a line 430, this pulse passing through an OR circuit 432 and being employed to trigger to the ON state, a monostable multivibrator 434 to initiate the operation of the decision microprogram.

Figures 13, 13E:
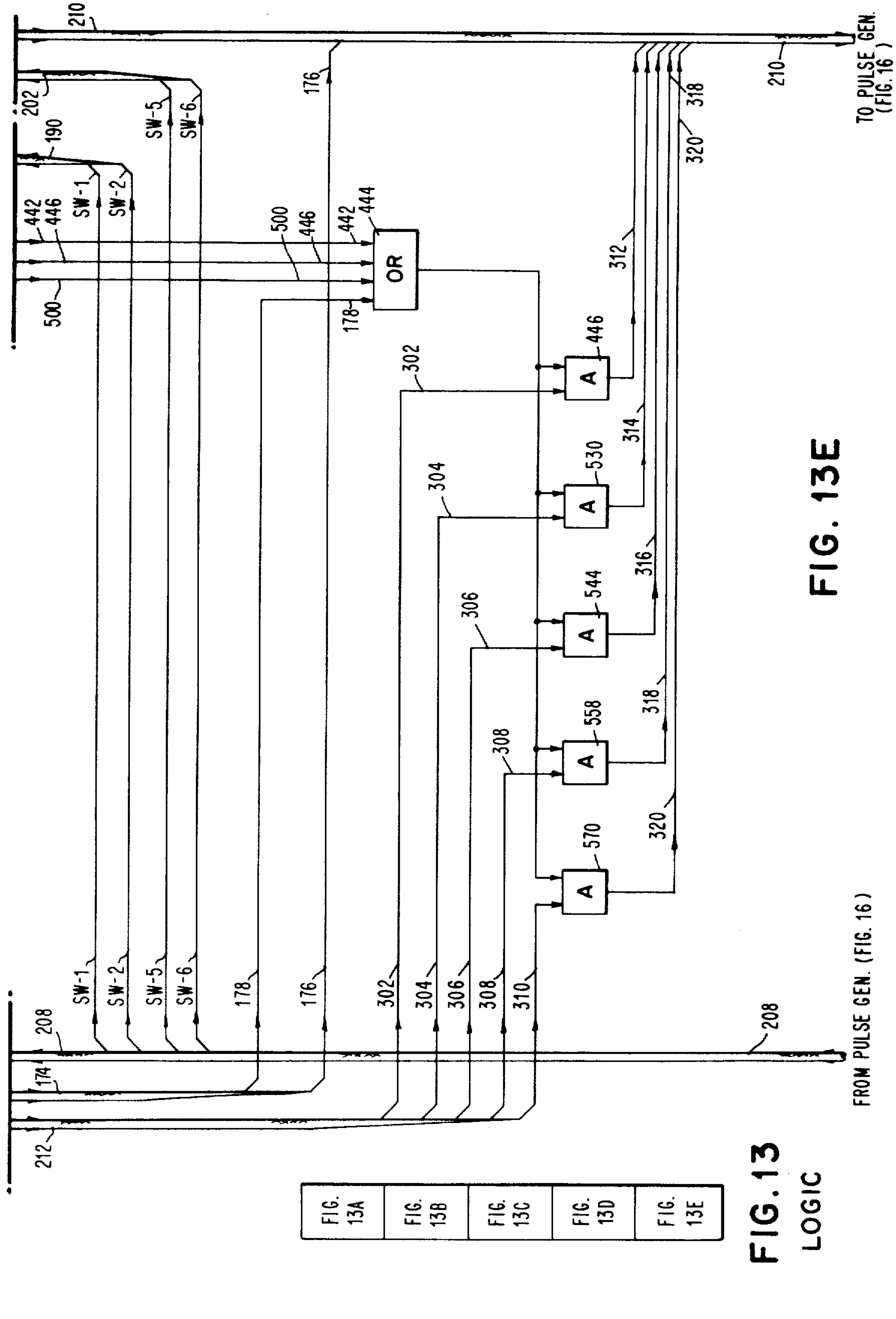
FIGS. 13A – 13E taken together as in FIG. 13 constitute a diagram of the logic stage shown in FIG. 9.
Figure 13A:
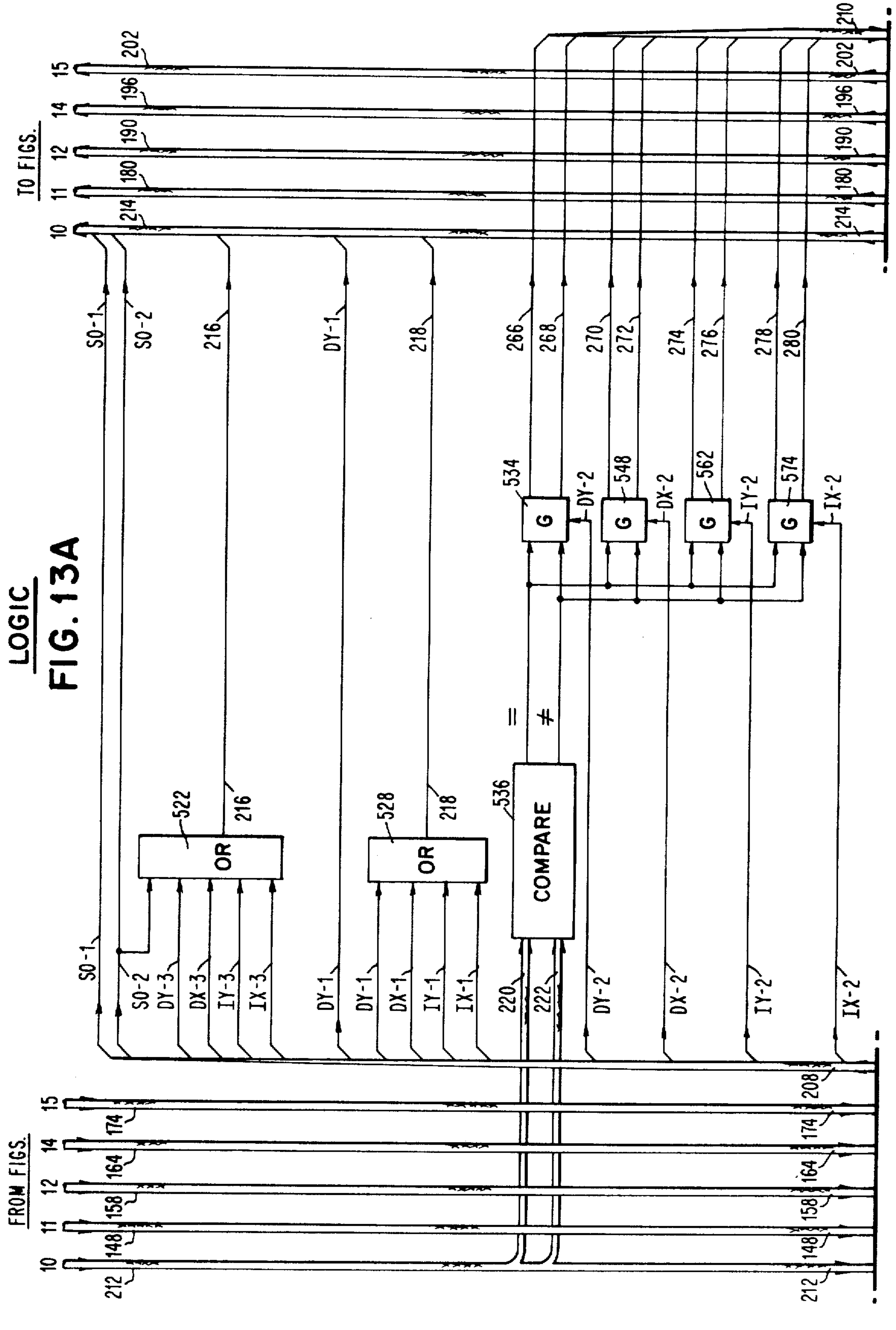
Figure 13B:
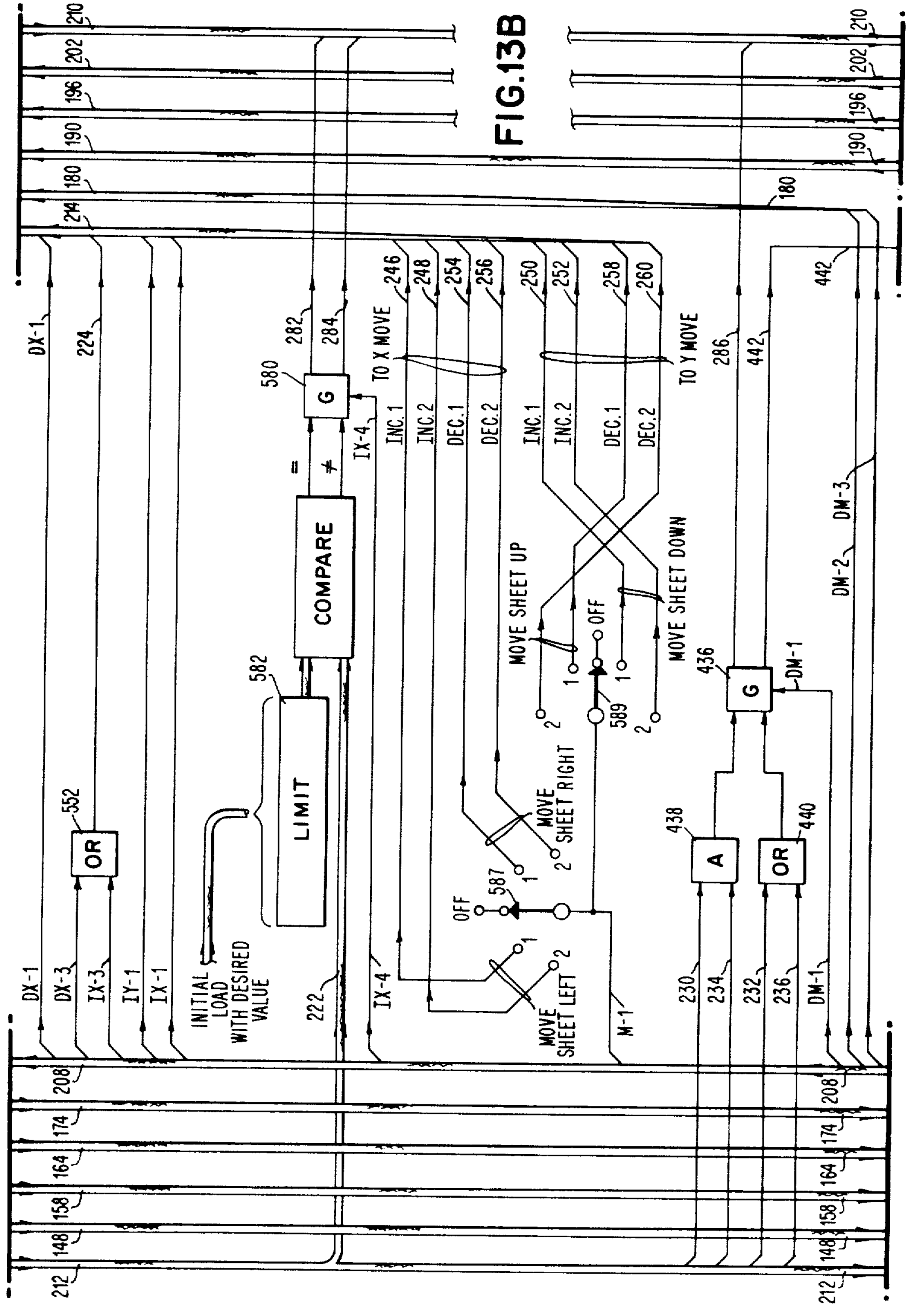

The DM-1 pulse produced as a result of the triggering of monostable multivibrator 434 appears on cable 208 and is applied thereby to a gate 436 (FIG. 13B).

The AND circuit 438 is enabled when both of the overflow bits of the XSHSR and YSHSR registers are in their 0 states. The OR circuit 440 produces an output if either of the overflow bits of the XSHSR and YSHSR registers are in their 1 state. Thus, a line 286 (FIG. 13B) will be active if both of the overflow bits in the XSHSR and YSHSR registers are at 0. Similarly, a line 442 will be active if either of the overflow bits of the XSHSR and YSHSR registers are in their 1 states. If line 442 is active, this signifies that the origin is off the sheet and therefore need not be displayed. The pulse on line 442 passes through an OR circuit 444 and an AND circuit 446 (FIG. 13E) to a line 312 which extends via a cable 210 to trigger a monostable multivibrator 448 (FIG. 16A) in the SO clock. With this arrangement, the program is returned back to the sheet origin microprogram. An AND circuit 446 (FIG. 13E) is enabled by the active state of a line 302, line 302 being active at this juncture because the SCC counter is set to 0 at this time. Thus, when a gate 436 (FIG. 13B), is tested to activate line 286, the latter active state extends through a cable 210 whereby the pulse on line 286 is employed to trigger a monostable multivibrator 450 in the DM clock. The triggering of monostable multivibrator 450 produces the DM–2 pulse which appears on cable 208 and thereafter on cable 180. Pulse DM–2 is employed to request a read access to primary storage 1 (FIG. 11) and also to set the flip-flop 452 (FIG. 11) to its 1 state.

When monostable multivibrator 450 reverts to the OFF state, a signal is produced which is transmitted through an OR circuit 454 to trigger a monostable multivibrator 456 to thereby produce the DM–3 pulse. The DM–3 pulse appears on cable 208 and then on cable 180 from which it is applied to a gate 458 (FIG. 11) to test for the state of flip-flop 452. If the latter test indicates that flip-flop 452 is in its 1 state, then a signal appears on a line 150. However, if the test shows that flip-flop 452 is in its 0 state, then a signal appears on a line 152. Lines 150 and 152 extend via a cable 148 to enter cable 210. The signal on line 150 is operative to trigger a monostable multivibrator 460 (FIG. 16B) to produce the DM–4 pulse, the DM–4 pulse being used for delay purposes only. At the termination of the DM–4 pulse, monostable multivibrator 456 is again triggered through OR circuit 454.

Figure 13C:
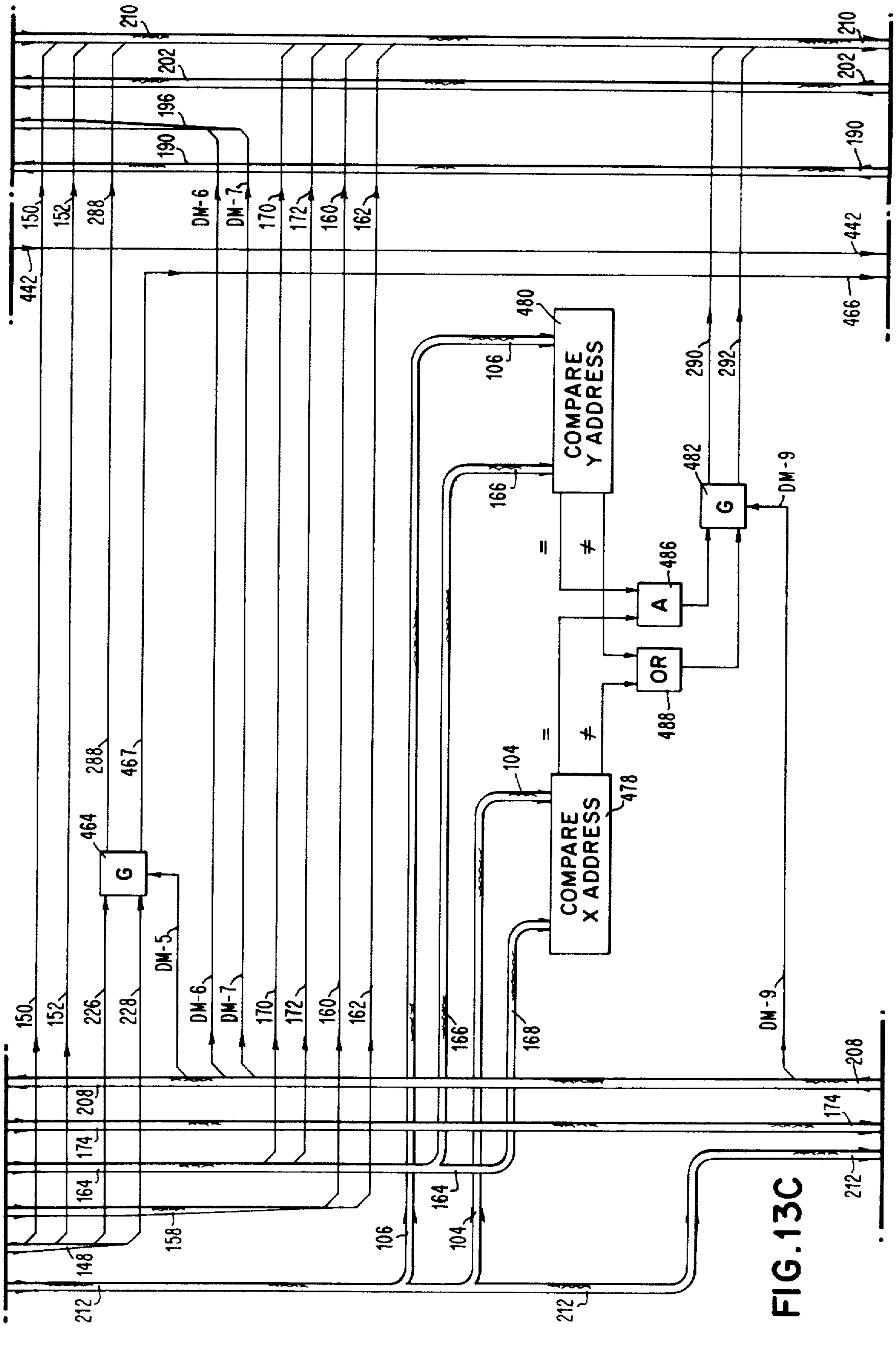

The signal on line 152 is employed to trigger a monostable multivibrator 462 to produce the DM–5 pulse. The DM–5 pulse appears on cable 208 and is applied to a gate 464 (FIG. 13C). The actuation of gate 464 is to test for the states of lines of 226 and 228 which are in a cable 148. If the blank cell bit is in its 1 state, line 228 is active and, consequently, a signal appears on a line 466 which passes through an OR circuit 444 and AND circuit 446 to a line 312 which is in cable 210, the signal on line 312 being employed to trigger the monostable multivibrator 448 (FIG. 16A) in the SO clock. With the arrangement as just described, the decision microprogram is terminated in the situation where the blank cell bit is in its 1 state.

If the blank cell bit is in its 0 state, then line 226 is active and a signal appears on a line 288 which is employed to trigger a monostable multivibrator 466 to produce the DM–6 pulse. The DM–6 pulse is conveyed by cable 208 and a cable 196 to request a read access (FIG. 14) and also to set flip-flop 484 to its 1 state. When monostable multivibrator 466 goes OFF, a signal is produced which is transmitted through OR circuit 468 to trigger monostable multivibrator 470 to thereby produce the DM–7 pulse. The DM–7 pulse is conveyed by cable 208 and cable 196 to be applied to gate 472 (FIG. 14) to test for the state of flip-flop 484. If the read access effected by the DM–6 pulse is not complete, a pulse appears on line 170. However, if the read access is complete, a pulse appears on a line 172. Lines 170 and 172 are included in cable 164 and then in cable 210. Line 170 is employed to trigger a monostable multivibrator 476 in the DM clock to produce the DM–8 pulse. The DM–8 pulse is used for delay purposes only and upon its termination, monostable multivibrator 470 is again triggered through OR circuit 468.

The active state of line 172 is employed to trigger a monostable multivibrator 474 to produce the DM–9 pulse. The DM–9 pulse is conveyed by cable 208 to be applied to gate 482 (FIG. 13C) to ascertain whether or not the desired cell is in primary storage No. 2. As has been mentioned hereinabove, if such desired cell is in primary storage No. 2, the name of this cell, i.e., its X and Y sheet coordinates will be in the data register of primary storage No. 2. Thus, referring to FIG. 14, if the cell is in primary storage, the X sheet coordinate will appear on cable 168 and the Y sheet coordinate will appear on cable 166. These cables extend through cable 164 to the point where cable 168 provides one input to the compare unit 478 and cable 166 provides one input to the compare unit 480 (FIG. 13C). The other inputs to compare units 478 and 480 are provided on cables 104 and 106 respectively which are carried by cable 212.

It is to be noted that cable 104 contains the X sheet coordinate of this cell and cable 106 contains the Y sheet coordinate of the cell. Thus, referring to FIG. 13C, if the addresses agree, an AND circuit 486 will produce an output. However, if they do not agree, then an OR circuit 488 will produce an output. When gate 482 is tested by the DM–9 pulse, a pulse appears on a line 290, if the cell is in primary storage. If the cell is not in primary storage, a pulse appears on the line 292. Lines 290, 292 are conveyed by a cable 210 whereby the pulse on line 290 is employed to trigger the monostable multivibrator 490 in the DM clock. Line 292 is employed to trigger the monostable multivibrator 492.

Figure 13D:
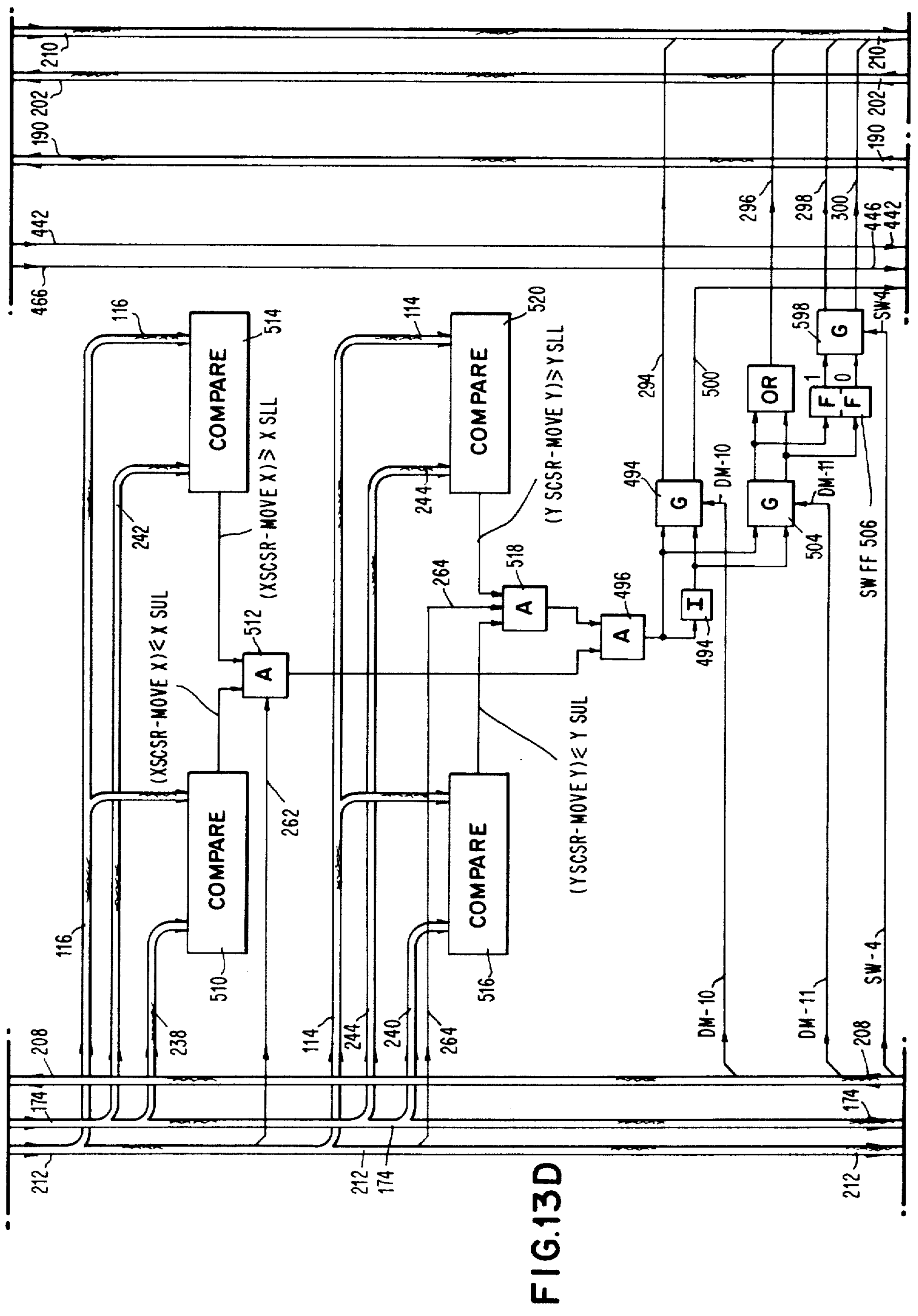

There is first considered the situation where monostable multivibrator 490 is triggered. In this case, the DM–10 pulse output therefrom is conveyed on cable 208 to be applied to a gate 494, (FIG. 13D). The AND 496 circuit produces an output if the corrected origin of the cell is within the limits of the screen window. However, if the corrected origin of the cell is not within the limits of the screen window, an inverter circuit 498 will produce an output. Thus, if the cell is to be displayed, a pulse appears on the line 294. If the cell is not to be displayed, a pulse appears on the line 500. If the pulse appears on line 500, it will pass through the OR circuit 444, and the AND circuit 446 (FIG. 13E) to a line 312 which returns the DM (decision) microprogram to the sheet origin microprogram as has been previously mentioned. However, if the cell is to be displayed, a pulse appears on line 294 which is conveyed by cable 210 and is employed to trigger monostable multivibrator 502 to produce the SW-5 pulse. The SW-5 pulse is conveyed by cable 208 and cable 202, and initiates the display operation (FIG. 15). The latter operation is explained further hereinbelow.

In the situation where monostable multivibrator 492 is triggered as a result of the test effected by the DM-9 pulse, the DM-11 pulse produced from monostable multivibrator 492 is conveyed via cable 208 to be applied to a gate 504 (FIG. 13D) in order to again determine whether the cell is to be displayed.

If the cell is to be displayed, a pulse appears on line 296 and swap flip-flop 506 is set to its 1 state. However, if the cell is not to be displayed, the pulse also appears on line 296 but flip-flop 506 is set to its 0 state. The pulse on line 296 is conveyed by cable 210 to trigger monostable multivibrator 508 (FIG. 16B) to thereby initiate the swap microprogram as is explained further hereinbelow.

In connection with the function of flip-flop 506, if the cell is to be displayed, the microprogram proceeds in its normal fashion through the spiral scan. After the swap or transfer has been accomplished and, if the cell is not to be displayed, the program branches back to the sheet origin microprogram at the end of the transfer. As is explained further in the description of the swap microprogram, the function of the flip-flop 506 is to furnish the control to accomplish either the normal proceeding of the microprogram or the branching back to the sheet origin microprogram at the end of the transfer.

As for the logic which determines whether or not the corrected origin of the cell is within the limits of the screen window, it is noted (FIG. 10C) that the value (XSCSR)-(MOVE X) is present on cable 116 and the value (YSCSR)-(MOVE Y) is on cable 114 (FIG. 10F). These two cables extend via cable 212 to provide an input for a compare unit 510 and an input for a compare unit 514 respectively (FIG. 13D). Cable 114 supplies one input to compare units 516 and 520. The other input to compare unit 510 is cable 238 which contains the X screen upper limit value (FIG. 10D). The other input to compare unit 514 is cable 242 (FIG. 10D) which contains the value of the X screen lower limit. An output is produced from compare unit 510 if the value (XSCSR)-(MOVE X) is equal to or less than the X screen upper limit. An output is produced from compare unit 514 if the value (XSCSR)-(MOVE X) is equal to or greater than the X screen lower limit. The line 262 (FIG. 13D) is from cable 212 and has thereon the 0 output of the overflow bit the X SCSR register. The latter overflow bit would have been set to its 1 state if the origin of the cell had wandered off the screen in either the left or right direction. Thus, AND circuit 512 (FIG. 13D) produces an output if the cell origin is within limits in the X direction.

The compare units 516 and 520 and AND circuit 518 operates similarly relative to the Y limits. Accordingly, AND circuit 518 produces an output if the origin of the cell is within limits in the Y direction. The AND circuit 496 consequently produces an output if the origin of the cell is within limits in both the X and Y directions.

The foregoing completes the description of the decision microprogram. As has been mentioned, this program is branched into and out of each time that a cell is a candidate for display.

Reference is now made back to the sheet origin microprogram. In the execution of the latter, the SO-2 pulse is produced when the monostable multivibrator 448 (FIG. 16A) is triggered. The SO-2 pulse is conveyed by cable 208 to cable 214 to set counter A to 1 (FIG. 10E). It is to be noted that the SO-2 pulse passes through the OR circuit 552 (FIG. 13A) to line 260 through cable 214. Line 216 is employed to reset the contents of counter B to 0 and to also increment counter SCC (FIG. 10E). Counters A and B determine the path of the spiral scan and counter SCC determines the branching out of and back to various microprograms involved in the spiral scan.

When monostable multivibrator 448 (FIG. 16A) terminates, a pulse is produced thereby which passes through an OR circuit 524 to trigger a monostable multivibrator 526 to thereby produce the DY-1 pulse. The DY-1 pulse is conveyed by cable 208 and then by cable 214 to decrement the YSCSR register (FIG. 10C). The DY-1 pulse is also employed to decrement the Y SHSR register (FIG. 10B) and to increment counter B (FIG. 10E) via line 218 and cable 214.

When monostable multivibrator 526 goes OFF, a pulse is produced which passes through OR circuit 432 to turn ON monostable multivibrator 434, the latter action initiating the decision microprogram. Because the contents of the SCC counter are now at 1, the line 304 (FIG. 10E) is active. Line 304, via cable 212, is employed to enable AND circuit 530 (FIG. 13E). Thus, when the program branches back from the decision microprogram, the pulse produced from OR circuit 444 (FIG. 13E) passes through AND circuit 530 to line 314 which extends through cable 210 and is employed to trigger monostable mulitvibrator 532 (FIG. 16A) and thereby produce the DY-2 pulse. The DY-2 pulse is conveyed on cable 208 to activate gate 534 (FIG. 13H).

To test the output of compare unit 536, the inputs applied thereto are cables 220 and 222 which extend from cable 212. On cable 220 there are present the contents of counter B and on cable 222 there are present the contents of counter A. If the contents of counter A are equal to the contents of counter B, a pulse appears on line 266. If, however, the contents of counter A are not equal to the contents of counter B, then a pulse appears on line 268. Lines 266 and 268 are employed via cable 210 to trigger monostable multivibrators 538 and 526 respectively (FIG. 16A). With this arrangement, the DY clock branches back to the DY-1 pulse if the contents of counter B are not equal to the content of counter A, and branches forward to the DY-3 pulse if the contents of counter B are equal to the contents of counter A. The DY-3 pulse is conveyed by cable 208 and passes through OR circuit 522 to line 216 which is carried by cable 214 to reset the contents of counter B to 0 (FIG. 10E). In addition, the pulse on line 216 is employed to increment the SCC counter.

When monostable multivibrator 538 goes OFF, a pulse is produced thereby which passes through OR circuit 540 to trigger monostable multivibrator 542 to thereby produce the DX–1 pulse. The DX–1 pulse is conveyed by cable 208 and cable 214 and is employed to decrement the X SHSR register (FIG. 10B). The DX–1 pulse is also used to decrement the X SCSR register. The DX–1 pulse is passed through OR circuit 528 to line 218 in cable 214 to increment counter B (FIG. 10E).

When monostable multivibrator 542 (FIG. 16A) goes OFF, a pulse is transmitted through OR circuit 432 to again initiate the decision microprogram. At this juncture, the contents of the SCC counter (FIG. 10E) have the value of 2 and line 306 is active. Line 306 in cable 212 is employed to enable AND circuit 544 (FIG. 13E). Thereby, the return from the decision microprogram is via line 316. Line 316 in cable 210 is employed to trigger monostable multivibrator 546 to thereby produce the DX–2 pulse. The DX–2 pulse is conveyed by cable 208 to be applied to gate 548 (FIG. 13A) to test whether or not the contents of counter B are equal to the contents of counter A. If this test finds that the latter contents are equal, a pulse appears on line 270. However, if they are not equal, then a pulse appears on line 272. Line 270 is employed to trigger monostable multivibrator 550 and line 272 is used to trigger monostable multivibrator 542. With this arrangement, accordingly, the DX clock either branches back to the DX–1 pulse or proceeds to DX–3 pulse. The DX–3 pulse is conveyed by cable 208 to pass through OR circuit 522 and then to line 216. Line 216 in cable 214 is employed to reset the contents of counter B to 0 (FIG. 10E). The DX–3 pulse on line 216 is employed to increment the SCC counter and passes through OR circuit 552, OR circuit 224 and cable 214 to increment counter A (FIG. 10E).

When monostable multivibrator 550 (FIG. 16A) goes OFF, the pulse produced thereby is transmitted through OR circuit 554 to trigger monostable multivibrator 556 to thereby produce the IY–1 pulse. The IY–1 pulse is conveyed by cable 208 and cable 214 and is employed to decrement the YSHSR register (FIG. 10B). The IY–1 pulse is also employed to decrement the YSCSR register (FIG. 10C). The IY–1 pulse is passed through OR circuit 528 and then to line 218 on cable 214 to increment counter B.

When monostable multivibrator 556 goes OFF, the pulse produced thereby is transmitted through OR circuit 432 to again initiate the decision microprogram. At this juncture, the contents of the SCC counter (FIG. 10E) will be set to 3 whereby line 308 will be active. Line 308 in cable 212, is employed to enable AND circuit 558 (FIG. 13E). This time, when the program returns from the decision microprogram, the pulse on line 308 will pass through AND circuit 558, line 318, cable 210 and will be employed to trigger monostable multivibrator 560 (FIG. 16A) to produce the IY–2 pulse. The IY–2 pulse is conveyed by cable 208 to be applied to gate 562 (FIG. 13A) to determine whether the contents of counter B are equal to the contents of counter A. If the latter contents are equal, a pulse appears on line 274 and, if they are not equal, a pulse appears on line 276. Lines 274 and 276 via cable 210 are employed to trigger monostable multivibrators 564 and 556 respectively (FIG. 16A). The triggering of monostable multivibrator 564 produces the IY–3 pulse which is conveyed by cable 208 and passes through OR circuit 522 to line 216 in cable 214 to reset the contents of counter B to 0. This pulse on line 216 also increments the SCC counter as has been described hereinabove.

When monostable multivibrator 564 goes OFF, the pulse produced thereby passes through OR circuit 566 to trigger monostable multivibrator 568 to thereby produce the IX–1 pulse. The IX–1 pulse is employed to increment the X SHSR register (FIG. 10B) and to increment the X SCSR register (FIG. 10C). The IX–1 pulse also passes through OR circuit 528 to line 218 in cable 214, and is employed to increment counter B (FIG. 10E).

When monostable multivibrator 568 goes OFF, the program again branches to the decision microprogram. At this point, the contents of the SCC counter (FIG. 10E) are set to 4 whereby line 310 is active. This causes the pulse which signifies the return from the decision microprogram to pass through AND circuit 570 to line 320 in cable 210, the latter pulse being employed to trigger monostable multivibrator 572 (FIG. 16A) to produce the IX–2 pulse. The IX–2 pulse is conveyed by cable 208 to be applied to gate 574 (FIG. 13A) to determine whether the contents of counter B are equal to the contents of counter A. If this determination indicates that the contents of counter B are equal to the contents of counter A, a pulse appears on line 278. If, however, the contents of counter B are not equal to the contents of counter A, then a pulse appears on line 280. Lines 278 and 280, in cable 210, are employed to trigger monostable multivibrators 576 and 568, respectively.

The IX–3 pulse, produced as a result of the triggering of monostable multivibrator 576, is conveyed by cable 208 to OR circuit 522 to line 216. The pulse on line 216 in cable 214, is used to reset the contents of counter B FIG. 10E) to 0. The pulse on line 216, at this time, is also employed to increment the SCC counter FIG. 10E). The IX–3 pulse is also passed through OR circuit 552 (FIG. 13B) to line 224, in cable 214, the pulse being used to increment the contents of counter A.

When monostable multivibrator 576 goes OFF, the pulse produced thereby triggers monostable multivibrator 578 to generate the IX–4 pulse. The IX–4 pulse is conveyed by a cable 208 to be applied to gate 580 (FIG. 13B). The application is made to ascertain whether the value of the contents of counter A are equal to the value of the contents in limit register 582. If they are equal, a pulse appears on line 282. However, if they are not equal, a pulse appears on line 284. The pulses on lines 282 and 284 are employed to trigger monostable multivibrators 584 and 526, respectively, (FIG. 16A). With this arrangement, the microprogram can branch to the pulse DY–1 if the contents of counter A are not equal to those of the limit register and to the pulse M–1 if the contents of counter A are equal to the contents of the limit register.

It is to be noted, at this point, that the microprogram cannot branch to the MOVE microprogram until at least one complete spiral scan has been completed. Thus, when the system is started up, cells can successively be transferred from secondary to primary storage until all of the cells which are required for the first spiral scan are in primary storage. When this is accomplished, the sheet can then be started to be moved past the window. Such movement is next described.

To cause the sheet to move past the window, two switches 587 and 589 (FIG. 13B) are provided. To cause the sheet to move one raster unit to the left after each spiral scan, switch 587 is moved one position to the left. Correspondingly, to cause the sheet to move two raster units to the left after each spiral scan, switch 587 is moved two positions to the left. Thus, it is clear that if more switch points are provided or if the points are given different values of raster units, the sheet can be made to move any number of raster units after each spiral scan. Switch 589 is operative to control movement of the sheet in the vertical direction. If both switches 587 and 589 are moved from their OFF position, then the sheet will be moved diagonally through the window.

As seen in FIG. 13B, the M–1 pulse produced from the triggering of monostable multivibrator 584 is conveyed by cable 208 to be applied to the switch arms of switches 587 and 589. With this arrangement, the M–1 pulse functions as an incrementing or decrementing pulse which, as will be explained hereinbelow, is applied to the MOVE X and MOVE Y registers (FIG. 10A).

The pulse produced in any one of the lines 246, 248, 254 or 256 (FIG. 10A) is conveyed by cable 214 to be applied to the MOVE X register. In a similar manner, the pulses produced on lines 250, 252, 258 or 260 are applied to the MOVE Y register.

When monostable multivibrator 584 goes OFF, the pulse produced thereby is transmitted through OR circuit 418 to trigger monostable multivibrator 420 to produce the SO–1 pulse. With this arrangement, the program branches back to the sheet origin microprogram.

When the transfer unit (FIG. 12) starts its operation, it loads the contents of the transfer memory address register into the left portion of the memory data register of primary storage No. 1. This address is conveyed by cable 322 from the transfer unit, the address then appearing on cable 118. It is to be noted (FIG. 11) that the address in secondary storage is on cable 324 which goes to the transfer unit. The sheet coordinates contained in registers X SHSR and Y SHSR are conveyed to the transfer unit by cables 104 and 106. The values of these coordinates are loaded into the memory data register of primary storage No. 2 via cable 134.

At this juncture, a write access is then requested for both primary storages No. 1 and No. 2. For primary storage No. 1, the request write access signal appears on line 154 and for primary storage No. 2, the request write access signal appears on line 132. It is to be noted that registers X SHSR and Y SHSR furnish the address for primary storage No. 1, this address being conveyed by the cable 108. The memory address register 734 in the transfer unit furnishes the address for primary storage No. 2 over cable 130. When these two request write accesses are completed, memory address register 734 is incremented. Following the first write access of primary storage No. 2, display instructions from the secondary storage are written in the order of their sequence, into primary storage No. 2. After each write access from primary storage No. 2, the memory address in the transfer unit is incremented. The last instruction obtained from secondary storage is a special word which indicates the end of the cell routine display instructions. It is to be noted that the starting address for the cell being considered is left in the left hand portion of the memory data register (not shown) of primary storage No. 1 where it is available to the display unit in the case where a display operation is to follow the transfer operation.

When monostable multivibrator 508 goes OFF, the signal produced thereby is transmitted through OR circuit 586 to trigger monostable multivibrator 588 to thereby produce the SW–2 pulse. The SW–2 pulse is conveyed by cable 208 and then by cable 193, the SW–2 pulse being applied to a gate 592 to test for the state of flip-flop 590 (FIG. 12C). Flip-flop 590 had been set to its 1 state by the SW–1 pulse. Flip-flop 590 had been set to its 1 state by the SW–1 pulse. In this testing, if the transfer operation has not been completed, a pulse appears on line 160. However, if the transfer operation has been completed, a pulse appears on line 162. Lines 160 and 162 are in cable 158 and then in cable 210, the pulse on line 160 being employed to trigger monostable multivibrator 594 to produce the SW–3 pulse, the pulse on line 160 being used to trigger monostable multivibrator 596 to produce the SW–4 pulse (FIG. 16B). The SW–3 pulse is employed for delay only and the signal produced upon its termination is passed through OR circuit 586 to again trigger monostable multivibrator 588. The SW–4 pulse is conveyed by cable 208 to be applied to gate 598 (FIG. 130) to test for the state of flip-flop 506. If this test shows that flip-flop 506 is in its 1 state, a pulse appears on line 298. However, if the test indicates that flip-flop 506 is in its 0 state, then a pulse appears on line 300. The pulse on line 298 is conveyed by cable 210 to trigger monostable multivibrator 502 to thereby produce the SW–5 pulse. The pulse on line 300 is conveyed by cable 210 to trigger monostable multivibrator 420 to thereby produce the SO–1 pulse.

The SW–5 pulse is conveyed by cable 208 and then by cable 202 to initiate the operation of the display apparatus (FIG. 15) and also to set flip-flop 600 to its 1 state. The address of the cell in primary storage No. 2 is available to the display unit on cable 124. This address is placed in a memory address register (not shown) which is in the display unit. The address is incremented and sent back to primary storage No. 2 over cable 138 along with a request read access signal on line 140 to primary storage No. 2. The display instruction is returned to the display unit over cable 144 along with a signal on line 146 which indicates that the instruction word is valid. The display unit then proceeds to effect the display in accordance with its normal mode of operation.

In FIG. 15, it is to be noted that the absolute X and Y screen coordinates to which the display instruction relates are provided over cables 114 and 116. It is also to be noted that cable 114 contains the contents of register Y SCSR and cable 116 contains the contents of register X SCSR. As has been mentioned, the X deflection register 602 and the Y deflection register 604 correspond to the conventional X and Y deflection registers in a display machine, such as the X and Y, deflection registers shown in FIG. 2. These registers are adjusted in the normal manner.

The subtract units 606 and 608 are operative to adjust the values of the contents contained in registers 602 and 604 respectively according to the values contained on the cables 100 and 102 which come from the MOVE X and MOVE Y registers (FIG.10A). The display unit continues to accept instructions from primary storage No. 2 until the last instruction indicates that it is the final instruction of the display orders of the cell. At this time, flip-flop 600 (FIG. 15) is reset to its 0 state to indicate that the display of the cell is completed.

When monostable multivibrator 502 goes OFF, the signal produced thereby is transmitted through OR circuit 610 to trigger monostable multivibrator 612 to thereby produce the SW–6 pulse. The SW–6 pulse is conveyed by cable 208 and then by cable 202 to be applied to gate 616 (FIG. 15) to test for the state of flip-flop 600. If the display of the cell has not been completed, a pulse appears on line 176. However, if the display of the cell is completed, then a pulse appears on line 178. Lines 176 and 178 are contained in cable 174. Line 176 goes from cable 174 to cable 210, a pulse thereon being employed to trigger monostable multivibrator 614 (FIG. 16B). The triggered output of monostable multivibrator 614, i.e., the SW–7 pulse, is employed for delay only and returns the SW clock to pulse SW-6 through OR circuit 610. The pulse on line 178 passes through OR circuit 444 and is presented to one of the AND circuits 446, 530, 544, 558, or 570, (FIG. 13E). As has been explained hereinabove, one of the latter AND circuits will be enabled according to the setting in the SCC counter (FIG. 10E). With this arrangement, control is returned either to the sheet origin microprogram, the decrement Y microprogram, the decrement X microprogram, increment Y microprogram, or the increment X microprogram.

Reference is now made to FIG. 12 for a description of the structure and operation of the transfer unit.

This operation is initiated by the SW–1 pulse, the latter pulse being employed to set flip-flop 590 to its 1 state and to also turn ON monostable multivibrator 726 to thereby produce the T–1 pulse. The T–1 pulse is conveyed by cable 728 and is employed to set flip-flop 700 (FIG. 12A) to its 1 state. With flip-flop 700 in its 1 state, a gate 732 is enabled whereby the contents of the memory address register (MAR) 734 are transferred to cable 130, the latter contents being employed to address primary storage No. 2 (FIG. 14). The T–1 pulse is also applied to the gate 730 to gate the information on cables 104 and 106 to cable 134, the latter information being transferred to the data register of primary storage No. 2 (FIG. 14). In addition, the T-1 pulse is also applied to the gate 736 to effect the gating of the contents of memory address register (MAR) 734 to a cable 322, the latter contents being transferred to the left portion of the data register 111 for primary storage No. 1 (FIG. 11).

When monostable multivibrator 726 goes off i.e., when pulse T–1 terminates, the pulse produced thereby turns on a monostable multivibrator 738 to thereby produce the T–2 pulse. The T–2 pulse is conveyed by cable 728 and is employed to set flip-flop 704 to its 1 state. A branch circuit is also provided by means of a line 154 in cable 118, the pulse on line 154 being used to request a write access of primary storage No. 1. The T–2 pulse passes through an OR circuit 740 (FIG. 12A) to set a flip-flop 702 to its 1 state. A branch circuit is provided by line 132 in cable 128 which goes to primary storage No. 2 (FIG. 14). The pulse on line 132 is used to request a write access of primary storage No. 2.

When monostable multivibrator 738 goes off, i.e., pulse T–2 terminates, the pulse produced thereby passes through an OR circuit 742 to turn on a monostable multivibrator 744 to thereby produce the T–3 pulse. The T–3 pulse is conveyed by cable 728 and is applied to a gate 746 (FIG. 12B) to test for the states of flip-flops 702 and 704. If either of these flip-flops are in their 1 state, a pulse appears on a line 710. If both of flip-flops 702 and 704 are in their 0 states, then a pulse appears on a line 712. Lines 710 and 712 are part of cable 748. The pulse on line 710 is used to turn on monostable multivibrator 750 to thereby produce the T–4 pulse and the pulse on line 712 is utilized to turn on the monostable multivibrator 752 to produce the T–5 pulse. The T–4 pulse is employed for delay only and returns the microprogram to pulse T–3.

The T–5 pulse is conveyed by cable 728 and is used to initiate operation of secondary storage (FIG. 12B). The T–5 pulse is also applied to a gate 754 (FIG. 12B) to gate the starting address which is present on cable 324 to secondary storage. In addition, the T–5 pulse is passed through an OR circuit 756 to be thence employed to reset flip-flop 706 to its 0 state. When secondary storage has assembled the word of data, it transmits this data word to the data register 758 and also provides a pulse on a line 760 which is employed to indicate that the latter data is valid. The validating is accomplished by having the pulse on line 760 set flip-flop 706 to its 1 state to thereby indicate to the system that the data in register 758 can be accepted. Finally, the T–5 pulse is also employed to set a flip-flop 708 to its 1 state. In this connection, it is to be noted that the data in register 758 is transferred to a decoder 762. Decoder 762 recognizes the special word which indicates the end of the display instructions for any particular cell. When such special word is recognized, there is produced an output on a line 764 which is operative to reset flip-flop 708 to its 0 state. Thus, when flip-flop 708 is in its 0 state, there is indicated to the system that the transfer operation is complete for a particular cell.

When monostable multivibrator 752 turns off, i.e., when pulse T–5 terminates, the pulse produced thereby is transmitted through an OR circuit 768 to turn on a monostable multivibrator 766 to thereby produce the T–6 pulse. The T–6 pulse is conveyed by cable 728 to be applied to a gate 770 (FIG. 12B) to test for the state of flip-flop 706. If flip-flop 706 is in its 0 state, then a pulse appears on a line 718. However, if flip-flop 706 is in its 1 state, then a pulse appears on line 720. Lines 718 and 720 are part of cable 748. The pulse on line 718 is employed to turn on monostable multivibrator 772 to thereby produce the T–7 pulse which is used for delay only and then returns the transfer microprogram to pulse T–6. The T–8 pulse is conveyed by cable 728 and is passed through an OR circuit 776 to increment memory address register (MAR) (FIG. 12A).

When monostable multivibrator 774 goes off, i.e., when pulse T–8 terminates, the pulse produced thereby turns on the monostable multivibrator 778 to produce the T–9 pulse. The T–9 pulse is conveyed by cable 728 to be applied to a gate 780 (FIG. 12B) to effect the gating of the contents of data register 758 to cable 134 which goes to primary storage No. 2 and is used to load the data register for primary storage No. 2.

When monostable multivibrator 778 goes off, i.e., pulse T–9 terminates, the pulse produced in response to this termination turns on the monostable multivibrator 782 to thereby produce the T–10 pulse. The T–10 pulse is conveyed by cable 728 and is passed through an OR circuit 740 to set flip-flop 702 to its 1 state. A branch circuit is also provided by means of line 132 which goes to primary storage No. 2, the pulse on line 132 being employed to request a write access from primary storage No. 2.

When monostable multivibrator 782 goes off, i.e., pulse T–10 terminates, the pulse produced thereby is passed through an OR circuit 786 and is employed to turn on a monostable multivibrator 784 to thereby produce the T–11 pulse. The T–11 pulse is conveyed by cable 728 to be applied to a gate 784 to test for the state of flip-flop 702. If flip-flop 702 is in its 0 state, a pulse appears on a line 714. However, if flip-flop 702 is in its 1 state, then a pulse appears on a line 716. The pulse on line 714 is employed to turn on monostable multivibrator 788 to thereby produce the T–13 pulse and the pulse on line 716 is employed to turn on the monostable multivibrator 790 to produce the T–12 pulse. The T–12 pulse is used for delay only and returns the transfer microprogram to pulse T–11. The T–13 pulse is conveyed by cable 728 to be applied to a gate 792 (FIG. 12B) to test for the state of flip-flop 708. If flip-flop 708 is in its 0 state, then a pulse appears on a line 722. However, if flip-flop 708 is in its 1 state, then a pulse appears on a line 724. Lines 722 and 724 are part of cable 748. The pulse on line 722 is used to reset flip-flop 590 to its 0 state. The pulse on line 724 is employed to turn on monostable multivibrator 794 to thereby produce the T–14 pulse. A branch circuit is provided for the pulse on line 722 to supply a stop signal to secondary storage and also to increment memory address register (MAR) 734 and to reset flip-flop 700 to its 0 state.

The T–14 pulse is conveyed by cable 728 and is passed through an OR circuit 756 to reset flip-flop 706 to its 0 state. When monostable multivibrator 794 goes off, i.e., pulse T–14 terminates and the transfer microprogram branches back to pulse T–6.

The following tabulation sets forth the relationship of the operations under the control of the sheet origin micro-program (SO clock).

| Mono nbr. and pulse | Turn "On" conditions | Function(s) performed when "On" | Function(s) performed when turning "Off" |
|---|---|---|---|
| 420 (SO1) | A start pulse applied to line 416.<br>The termination of the M-1 pulse.<br>The "0" state of the SW flip-flop. | The gating of the contents of the X SHOR to the X SHSR register.<br>The gating of the contents of Y SHOR register to the Y SHSR register.<br>The gating of the contents of the X SCOR register to the X SCSR register.<br>The gating of the contents of the Y SCOR register to the Y SCSR register.<br>The resetting of the SCC counter to "0". | The turning "on" of monostable multivibrator 434 (DM-1). |

Table – Continued

| Mono nbr. and pulse | Turn "On" conditions | Function(s) performed when "On" | Function(s) performed when turning "Off" |
|---|---|---|---|
| 448 (SO2) | A pulse on line 312, i.e. either of the overflow bits in the X SHSR or Y SHSR registers are in their "1" state. | The setting of counter A to "1".<br>The setting of counter B to "0".<br>The incrementing of the SCC counter. | The turning "on" of monostable multivibrator 526 (DY-1). |

The following tabulation sets forth the relationship of the operations under the control of the decrement Y micro-program (DY clock)

| Mono nbr. and pulse | Turn "On" conditions | Function(s) performed when "On" | Function(s) performed when turning "Off" |
|---|---|---|---|
| 526 (DY1) | The termination of the SO-2 pulse.<br>The contents of counter A are not equal to the contents of counter B.<br>The contents of counter A are not equal to the contents of the limit register. | The decrementing of the contents of the Y SHSR register.<br>The decrementing of the contents of the the Y SCSR register.<br>The incrementing of counter B. | The turning "on" of monostable multivibrator 434 (DM-1). |
| 532 (DY2) | The branching back from the decision microprogram (Pulse on line 314). | The testing for equality between the contents of counters A and B. | |
| 538 (DY3) | The contents of counter A are equal to the contents of counter B (Pulse on line 266). | The resetting to "0" of the contents of counter B. The incrementing of the SCC counter. | The turning "on" of monostable multivibrator 542 (DX-1). |

The following tabulation sets forth the relationship of the operations under the control of the decrement X micro-program (DX clock).

| Mono nbr. and pulse | Turn "On" conditions | Function(s) performed when "On" | Function(s) performed when turning "Off" |
|---|---|---|---|
| 542 (DX-1) | The turning "off" of multivibrator 542.<br>The contents of counter B are not equal to the contents of counter A. | The decrementing of the X SHSR register.<br>The decrementing of the X SCSR register.<br>The incrementing of counter B. | The turning "on" of monostable multivibrator 434 (DM-1). |
| 546 (DX-2) | The return from the decision microprogram (Pulse on line 316) | The testing for equality between the contents of counter A and counter B. | |
| 550 (DX-3) | The contents of counter A are equal to the contents of counter B. | The resetting of counter B to "0".<br>The incrementing of the SCC counter.<br>The incrementing of counter A. | The turning "on" of monstable multivibrator 556 (IY-1). |

The following tabulation sets forth the relationship of the operations under the control of the increment Y micro-program (IY clock).

| Mono nbr. and pulse | Turn "On" conditions | Function(s) performed when "On" | Function(s) performed when turning "Off" |
|---|---|---|---|
| 556 (IY-1) . . . | The turning "off" of multivibrator 550. Line 276 is active, i.e., the contents of counter A are not equal to the contents of Counter B. | The incrementing of Y SHSR register. The incrementing of the Y SCSR register. The incrementing of counter B. The testing as to whether the contents of counter A are equal to the contents of counter B. | The turning "on" of monostable multivibrator 434 (DM-1). |
| 560 (IY-2) . . . | Line 318 is active. | | |
| 564 (IY-3) . . . | Line 274 is active, i.e., the contents of counter A are equal to the contents of counter B. | The resetting of counter B to zero. The incrementing of the SCC counter. | The turning "on" of monostable multivibrator 568 (IX-1). |

The following tabulation sets forth the relationship of the operations under the control of the increment X micro-program (IX clock).

| Mono nbr. and pulse | Turn "On" conditions | Function(s) performed when "On" | Function(s) performed when turning "Off" |
|---|---|---|---|
| 568(IX-1) . . . . . | The turning "off" of monostable multivibrator 564 (IY-3). Line 280 is active, i.e., the contents of counter B are not equal to the contents of counter A. | The incrementing of the XSHSR register. The incrementing of the X SCSR register. The incrementing of counter. B | The turning "on" of monostable multivibrator 434 (DM-1). |
| 572(IX-2) . . . . . | Line 320 is active. | The testing as to whether the contents of counter B are equal to the contents of counter A. | |
| 576(IX-3) . . . . . | Line 278 is active, i.e., the contents of counter B are equal to the contents of counter A. | The resetting of counter B to zero. The incrementing of the SCC counter. The incrementing of counter A. | The turning "on" of monostable multivibrator 578 (IX-4). |
| 578(IX-4) . . . . . | The turning "off" of monostable multivibrator IX-3. | The testing as to whether the contents of counter A are equal to the contents of the limit register. | |

The move sheet origin program is controlled by monostable multivibrator 584 (M-1) which is turned "on" by the active state of line 222. The function of the M-1 pulse is to increment or decrement the MOVE X or MOVE Y registers. The pulse resulting from the termination of the M-1 pulse is used to turn on monostable multivibrator 420 (SO-1).

The following tabulation sets forth the relationship of the operations under the control of the decision micro-program (IM clock).

| Mono nbr. and pulse | Turn "On" conditions | Function(s) performed when "On" | Function(s) performed when turning "Off" |
|---|---|---|---|
| 434 (DM-1) . . . | The turning "off" of monostable multivibrator 420 (SO-1). The turning "off" of monostable multivibrator 526 (DY-1). | The testing as to whether the overflow bit in the X SHSR or Y SHSR register is at "1". | |

Table – Continued

| Mono nbr. and pulse | Turn "On" conditions | Function(s) performed when "On" | Function(s) performed when turning "Off" |
|---|---|---|---|
| | The turning "off" of monostable multivibrator 542 (DX-1). The turning "off" of monostable multivibrator 556 (IY-1). The turning "off" of monostable multivibrator 568 (IX-1). | | |
| 450 (DM-2) . . . | The overflow bit in either the X SHSR or Y SHSR register is not at "1", i.e., line 286 is active. | The read accessing of primary storage #1. | The turning "on" of DM-3. |
| 456 (DM-3) | The termination of pulse DM-2. The termination of pulse DM-4. | The testing as to whether the read accessing of primary storage #1 is completed. | |
| 460 (DM-4) . . . | The read accessing of primary stogare #1 is not completed, i.e., line 150 is active. | Delay. | The turning "on" of DM-3 |
| 462 (DM-5) . . . | The read accessing of primary storage #1 is completed, i.e., line 152 is active. | The testing as to whether the blank bit is at "1". | |
| 466 (DM-6) . . . | The blank bit is not at "1", i.e., line 288 is active. | The read accessing of primary storage #2. | The turning "on" of DM-7. |
| 470 (DM-7) . . . | The termination of pulse DM-6. The termination of pulse DM-8. | The testing as to whether the read accessing of primary storage #2 is completed. | |
| 476 (DM-8) . . . | The read accessing of primary storage #2 is not completed, i.e., line 170 is active. | Delay only. | The turning "on" of DM-7. |
| 474 (DM-9) . . . | The read accessing of primary storage #2 is completed. | The ascertaining as to whether a cell is in primary storage. | |
| 490 (DM-10) . . | The cell is in primary storage, i.e., line 290 is active. | The ascertaining as to whether the cell in primary storage is to be displayed. | |
| 492 (DM-11) . . | The cell is not in primary storage, i.e., line 292 is active. | The ascertaining as to whether the cell, which is not in primary storage is to be displayed. | |

The following tabulation sets forth the relationship of the operations under the control of the swap microprogram (SW clock).

| Mono nbr. and pulse | Turn "On" conditions | Function(s) performed when "On" | Function(s) performed when turning "Off" |
|---|---|---|---|
| 508 (SW-1) . . . . | The cell, not in primary storage, is to be displayed. | The initiation of the program for transferring from secondary to primary storage. | The turning "on" of monostable multivibrator 588 (SW-2). |
| 588 (SW-2) . . . . | The termination of pulse SW-1. The termination of pulse SW-3. | The testing as to whether the transfer from secondary to primary storage is completed. | |

Table – Continued

| Mono nbr. and pulse | Turn "On" conditions | Function(s) performed when "On" | Function(s) performed when turning "Off" |
|---|---|---|---|
| 594 (SW-3) | The transfer from secondary to primary storage is not completed, i.e., line 160 is active. | Delay. | The turning "on" of monostable multivibrator 588 (SW-2). |
| 596 (SW-4) | The transfer from secondary to primary storage is completed. | The testing for the state of the SW flip-flop. | |
| 502 (SW-5) | The SW flip-flop is at "1", i.e., line 298 is active. The cell is to be displayed i.e., line 294 is active. | The initiation of the display. | The turning "on" of monostable multivibrator 612 (SW-6). |
| 612 (SW-6) | The termination of pulse SW-5. The termination of pulse SW-7. | The testing as to whether the display is completed. | |
| 614 (SW-7) | The display is not completed. | Delay. | The turning "on" of monostable multivibrator 612 (SW-6). |

The following tabulation sets forth the relationship of the operations under the control of the transfer microprograms (T clock).

| Mono nbr. and pulse | Turn "On" conditions | Function(s) performed when "On" | Function(s) performed when turning "Off" |
|---|---|---|---|
| 726 (T-1) | The SW-1 pulse. | The setting of flip-flop 700 to the "1" state. The gating of the contents of the X SHSR and Y SHSR registers to the data register of primary storage #2. The gating of the contents of the memory address register (MAR) to the data register of primary storage #1. | The turning "on" of monostable multivibrator 738 (T-2). |
| 739 (T-2) | The termination of pulse T-1. | The write accessings of primary storage #1 and #2. (The setting of flip-flops 702 and 704 to their "1" states). | The turning "on" of monostable multivibrator 744 (T-3). |
| 744 (T-3) | The termination of pulse T-2. The termination of pulse T-4 | The testing for the states of flip-flops 702 and 704 to ascertain whether the write accessings of primary storages #1 and #2 are completed. | |
| 750 (T-4) | The write accessings of primary storages #1 and #2 are not completed, i.e., line 710 is active. | Delay. | The turning "on" of monostable multivibrator 744 (T-6). |
| 752 (T-5) | The write accessings of primary storages #1 and #2 are completed, i.e., line 712 is active. | The resetting of flip-flop 706 to its "0" state. The setting of flip-flop 708 to its "1" state. The initiation of the operation of secondary storage. The gating of the starting address to secondary storage. | The turning "on" of monostable multi vibrator 766 (T-6). |
| 766 (T-6) | The termination of pulse T-5. The termination of pulse T-7. The termination of pulse T-14. | The testing for the state of flip-flop 706 to determine whether the data is valid. | |
| 772 (T-7) | The data is not valid. | Delay. | The turning "on" of monostable multivibrator 766 (T-6). |
| 774 (T-8) | The data is valid. | The incrementing of the memory address register (MAR). | The turning "on" of monostable multivibrator 778 (T-9). |
| 778 (T-9) | The termination of pulse T-8. | The gating of data to primary storage #2. | The turning "on" of monostable multivibrator 782 (T-10). |
| 782 (T-10) | The termination of pulse T-9. | The write accessing of primary storage #2 | The turning "on" of monostable multivibrator 784 (T-11). |
| 784 (T-11) | The termination of pulse T-10. The termination of pulse T-12. | The testing for the state of flip-flop 702 to ascertain whether the write accessing of primary storage #2 is completed. | |
| 790 (T-12) | The write accessing of primary storage #2 is not completed, i.e., line 716 is active. | Delay. | The turning "on" of monostable multivibrator 784 (T-11). |
| 788 (T-13) | The write accessing of primary storage #2 is completed. | The testing for the state of flip-flop 708. | |
| 794 (T-14) | Flip-flop 708 is at "1", i.e., line 724 is active. | The resetting of flip-flop 706 to its "0" state. | The turning "on" of monostable multivibrator 760 (T-6). |

There follows hereinbelow a tabulation of the cables and their respective lines appearing in the embodiment described herein.

| Cable numbers and connections | Designations of lines in cable | Description |
|---|---|---|
| Cable 100 (From Registers to Display). | Line 100 | Contents of MOVE X Register. |
| Cable 102 (From Registers to Display). | Line 102 | Contents of MOVE Y Register. |
| Cable 104 (From Registers to Transfer). | Line 104 | Contents of X SHSR Register. |
| Cable 106 (From Registers to Transfer). | Line 106 | Contents of Y SHSR Register. |
| Cable 108 (From Registers to Primary Storage #1). | Line 104 | Contents of X SHSR Register. |
| | Line 106 | Contents of Y SHSR Register. |
| Cable 114 (From Registers to Display). | Line 114 | Contents of Y SCSR Register. |
| Cable 116 (From Registers to Display). | Line 116 | Contents of X SCSR Register. |
| Cable 118 (From Transfer to Primary Storage #1). | Line 322 | Address of Cell in Primary Storage #2. |
| | Line 154 | Request Write Access. |
| Cable 120 (From Primary Storage #1 to Transfer). | Line 324 | Address in Secondary Storage. |
| | Line 156 | Write Access Complete. |
| Cable 122 (From Primary Storage #1 to Primary Storage #2). | Line 122 | Address of Cell in Primary Storage #2. |

Table – Continued

| Cable numbers and connections | Designations of lines in cable | Description |
|---|---|---|
| Cable 124 (From Primary Storage #1 to Display). | Line 124 | Address of Cell in Primary Storage #2. |
| Cable 126 (From Primary Storage #2 to Transfer). | Line 126 | Write Access Complete. |
| Cable 128 (From Transfer to Primary Storage #2). | Line 130 | Address for Primary Storage #2. |
| | Line 132 | Request Write Access. |
| | Line 134 | Load Memory Data Register (MDR) of Primary Storage #2. |
| Cable 136 (From Display to Primary Storage #22). | Line 138 | Address for Primary Storage #2. |
| | Line 140 | Request Read Access. |
| Cable 142 (From Primary Storage #2 to Display). | Line 144 | Contents of Memory Data Register (MDR). |
| | Line 146 | Read Access Complete. |
| Cable 148 (From Primary Storage #1 to Logic). | Line 150 | Read Access Not Complete. |
| | Line 152 | Read Access Complete. |
| | Line 226 | Blank Bit="0" |
| | Line 228 | Blank Bit="1" |
| Cable 158 (From Transfer to Logic). | Line 160 | Transfer Not Complete. |
| | Line 162 | Transfer Complete. |
| Pat. No. 4,114,405 | | 480 |
| Cable 164 (From Primary Storage #2 to Logic). | Line 166 | Y Address Portion of MDR. |
| | Line 168 | X Address Portion of MDR. |
| | Line 170 | Read Access Not Complete. |
| | Line 172 | Read Access Complete. |
| Cable 174 (From Display... to Logic). | Line 176 | Display Not Complete. |
| | Line 178 | Display Complete. |
| Cable 180 (From Logic to Primary Storage #1). | Line DM-2 | Request Read Access. |
| | Line DM-3 | Is Read Access Complete? |
| Cable 190 (From Logic to Transfer). | Line SW-1 | Start Transfer. |
| | Line SW-2 | Is Transfer Complete? |
| Cable 196 (From Logic to Primary Storage #22). | Line DM-6 | Request Read Access. |
| | Line DM-7 | Is Read Access Complete? |
| Cable 202 (From Logic to Display). | Line SW-5 | Start Display. |
| | Line SW-6 | Is Display Complete? |
| Cable 208 (From Pulse Generator to Logic). | Line SO-1 | |
| | Line SO-2 | |
| | Line DY-1 | |
| | Line DY-2 | |
| | Line DY-3 | |
| | Line DX-1 | |
| | Line DX-2 | |
| | Line DX-3 | |
| | Line IY-1 | |
| | Line IY-3 | |
| | Line IX-1 | |
| | Line IX-2 | |
| | Line IX-3 | |
| | Line IX-4 | |
| | Line M-1 | |
| | Line DM-1 | |
| | Line DM-2 | |
| | Line DM-3 | |
| | Line DM-5 | |
| | Line DM-6 | |
| | Line DM-7 | |
| | Line DM-9 | |
| | Line DM-10 | |
| | Line DM-11 | |
| | Line SW-1 | |
| | Line SW-2 | |
| | Line SW-4 | |
| | Line SW-5 | |
| | Line SW-6 | |
| Cable 210 (From Logic to Pulse Generator) | Line 266 | Turn "On" DY-3. |
| | Line 268 | Turn "On" DY-1. |
| | Line 270 | Turn "On" DX-3. |
| | Line 272 | Turn "On" DX-1. |
| | Line 274 | Turn "On" IY-3. |
| | Line 276 | Turn "On" IY-1. |
| | Line 278 | Turn "On" IX-1. |
| | Line 280 | Turn "On" IX-1. |
| | Line 282 | Turn "On" M-1. |
| | Line 284 | Turn "On" DY-1. |
| | Line 286 | Turn "On" DM-2. |
| | Line 150 | Turn "On" DM-4. |
| | Line 152 | Turn "On" DM-5. |
| | Line 288 | Turn "On" DM-6. |
| | Line 170 | Turn "On" DM-8. |
| | Line 172 | Turn "On" DM-9. |
| | Line 160 | Turn "On" SW-3. |
| | Line 162 | Turn "On" SW-4. |
| | Line 290 | Turn "On" DM-10. |
| | Line 292 | Turn "On" DM-11. |
| | Line 294 | Turn "On" SW-5. |
| | Line 296 | Turn "On" SW-1. |
| | Line 300 | Turn "On" SO-1. |
| | Line 176 | Turn "On" SW-7. |
| | Line 312 | Turn "On" SO-2. |
| | Line 314 | Turn "On" DY-2. |
| | Line 316 | Turn "On" DX-2. |
| | Line 318 | Turn "On" IY-2. |
| | Line 320 | Turn "On" IX-2. |
| Cable 212 (From Registers to Logic). | Line 220 | Contents of Counter B. |
| | Line 222 | Contents of Counter A. |
| | Line 230 | "0" Side of Overflow Bit in Register X SHSR. |
| | Line 232 | "1" Side of Overflow Bit in Register X SHSR. |

Table – Continued

| Cable numbers and connections | Designations of lines in cable | Description |
|---|---|---|
| | Line 234 | "0" Side of Overflow Bit in Register Y SHSR. |
| | Line 236 | "1" Side of Overflow Bit is Register Y SHSR. |
| | Line 104 | Contents of Register X SHSR. |
| | Line 106 | Contents of Register Y SHSR. |
| | Line 116 | Contents of Register X SCSR. |
| | Line 114 | Contents of Register Y SCSR. |
| | Line 238 | Contents of Register X SUL. |
| | Line 240 | Contents of Register Y SUL. |
| | Line 242 | Contents of Register X SLL. |
| | Line 244 | Contents of Register X SLL. |
| | Line 262 | "0" Side of Overflow Bit in X SCSR register. |
| | Line 264 | "0" Side of Overflow Bit in Y SCSR register. |
| | Line 302 | "0" Output of SCC Decoder. |
| | Line 304 | "1" Output of SCC Decoder. |
| | Line 306 | "2" Output of SCC Decoder. |
| | Line 308 | "3" Output of SCC Decoder. |
| | | "4" Output of SCC Decoder. |
| Cable 214 (From Logic to Registers). | Line SO-1 | Gate Contents of X SHOR and Y SHOR Registers to X SHSR and Y SHSR registers respectively. |
| | | Gate Contents of X SCOR and Y SCOR Registers to X SCSR and Y SCRS Registers respectively. |
| | Line SO-2 | Set Counter A to "1". |
| | Line 216 | Reset Counter B to "0". |
| | DY-1 | Decrement X SHSR Register. |
| | | Decrement Y SCSR Register. |
| | Line 218 | Increment Counter B. |
| | Line DX-1 | Decrement X SHSR Register. |
| | | Decrement X SCSR Register. |
| | Line 224 | Increment Counter A. |
| | Line IY-1 | Increment Y SHSR Register. |
| | | Increment Y SCSR Register. |
| | Line IX-1 | Increment X SHSR Register. |
| | | Increment X SCSR Register. |
| | Line 246 | Increment XDR, 1. |
| | Line 248 | Increment XDR, 2. |
| | Line 250 | Increment YDR, 1 |
| | Line 252 | Increment YDR, 2. |
| | Line 254 | Decrement XDR, 1. |
| | Line 256 | Decrement XDR, 2 |
| | Line 258 | Decrement YDR, 1. |
| | Line 260 | Decrement YDR, 2. |

While the invention has been particularly shown and described with reference to the preferred embodiments thereof, it will be understood by those skilled in the art that various changes in form and detail may be made therein without departing from the spirit and scope of the invention.

What is claimed is:

1. In a program-controlled display apparatus which comprises a display unit having a display screen, and control means for controlling said display unit, said control means including storage means, a system for effecting the displaying of a sheet of graphic information on said screen in a continuous pass of said sheet therethrough comprising:

means for storing said sheet in said storage means in the form of a grid of rectangular cells, each of said stored cells including a name therefor constituted by the X, Y sheet coordinates of a chosen corner of the cell, and display orders for the graphic information contained within the cell;

means operative in response to said cells' names for causing said sheet to be moved in a continuous pass through said screen; and means responsive to said display orders for effecting the displaying of the graphic information from said sheet on said screen as said sheet is moved through said screen.

2. In a program-controlled display apparatus which comprises a display unit having a display screen, and control means for controlling said display unit, said control means including storage means, a system for effecting the displaying of a sheet of graphic information on a window of said screen in a continuous pass of said sheet through said window comprising:

means for storing said sheet in said storage means in the form of a grid of rectangular cells, each of said stored cells including a name therefor constituted by the X, Y sheet coordinates of a chosen corner of the cell, and display orders for the graphic information contained within the cell;

means operative in response to said cells' names for causing said sheet to be moved in a continuous pass through said window; and means responsive to said display orders for effecting the displaying of the graphic information from said sheet on said window as said sheet is passed through said window.

3. In a program-controlled display apparatus which comprises a display unit having a display screen, and control means for controlling said display unit, said control means including both primary and secondary storage means, a system for effecting the displaying of a sheet of graphic information on a window of said screen in a continuous pass of said sheet through said window comprising:

means for storing all of the graphic information on said sheet in said secondary storage means in the form of a grid of rectangular cells, each of said stored cells including a name therefor constituted by the X, Y coordinates on the sheet of a chosen corner of the cell, and display orders for the graphic information contained within the cell;

means for storing in said primary storage, a portion of said grid of rectangular cells, said portion having a selected bandwidth which is at least sufficient to accommodate the amount of cells required to fill said window;

means responsive to said cell names for causing said cells to be continually sequentially transferred to said primary storage;

means responsive to said cell names responsive means for causing the cells being transferred to said primary storage to be moved in a continuing pass through said window on said screen; and means responsive to said display orders for effecting the displaying of the graphic information contained in said cells as said cells are moved through said window on said screen.

4. In a program-controlled display apparatus which comprises a cathode ray tube display unit having a display screen and an electron beam therein and control means for controlling said display unit, said control means including both primary and secondary storage means, a system for effecting the displaying of a sheet of graphic information on a window of said screen in a continuous pass of said sheet through said window comprising:

means for storing all of the graphic information on said sheet in said secondary storage means in the form of a grid of rectangular cells, each of said stored cells including a name therefor constituted by the X, Y coordinates on the sheet of a chosen corner of the cell, and display orders for the graphic information contained within the cell;

means for storing in said primary storage means, a portion of said grid of rectangular cells, said portion having a selected bandwidth at least sufficient to accommodate the amount of cells required to fill said window;

means for specifying relocation values in terms of X, Y coordinates for locating said window on said sheet;

means for specifying relocation values in terms of X, Y coordinates for locating said window on said screen;

means for specifying the X, Y deflection coordinates of said electron beam for displaying a given cell within said window;

means responsive to said names for causing said cells to be continually sequentially transferred from said secondary to said primary storage;

means responsive to said cell names responsive means for causing the cells being transferred to primary storage to be moved in a continuing pass through said window on said screen; and means responsive to said display orders for effecting the displaying of the graphic information contained in said cells as said cells are moved through said window on said screen.

5. In a program-controlled display apparatus which comprises a cathode ray tube display unit having a display screen and an electron beam therein and control means for controlling said display unit, said control means including both primary and secondary storage means, a system for effecting the displaying of a sheet of graphic information on a window of said screen in a continuous pass of said sheet through said window comprising:

means for storing all of the graphic information on said sheet in said secondary storage means in the form of a grid of rectangular cells, each of said stored cells including a name therefor constituted by the X, Y coordinates on the sheet of a chosen corner of the cell and display orders for the graphic information contained within the cell;

means for storing in said primary storage means, a portion of said grid of rectangular cells, said portion having a selected bandwidth at least sufficient to accommodate the amount of cells required to fill said window;

means for providing a display order which specifies the X, Y coordinates of a cell on said sheet, the address in said storage means of said last-named cell and its momentary state wherein said last-named state can be the presence of said cell in said primary storage means and in said window, the presence of said cell in said primary storage means but not in said window, or the presence of said cell only in said secondary storage means;

means for specifying relocation values in terms of X,

Y coordinates for locating said window on said sheet;

means for specifying relocation values in terms of X, Y coordinates for locating said window on said screen;

means for specifying the X, Y deflection coordinates of said electron beam for displaying a given cell within said window;

means responsive to said cell names for causing said cells to be continually sequentially transferred from said secondary to said primary storage means;

means responsive to said cell names responsive means for causing the cells being transferred to said primary storage means to be moved in a continuing pass through said window on said screen; and means responsive to said display orders for effecting the displaying of the graphic information contained in said cells as said cells are moved through said window on said screen.

6. In a program-controlled display apparatus which comprises a cathode ray tube display unit having a display screen and an electron beam therein, and control means for controlling said display unit, said control means including both primary and secondary storage means, a system for effecting the display of a sheet of graphic information on a window of said screen in a continuous pass of said sheet through said window comprising:

means for storing all of the graphic information on said sheet in said secondary storage means in the form of a grid of rectangular cells, each of said stored cells including a name therefor constituted by the X, Y coordinates on the sheet of a chosen corner of the cell and display orders for the graphic information contained within the cell;

means for storing in said primary storage means a portion of said grid of rectangular cells, said portion having a selected bandwidth at least sufficient to accommodate the amount of cells required to fill said window;

means for providing a display order which specifies the X, Y coordinates of a cell on said sheet, the address in said storage means of said last-named cell and its momentary state wherein said last-named state can be a first state, i.e., the presence of said cell in said cell in said primary storage means and in said window, a second state, i.e., the presence of said cell in said primary storage means but not in said window, or a third state, i.e., the presence of said cell only in said secondary storage means;

means for specifying relocation values in terms of X, Y coordinates for locating said window on said sheet;

means for specifying relocation values in terms of X, Y coordinates for locating said window on said screen;

means for specifying relocation values in terms of X, Y coordinates for displaying a given cell within said window;

means operative in response to said first state in said display order for causing the display orders in said cell to be carried out and operative in response to said second and third states for the preventing of the carrying out of said display orders;

means responsive to said cell names for causing said cells to be continually sequentially transferred from said secondary to said primary storage means; and means responsive to said cell names responsive means for causing the cells being transferred to said primary storage means to be moved in a continuing pass through said window on said screen.

7. In a program-controlled display apparatus which comprises a cathode ray tube display unit having a display screen and electron beam therein, and control means for controlling said display unit, said control means including both primary and secondary storage means and means for effecting the movement of said beam in accordance with the X, Y coordinates of said beam on said screen, a system for effecting the display of the sheet of graphic information on a window on said screen in a continuous pass of said sheet through said window comprising;

means for storing all of the graphic information on said sheet in said secondary storage means in the form of a grid of rectangular cells, each of said stored cells including a name therefor constituted by X, Y coordinates on the sheet of a chosen corner of the cell and display orders for the graphic information contained within the cell;

means for storing in said primary storage means a portion of said grid of rectangular cells, said portion having a selected bandwidth at least sufficient to accommodate the amount of cells required to fill said window;

first means for determining whether a particular cell is to be displayed at a given juncture;

second means for determining whether said last-named cell is in said primary storage means;

transfer means responsive to the determination by said second means that said cell is not in said primary storage means for transferring said cell from said secondary storage means to said primary storage means;

means responsive to the operation of said first means, said second means and said transfer means for selecting a given cell as an origin cell, said origin cell being one to be displayed and present in said primary storage means;

means operative upon the selecting of said cell for producing a spiral scan of the cells on said sheet surrounding said selected origin cell, said spiral scan being continued until sufficient cells have been traversed by said scan to at least fill said window, said scan producing means being responsive to said first, second and transfer means whereby as each cell is encountered during said spiral scan, a determination is made by said first means as to whether the cell is to be displayed, a determination is made by said second means as to whether the cell is present in said primary storage means, and a transfer is made from said secondary to said primary storage means of said cell if it is not primary storage;

means responsive to the filling of said window by said spiral scan for moving the portion of said sheet in said window in a chosen direction for a distance equal to a cell dimension whereby the cell adjacent said selected origin cell in said direction in turn becomes the next origin cell; and means responsive to said selection of said next origin cell for testing said next origin cell with said first, second and transfer means and for thereafter producing said spiral scan by said spiral scanning means, the successive selection of sequentially occurring adjacent cells in the direction of movement of said sheet as origin cells and the respective sequentially occurring spiral scans around said cells resulting in a continuous movement of said sheet in said given direction through said window.

8. In a program controlled display apparatus which comprises a cathode ray tube display unit having a display screen and electron beam means therein, and control means for controlling said display unit, said control means including both primary and secondary storage means and means for effecting the movement of said beam in accordance with the X,Y coordinates of said beam on said screen, a system for effecting the display of a sheet of graphic information on a window of a chosen size upon said screen in a continuous pass of said sheet through said window comprising;

means for storing all of the graphic information on said sheet in said secondary storage means in the form of a grid of rectangular cells, each of said stored cells including a name therefor constituted by the X,Y coordinates on the sheet of a chosen corner of the cell and display orders for the graphic information contained within the cell;

means for storing in said primary storage means a portion of said grid of rectangular cells, said portion having a selected bandwidth at least sufficient to accommodate the amount of cells required to fill said window;

first means for determining whether a particular cell is to be displayed at a given juncture;

second means for determining whether the last named cell is in said primary storage means;

transfer means responsive to the determination by said second means that said cell is not in said primary storage means for transferring said cell from said secondary storage means to said primary storage means;

means responsive to the operation of said first means, said second means and said transfer means for selecting a given cell as an origin cell, said origin cell being one to be displayed and present in said primary storage means;

means operative upon the selecting of said cell for producing a spiral scan of the cells on said sheet surrounding said selected origin cell, said spiral scan being continued until sufficient cells have been traversed by said scan to at least fill said window, said scan producing means being responsive to said first, second and transfer means whereby as each cell is encountered during said spiral scan, a determination is made by said first means as to whether the cell is to be displayed, a determination is made by said second means as to whether the cell is present in said primary storage means, and a transfer is made from said secondary to said primary storage means of said cell if it is not in primary storage;

means responsive to the filling of said window by said spiral scan for moving the portion of said sheet in said window in a chosen direction for a distance equal to a cell dimension whereby the cell adjacent said selective origin cell in said direction in turn becomes the next origin cell, said last named means including means for specifying the name of a cell, i.e., its X,Y coordinates and means for subtracting the X,Y coordinates of said cell name from the X,Y coordinates of said electron beam to thereby cause said movement of said sheet in said window; and means responsive to said selection of said next origin cell for testing said next origin cell with said first, second and transfer means for thereafter producing said spiral scan by said spiral scanning means, the successive selection of sequentially occurring adjacent cells in the direction of movement of said sheet as origin cells and the respective sequentially occurring spiral scans around said cells resulting in a continuous movement of said sheet in said given direction through said window.

9. In a program-controlled display apparatus as defined in claim 8 wherein there are further included:

means for specifying the size of said window, said last-named means including a first register for containing the value of the upper limit of said window in the X direction, a second register for containing the value of the lower limit of said window in the X direction, a third register for containing the value of the upper limit of said window in the Y direction, and a fourth register for containing the value of the lower limit of said window in the Y direction;

means for specifying the X,Y coordinates of the selected origin cell on said window, said last-named means including a fifth register for containing the value of a selected origin cell's X coordinate on said window and a sixth register for containing the value of the selected origin cell's Y coordinate on said window;

means for specifying the values of the X,Y coordinates of the selected origin cell on the sheet, said last-named means including a seventh register containing the value of the selected origin cell's X coordinate on said sheet and an eighth register for containing the selected cell's Y coordinate value on said sheet;

an X sheet spiral register for containing the X coordinate of the sheet origin cell; and a Y sheet spiral register for containing the Y coordinate of the sheet origin cell.

10. In a program-controlled display apparatus as defined in claim 9 wherein said spiral scan producing means includes ninth and tenth incrementable and decrementable registers for containing the X and Y screen coordinates respectively of the origin cell on said window.

11. In a program-controlled display apparatus as defined in claim 10 wherein said primary storage means comprises:

first and second memory means, the first memory means containing a word for each cell on said sheet, said last-named word including the address of the cell in said second memory provided that it is present in said second memory, the address of the cell in said secondary storage means and a bit which indicates whether a cell is or is not blank, said first memory being addressable by said X and Y sheet spiral registers, said second memory storing the contents of said cell, said second memory being addressable by said X and Y sheet spiral registers, said second memory storing the contents of said cell, said second memory being addressable by said first memory, said transfer means, and said display unit.

12. In a method for effecting the displaying of a sheet of graphic information on the display screen of a display unit in a programmed-control display apparatus in a continuous pass of said sheet through said window wherein said apparatus includes control means for controlling said display unit, and said control means includes storage means, the steps comprising:

storing the graphic information on said sheet in said storage means in the form of a grid of rectangular cells wherein each of said stored cells includes a name therefor constituted by the X,Y sheet coordinates of a chosen corner of a cell and display orders for the graphic information contained within the cell;

initially, in response to said cell names, filling said screen with the first cells of said sheet to be passed through said screen;

thereafter moving said cells through said screen in a given direction while simultaneously bringing cells from said storage means immediately adjacent those being moved to continuously replace those cells already passed through said screen; and displaying the graphic information in said cells in response to said display orders as said cells are passed through said screen whereby said sheet of information is displayed on said screen in a continuous pass of said sheet through said screen.

13. In a method for effecting displaying of a sheet of graphic information on the window of the display screen of a display unit in a program-controlled display apparatus in a continuous pass of said sheet through said window wherein said apparatus includes control means for controlling said display unit and said control means includes primary and secondary storage means, the steps comprising:

storing all of the graphic information on said sheet in said secondary storage means in the form of a grid of rectangular cells, each of said cells including a name therefor constituted by the X,Y coordinates on the sheet of a chosen corner of the cell, and display orders for the graphic information contained within the cell;

storing in said primary storage means, a portion of said grid of rectangular cells, wherein said portion which is stored has a selected bandwidth which is at least sufficient to accommodate the amount of cells required to fill said window;

initially, in response to said cell names, filling said screen with the first cells of said sheet from said primary storage means to be passed through said window;

thereafter moving said cells through said window in a given direction while simultaneously bringing cells immediately adjacent those being moved from said secondary storage means to said primary storage means to continually replace those cells already passed through said screen to thereby maintain said primary storage means filled with cells; and displaying the graphic information in said cells in response to said display orders as said cells are passed through said window whereby said sheet of information is displayed on said window in a continuous pass of said sheet through said window.

14. In a method as defined in claim 13 wherein there are included the further steps of;

specifying the relocation values in terms of X,Y coordinates for locating said window on said sheet;

specifying the relocation values in terms of X,Y coordinates for locating said window on said screen; and specifying the X,Y deflection coordinates of the electron beam in said window for displaying a given cell within the window.

15. In a method as defined in claim 14 wherein there is further included the step of:

providing a display order which specifies the X,Y coordinates of a cell on said window, the address in said storage means of said last-named cell and its momentary state wherein said last-named state can be a first state, i.e. the presence of said cell in said primary storage means and in said window, a second state, i.e., the presence of said cell in said primary storage means but not in said window, or a third state, i.e., the presence of said cell only in said secondary storage means.

* * * * *